(12) United States Patent
Keller et al.

(10) Patent No.: US 12,360,353 B2
(45) Date of Patent: Jul. 15, 2025

(54) AUTOMATED ADJUSTMENT OF LIGHT SHEET GEOMETRY IN A MICROSCOPE

(71) Applicant: Howard Hughes Medical Institute, Chevy Chase, MD (US)

(72) Inventors: Philipp Johannes Keller, Ashburn, VA (US); Raghav Kumar Chhetri, Sterling, VA (US); Loïc Alain Royer, Dresden (DE)

(73) Assignee: Howard Hughes Medical Institute, Chevy Chase, MD (US)

( * ) Notice: Subject to any disclaimer, the term of this patent is extended or adjusted under 35 U.S.C. 154(b) by 0 days.

(21) Appl. No.: 17/711,128

(22) Filed: Apr. 1, 2022

(65) Prior Publication Data
US 2022/0236550 A1 Jul. 28, 2022

Related U.S. Application Data

(63) Continuation of application No. 16/309,057, filed as application No. PCT/US2017/038970 on Jun. 23, 2017, now Pat. No. 11,320,640.
(Continued)

(51) Int. Cl.
*G02B 21/32* (2006.01)
*G02B 21/00* (2006.01)
(Continued)

(52) U.S. Cl.
CPC ......... *G02B 21/32* (2013.01); *G02B 21/0076* (2013.01); *G02B 21/06* (2013.01); *G02B 27/0025* (2013.01)

(58) Field of Classification Search
CPC .... G02B 21/32; G02B 21/0076; G02B 21/06; G02B 27/0025; G02B 21/0032; G02B 21/367
(Continued)

(56) References Cited

U.S. PATENT DOCUMENTS

| 8,570,649 | B2 | 10/2013 | Truong et al. |
| 8,582,203 | B2 | 11/2013 | Dunsby |

(Continued)

FOREIGN PATENT DOCUMENTS

| EP | 2887117 A1 | 6/2015 |
| JP | 2003185927 A | 7/2003 |

(Continued)

OTHER PUBLICATIONS

Communication pursuant to Article 94(3) EPC, European Patent Office, Counterpart Application No. 17816281.4, dated Jun. 30, 2022 (5 pages total).
(Continued)

*Primary Examiner* — Tuyen Tra
*Assistant Examiner* — Rahman Abdur
(74) *Attorney, Agent, or Firm* — DiBerardino McGovern IP Group LLC

(57) ABSTRACT

A sample is imaged using light-sheet imaging. The light-sheet imaging includes generating light, forming one or more light sheets from the light at one or more positions within the sample along respective illumination directions that are parallel with an illumination axis, and recording images of fluorescence emitted along a detection direction from the sample due to the optical interaction between the one or more light sheets and the sample. One or more properties relating to the light-sheet imaging are measured; the one or more measured properties are analyzed; and one or more operating parameters associated with the light-sheet imaging are adjusted based on the analysis of the one or more measured properties.

22 Claims, 33 Drawing Sheets

Related U.S. Application Data

(60) Provisional application No. 62/447,154, filed on Jan. 17, 2017, provisional application No. 62/354,384, filed on Jun. 24, 2016.

(51) Int. Cl.
  *G02B 21/06* (2006.01)
  *G02B 27/00* (2006.01)

(58) Field of Classification Search
  USPC .......................................................... 359/385
  See application file for complete search history.

(56) References Cited

U.S. PATENT DOCUMENTS

| | | | |
|---|---|---|---|
| 8,582,208 B2 | 11/2013 | Van Den Berg | |
| 8,797,645 B2 | 8/2014 | Schwertner et al. | |
| 2004/0027462 A1* | 2/2004 | Hing | H04N 25/745 348/E3.018 |
| 2004/0109586 A1* | 6/2004 | Samson | G06V 20/69 382/109 |
| 2005/0167595 A1 | 8/2005 | Prelewitz et al. | |
| 2009/0225413 A1 | 9/2009 | Stelzer et al. | |
| 2010/0151474 A1 | 6/2010 | Afanasyev et al. | |
| 2010/0201784 A1 | 8/2010 | Lippert et al. | |
| 2010/0245770 A1* | 9/2010 | Zhang | A61B 5/0095 351/219 |
| 2010/0265575 A1 | 10/2010 | Lippert et al. | |
| 2010/0301230 A1* | 12/2010 | Filkins | G02B 21/16 250/459.1 |
| 2011/0036996 A1 | 2/2011 | Wolleschensky et al. | |
| 2011/0115895 A1 | 5/2011 | Huisken | |
| 2011/0122488 A1 | 5/2011 | Truong et al. | |
| 2011/0134521 A1 | 6/2011 | Truong et al. | |
| 2011/0304723 A1 | 12/2011 | Betzig | |
| 2012/0049087 A1 | 3/2012 | Choi et al. | |
| 2012/0099190 A1 | 4/2012 | Knebel et al. | |
| 2012/0200693 A1 | 8/2012 | Lippert et al. | |
| 2012/0229791 A1 | 9/2012 | Lippert et al. | |
| 2012/0281264 A1 | 11/2012 | Lippert et al. | |
| 2013/0286181 A1 | 10/2013 | Betzig et al. | |
| 2014/0099659 A1 | 4/2014 | Keller | |
| 2015/0022881 A1* | 1/2015 | Loza Alvarez | G02B 27/0075 359/385 |
| 2015/0029325 A1 | 1/2015 | Dholakia et al. | |
| 2015/0098126 A1* | 4/2015 | Keller | G02B 21/367 359/385 |
| 2015/0168706 A1 | 6/2015 | Schweinitzer et al. | |
| 2015/0168732 A1 | 6/2015 | Singer et al. | |
| 2015/0226950 A1 | 8/2015 | Booth et al. | |
| 2015/0286042 A1 | 10/2015 | Hilbert et al. | |
| 2015/0309294 A1 | 10/2015 | Stelzer | |
| 2015/0362713 A1 | 12/2015 | Betzig et al. | |
| 2016/0124201 A1 | 5/2016 | Kikuchi | |
| 2016/0187633 A1 | 6/2016 | Rondeau | |

FOREIGN PATENT DOCUMENTS

| | | |
|---|---|---|
| JP | 2010540994 A | 12/2010 |
| JP | 2011511966 A | 4/2011 |
| JP | 2013174704 A | 9/2013 |
| JP | 2015514235 A | 5/2015 |
| JP | 2015537236 A | 12/2015 |
| WO | 2010014244 A2 | 2/2010 |
| WO | 2012094523 A2 | 7/2012 |
| WO | 2012110488 A2 | 8/2012 |
| WO | 2012122027 A2 | 9/2012 |
| WO | 2013172976 A1 | 11/2013 |
| WO | 2014150536 A1 | 9/2014 |
| WO | 2015054450 A1 | 4/2015 |
| WO | 2015184124 A1 | 12/2015 |

OTHER PUBLICATIONS

Chang Ho Lee, Korean International Searching Authority, International Search Report, counterpart PCT Application No. PCT/US2017/038970, mailed Sep. 19, 2017, 3 pages total.

Chang Ho Lee, Korean International Searching Authority, Written Opinion, counterpart PCT Application No. PCT/US2017/038970, mailed Sep. 19, 2017, 7 pages total.

Philipp Keller et al., "Fast, high-contrast imaging of animal development with scanned light sheet-based structured-illumination microscopy," Nature Methods, vol. 7, No. 8, Jul. 4, 2010 (online), pp. 637-645 plus Supporting Online Material totalling 35 pages.

David Carberry, Australian Patent Office, Examination Report, counterpart Australian Application No. 2017281533, mailed Jan. 29, 2019, 6 pages total.

Lars Hufnagel, "Imaging Methods for Embryonic Development," KITP DynaDev, presented on Aug. 18, 2011, 96 minutes, available online at http://online.kitp.ucsb.edu/online/dynadev_m11/hufnagel/rm/jwvideo.html on Aug. 18, 2011, including transcript of relevant portions (5 pages).

Hans-Ulrich Dodt et al., "Ultramicroscopy: three-dimensional visualization of neuronal networks in the whole mouse brain," Nature Methods, vol. 4, No. 4, Mar. 24, 2007, pp. 331-336.

Jan Huisken et al., "Optical Sectioning Deep Inside Live Embryos by Selective Plane Illumination Microscopy," Science, vol. 305, Aug. 13, 2004, pp. 1007-1009.

Jan Huisken et al., "Even fluorescence excitation by multidirectional selective plane illumination microscopy (mSPIM)," Optics Letters, vol. 32, Jul. 31, 2007, pp. 2608-2610 (submitted as 15 pages).

Philipp Keller et al., "Reconstruction of Zebrafish Early Embryonic Development by Scanned Light Sheet Microscopy," Science, vol. 322, Nov. 14, 2008, pp. 1065-1069 plus Supporting Online Material totalling 45 pages.

Philipp Keller et al., "Quantitative in vivo imaging of entire embryos with Digital Scanned Laser Light Sheet Fluorescence Microscopy," Current Opinion in Neurobiology, vol. 18, pp. 624-632; 2008 (online Apr. 15, 2009).

Uros Krzic et al., "Multiview light-sheet microscope for rapid in toto imaging," Nature Methods, vol. 9, 730-733, Advance Online Publication, Jun. 3, 2012, pp. 1-7 plus Supporting Online Material totalling 20 pages.

Philipp Keller et al., "Light sheet microscopy of living or cleared specimens," Current Opinion in Neurobiology, vol. 22, pp. 1-6, 2011.

Thomas Planchon et al., "Rapid three-dimensional isotropic imaging of living cells using Bessel beam plane illumination," Nature Methods, Advance Online Publication, vol. 8, 417-423; Published online Mar. 4, 2011, pp. 1-10 plus Supporting Online Material totalling 34 pages.

Thai Truong et al., "Deep and fast live imaging with two-photon scanned light-sheet microscopy," Nature Methods, Advance Online Publication, vol. 8, 757-760; Published online Jul. 17, 2011, pp. 1-6.

A. H. Voie et al., "Orthogonal-plane fluorescence optical sectioning: three-dimensional imaging of macroscopic biological specimens," Journal of Microscopy, vol. 170, Pt. 3, Jun. 1993, pp. 229-236.

Kahlad Khairy et al., "Reconstructing Embryonic Development," Genesis, 49, 488-513, published online Dec. 7, 2010, 26 pages.

Raju Tomer et al., "Shedding light on the system: Studying embryonic development with light sheet microscopy," Current Opinion in Genetics & Development, 21, pp. 1-8, 2011.

Jan Huisken et al., "Selective plane illumination microscopy techniques in developmental biology," Development, Jun. 15, 2009, 136(12); 1963-1975.

Jeremie Capoulade et al., "Quantitative fluorescence imaging of protein diffusion and interaction in living cells," Nature Biotechnology, 29, 835-839, published online Aug. 7, 2011.

Jonathan Palero et al., "A simple scanless two-photon fluorescence microscope using selective plane illumination," Optics Express, vol. 18, Issue 8, pp. 8491-8498, Apr. 12, 2010.

Jim Swoger et al., "Multi-view image fusion improves resolution in three-dimensional microscopy," Optics Express, vol. 15, No. 13, Jun. 25, 2007, pp. 8029-8042 (14 pages).

(56) References Cited

OTHER PUBLICATIONS

Stephan Preibisch et al., "Software for bead-based registration of selective plane illumination microscopy data," Nature Methods, 7, 418-419, Jun. 1, 2010.
Raju Tomer et al., "Quantitative high-speed imaging of entire developing embryos with simultaneous multiview light-sheet microscopy," Nature Methods 9, 755-763 (2012), published online Jun. 3, 2012, 14 pages plus 36 pages of Supplementary Material.
Stephan Preibisch et al., "Efficient Bayesian-based multiview deconvolution," Nature Methods, vol. 11, No. 6, Jun. 2014, pp. 645-651.
David Carberry, Australian Patent Office, Second Examination Report, counterpart Australian Application No. 2017281533, mailed May 13, 2019, 3 pages total.
Kazuishi Shimomura, Japanese Patent Office, Office Action, counterpart Japanese Application No. 2018-562259, mailed Jun. 6, 2019, 8 pages total (which includes 4 pages of English Translation).
Robert Windecker, European Patent Office, Extended European Search Report, counterpart European Application No. 17816281.4, mailed Mar. 13, 2020, 9 pages total.
Isseki Shimomura, Japanese Patent Office, Office Action, counterpart Japanese Application No. 2018-562259, mailed Feb. 4, 2020, 13 pages total (including 7 pages English translation).
Raphael Jorand et al., "Deep and Clear Optical Imaging of Thick Inhomogeneous Samples," PLoS ONE, vol. 7, issue 4, e35795, 9 pages total (Apr. 2012).
Michael Weber et al., "Light sheet microscopy," Quantitative Imaging in Cell Biology (Methods in Cell Biology, vol. 123, Elsevier Inc.), Chapter 11, pp. 193-214 (2014).
Isseki Shimomura, Japanese Patent Office, Decision of Rejection, counterpart Japanese Application No. 2018-562259, mailed Oct. 2, 2020, 7 pages total (including 4 pages English translation).
Masaaki Moriuchi, Japanese Patent Office, Office Action, counterpart Japanese Application No. 2021-010726, mailed Mar. 8, 2022, 11 pages total (including 6 pages English translation).

\* cited by examiner

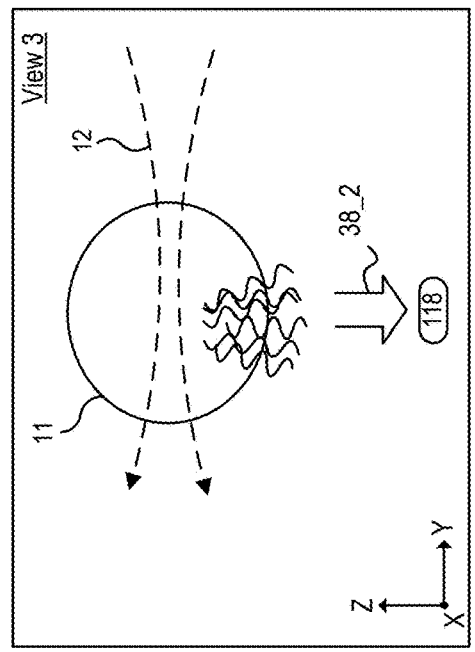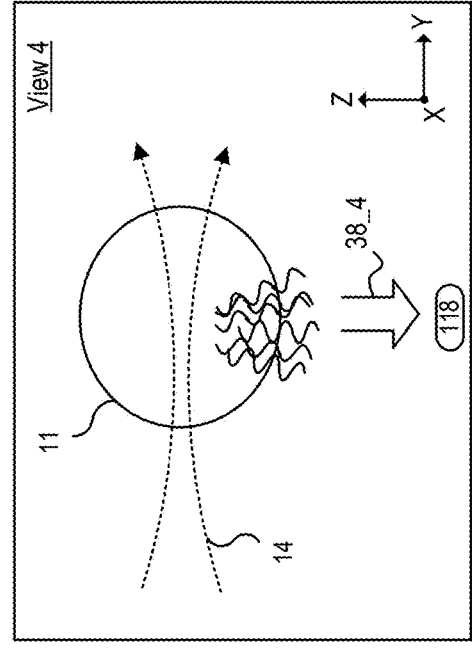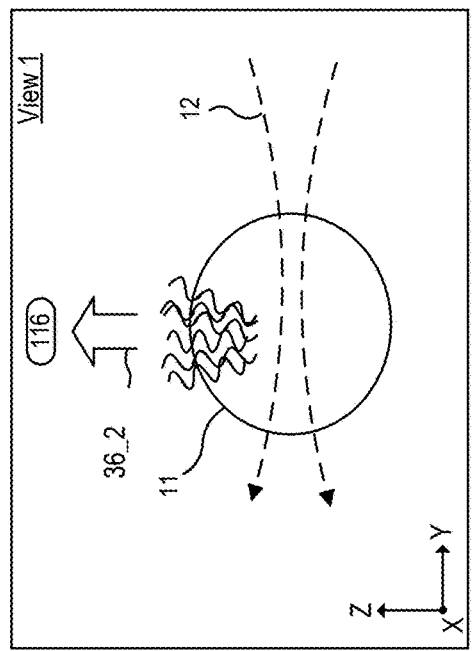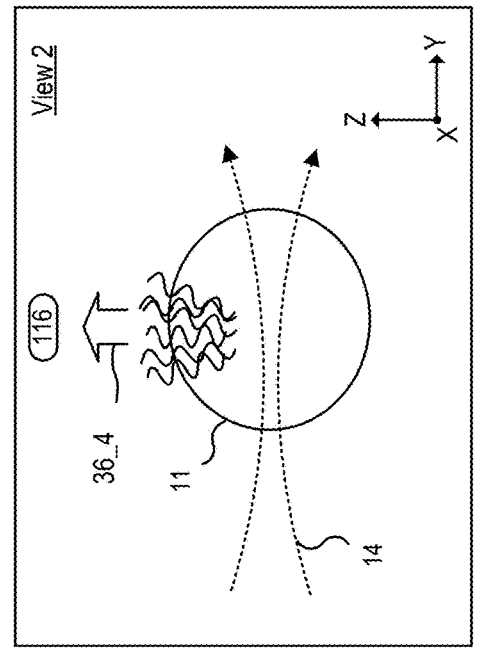
Fig. 3

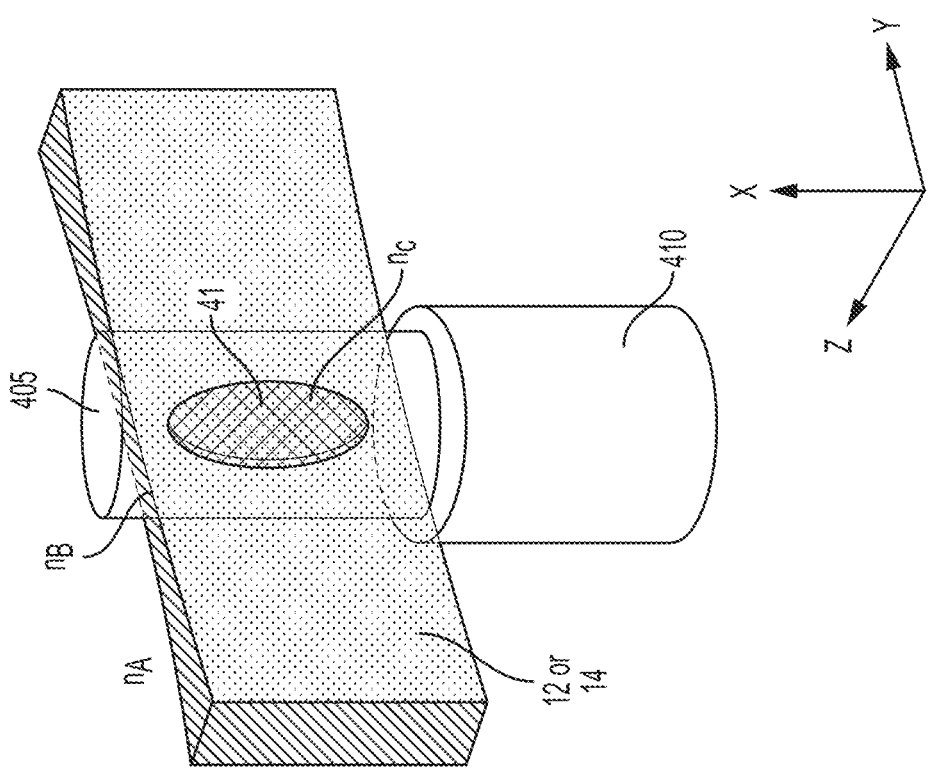
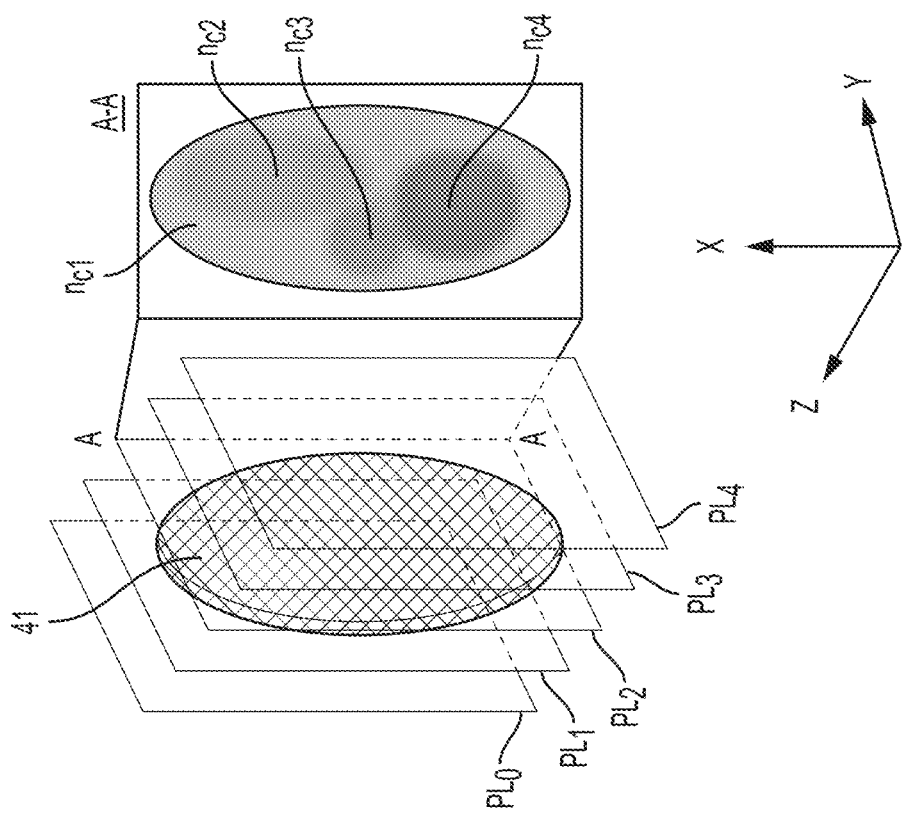
Fig. 4B
Fig. 4A

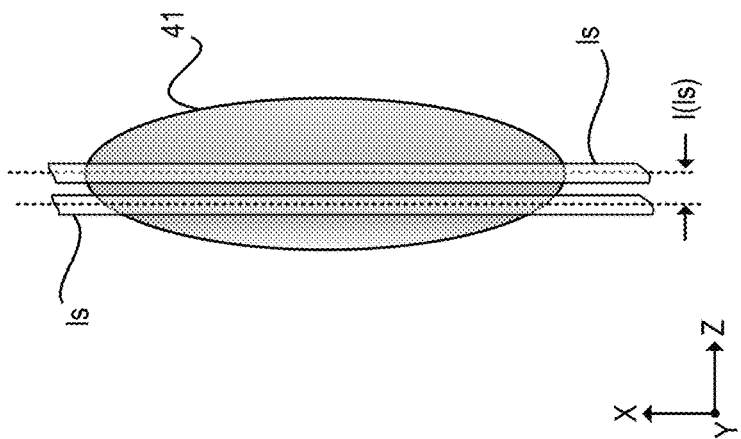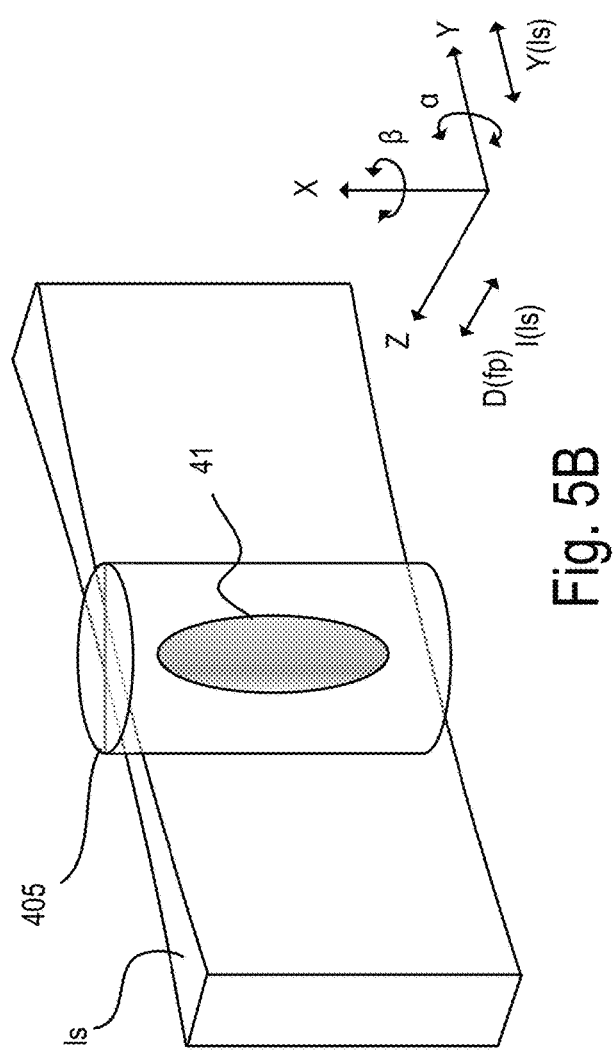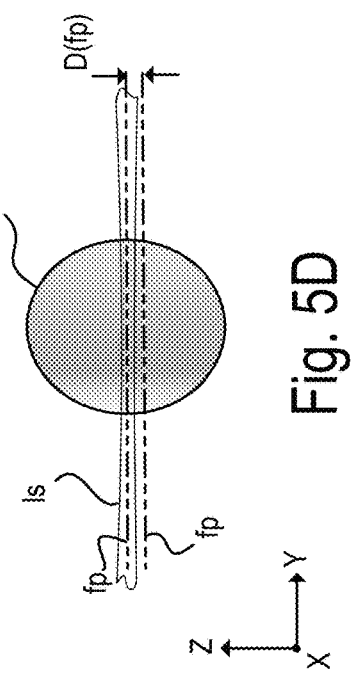

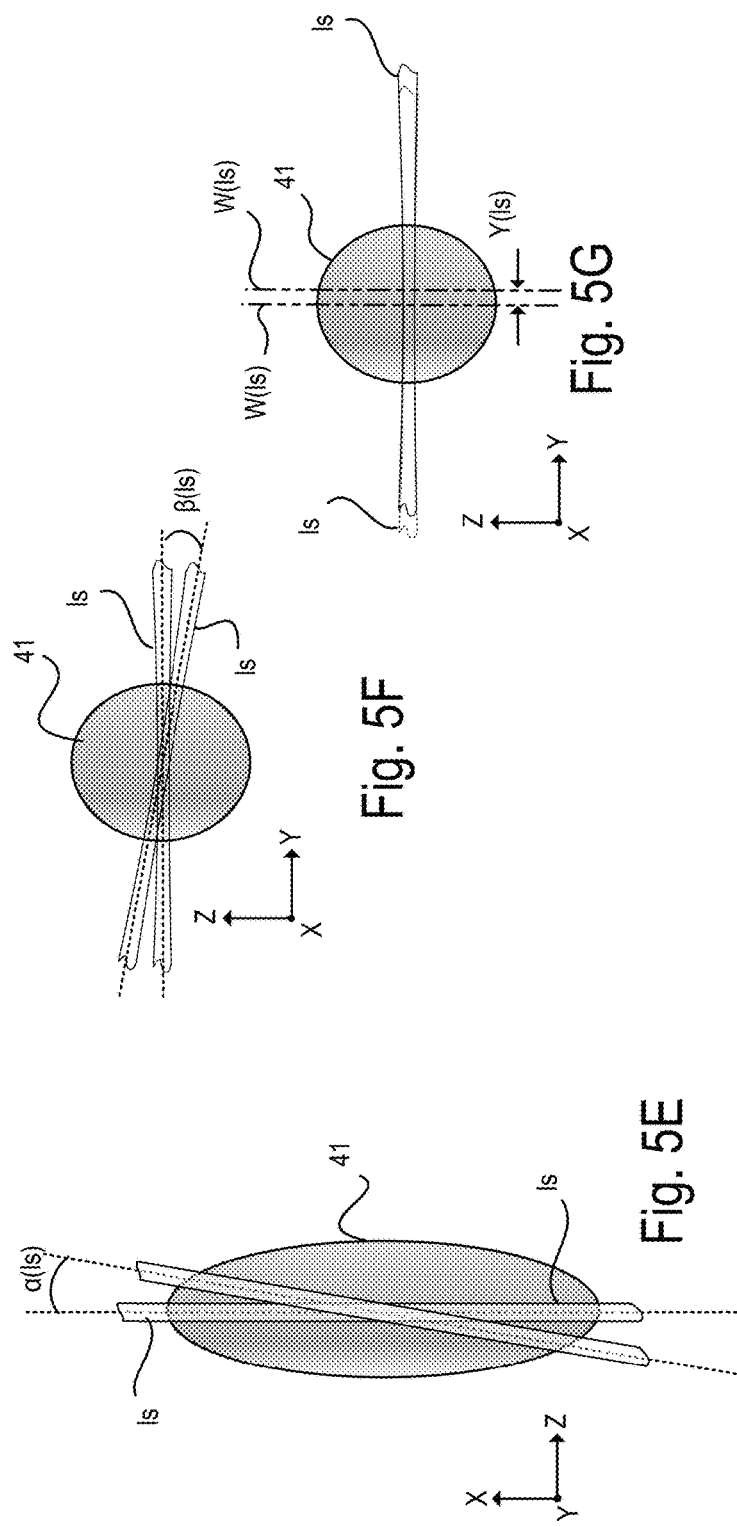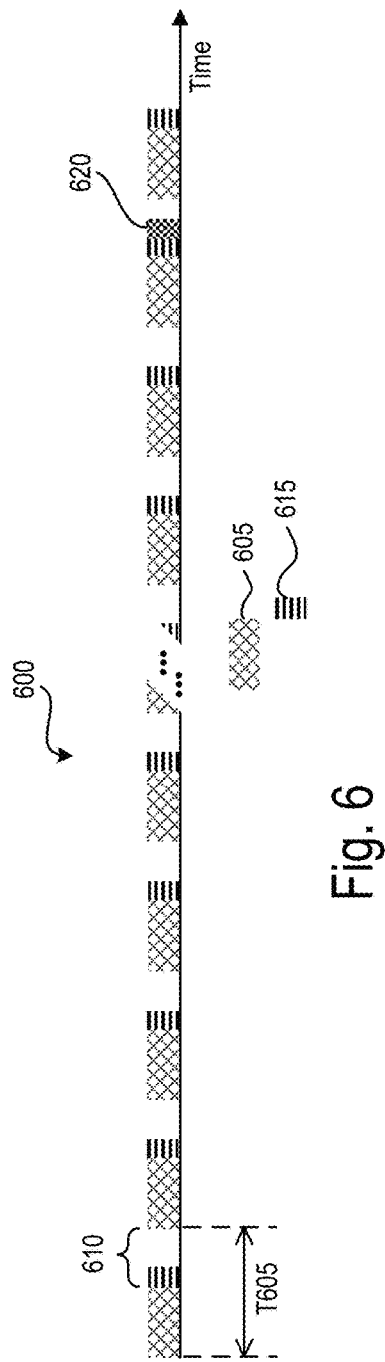

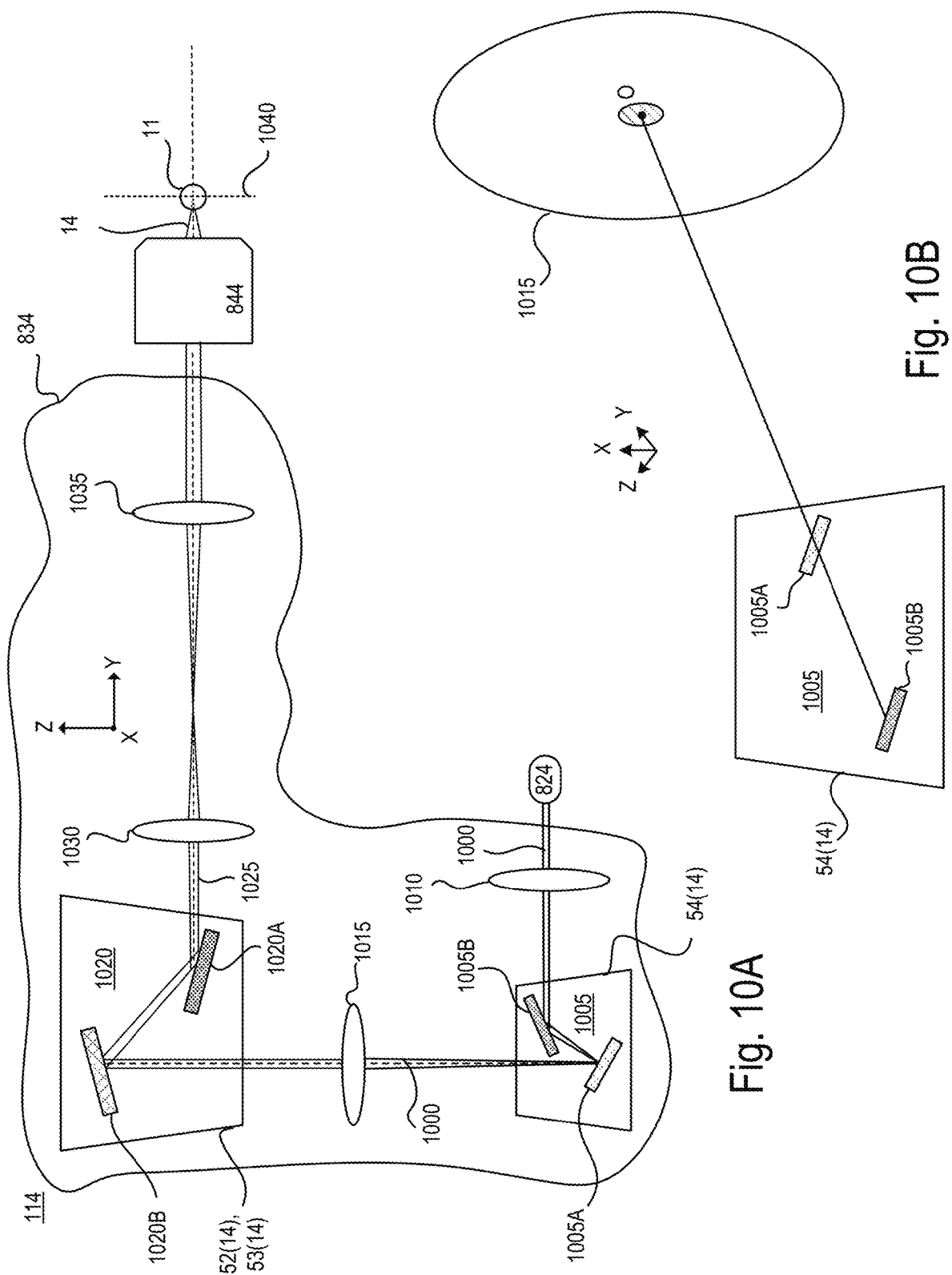

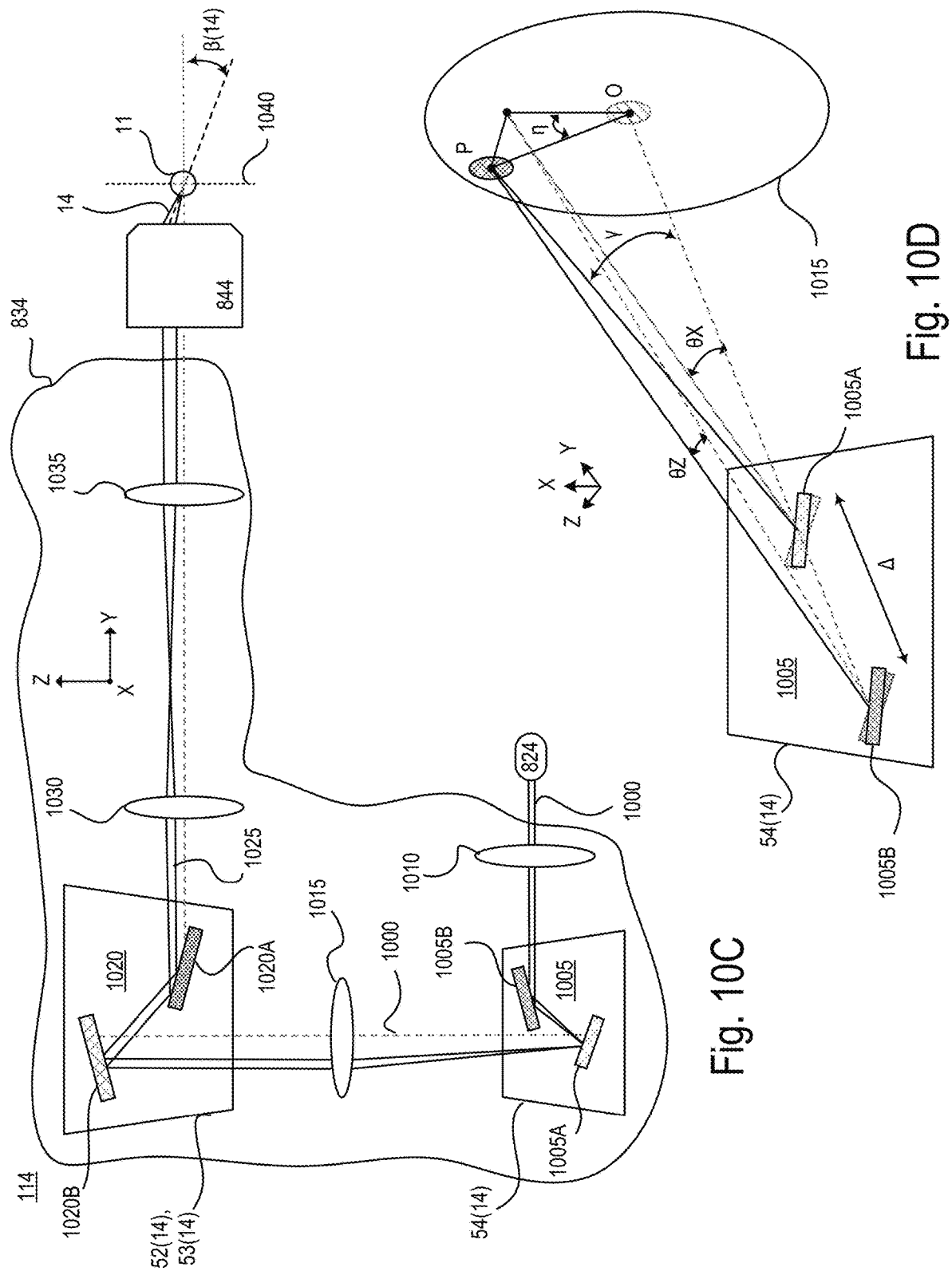

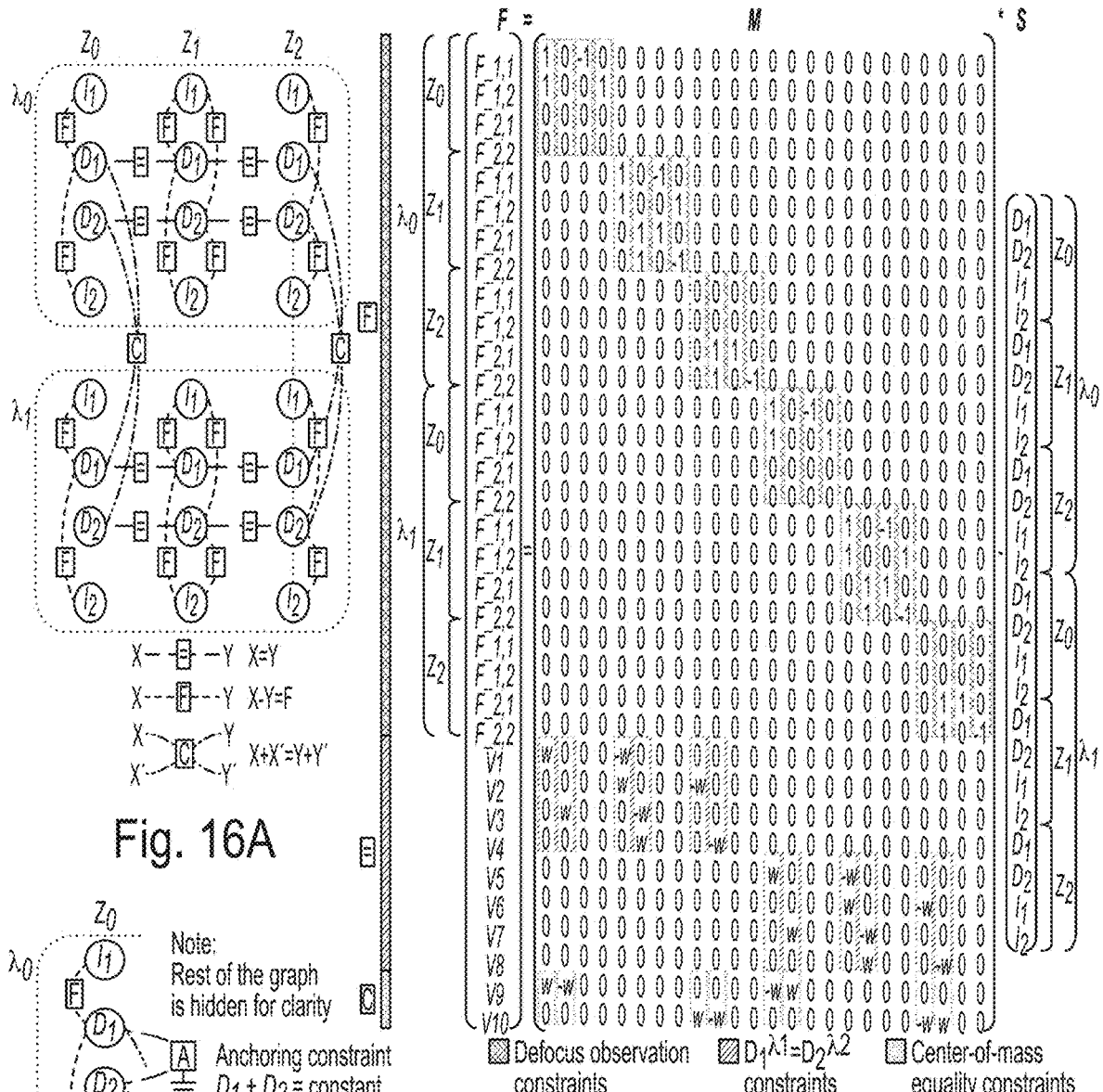
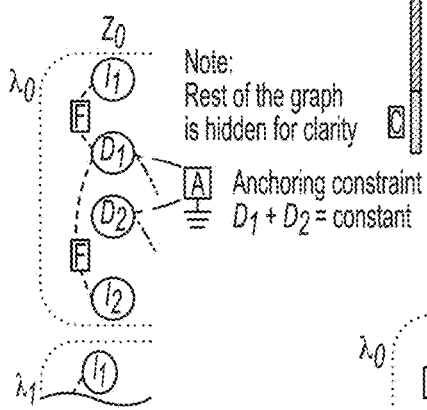
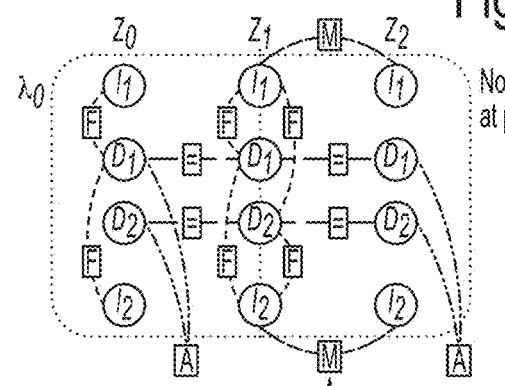
Fig. 16A
Fig. 16B
Fig. 16C
Fig. 16D

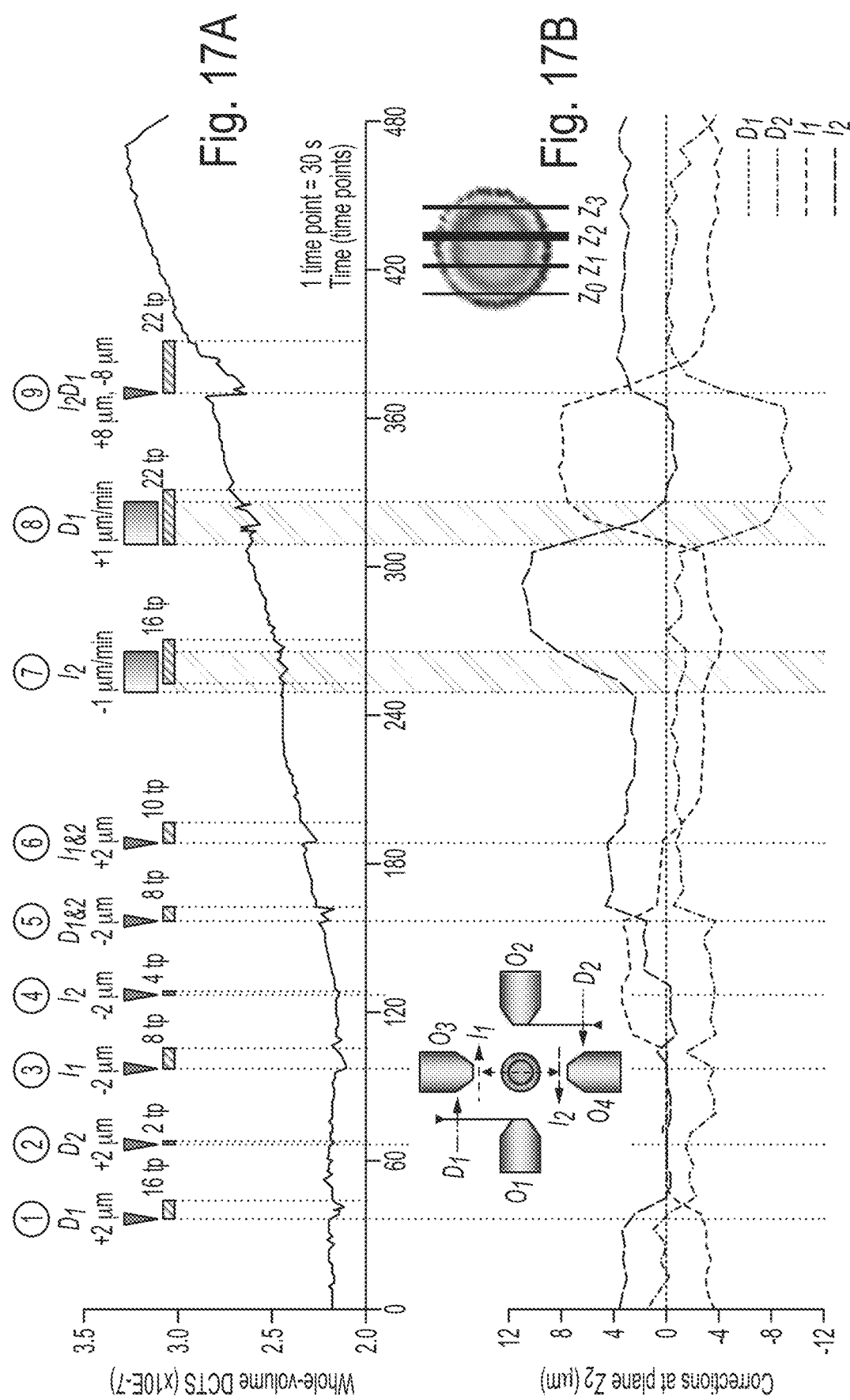

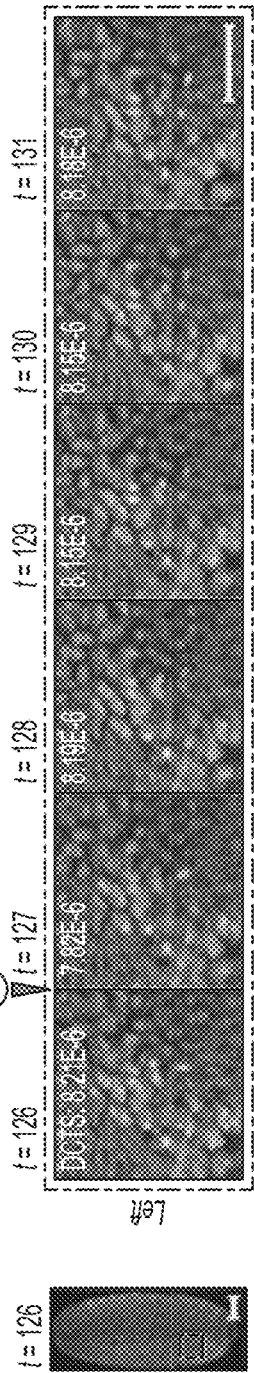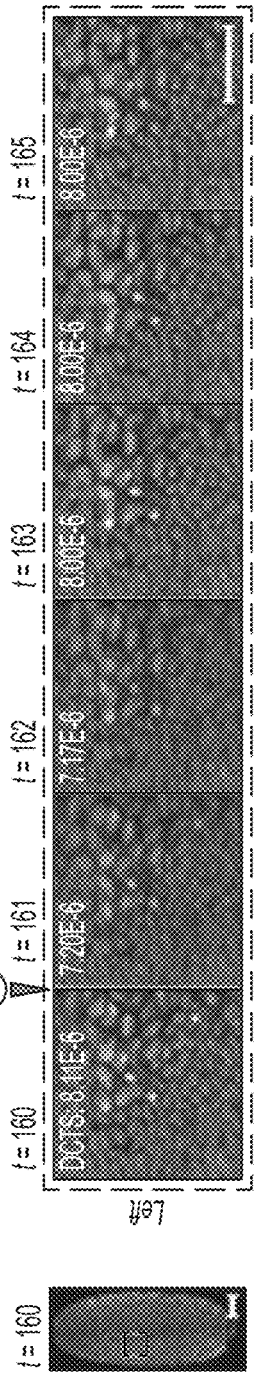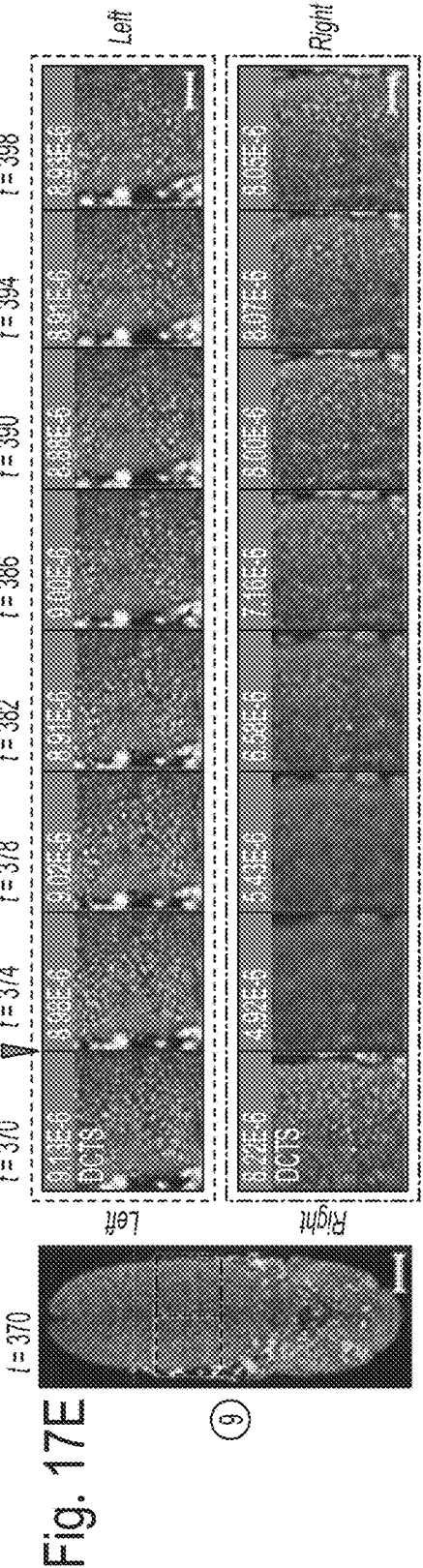
Fig. 17C
Fig. 17D
Fig. 17E

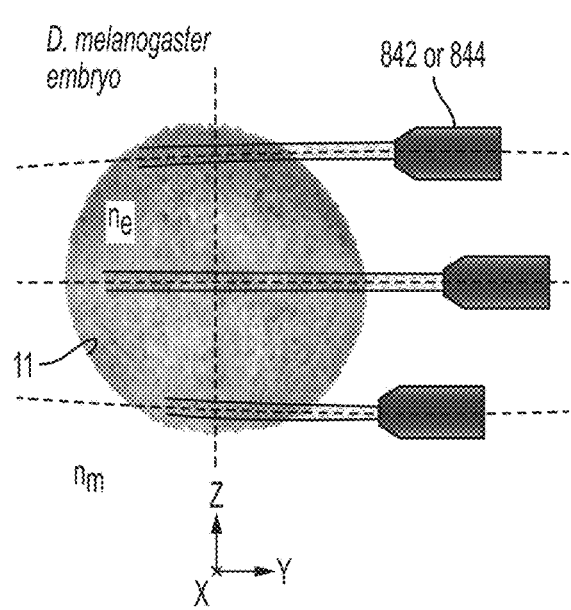
Fig. 18A
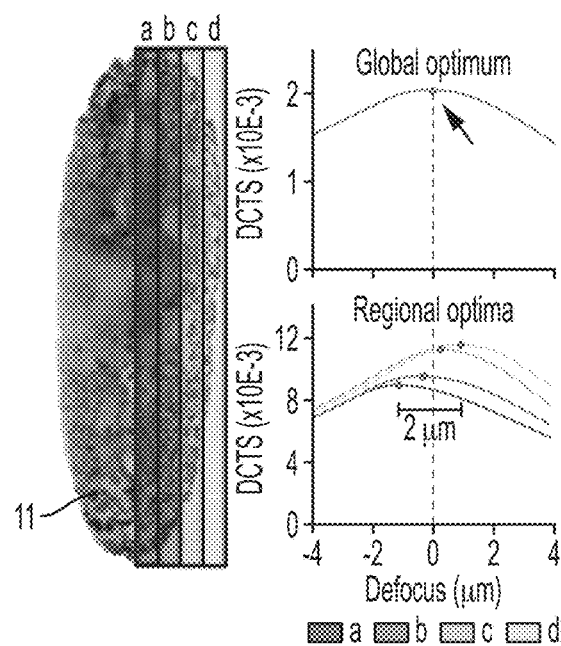
Fig. 18B
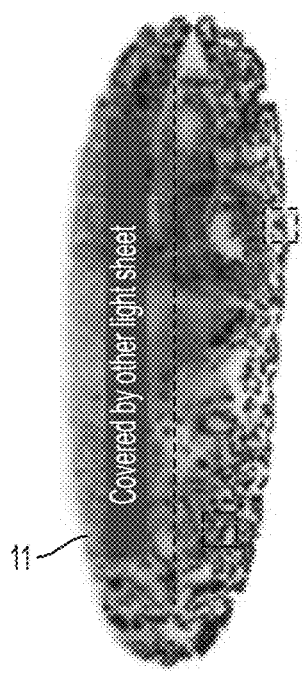
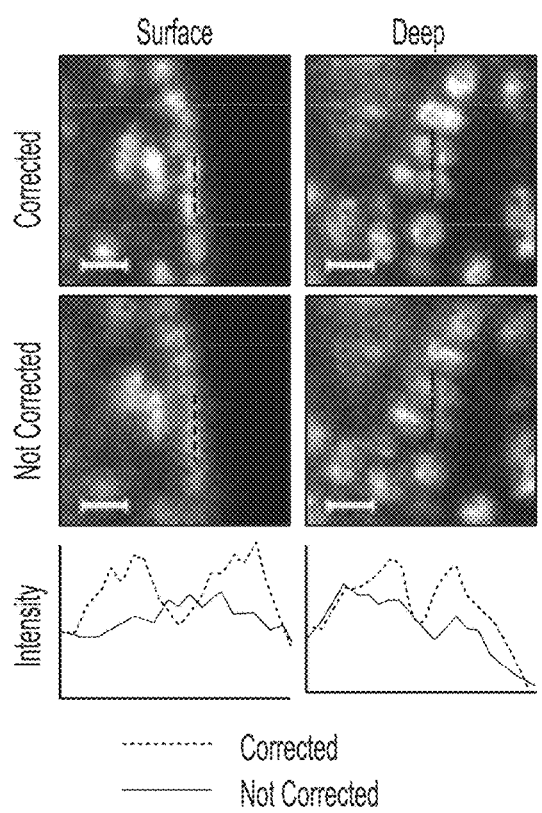
Fig. 18C

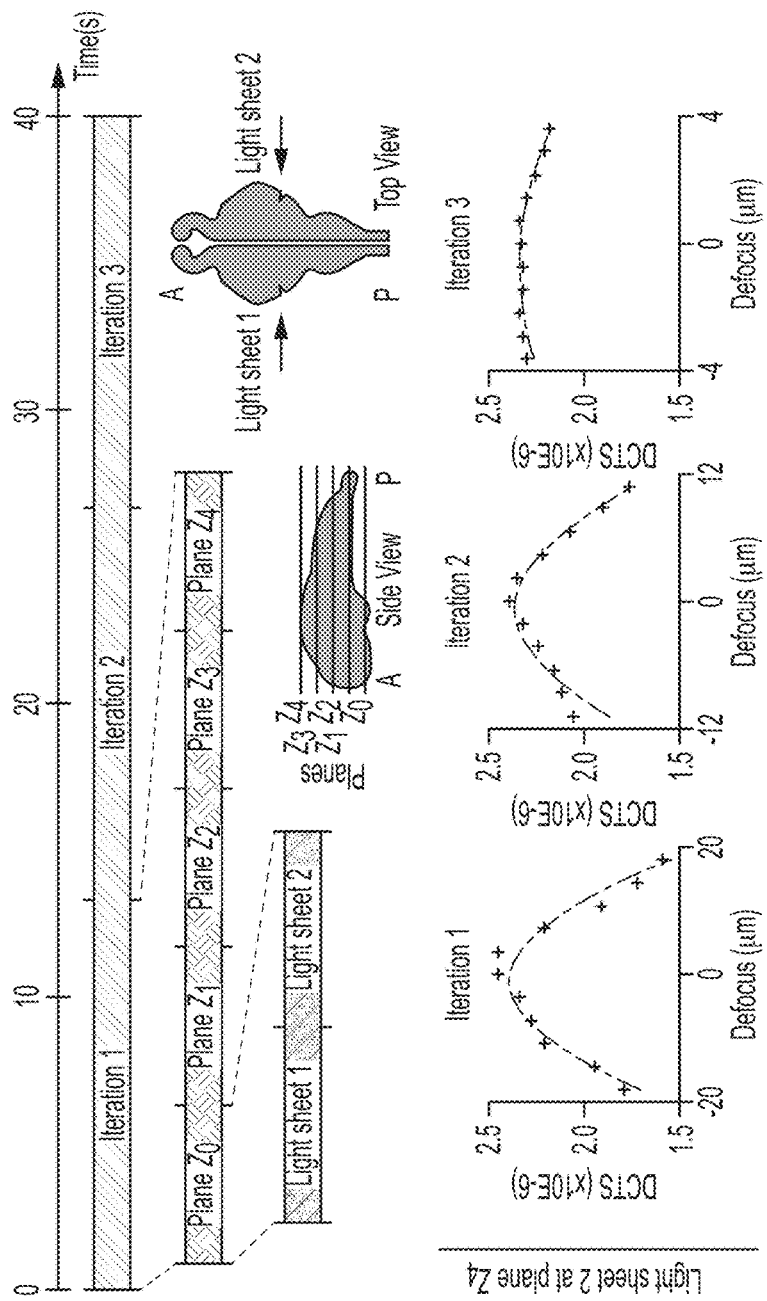
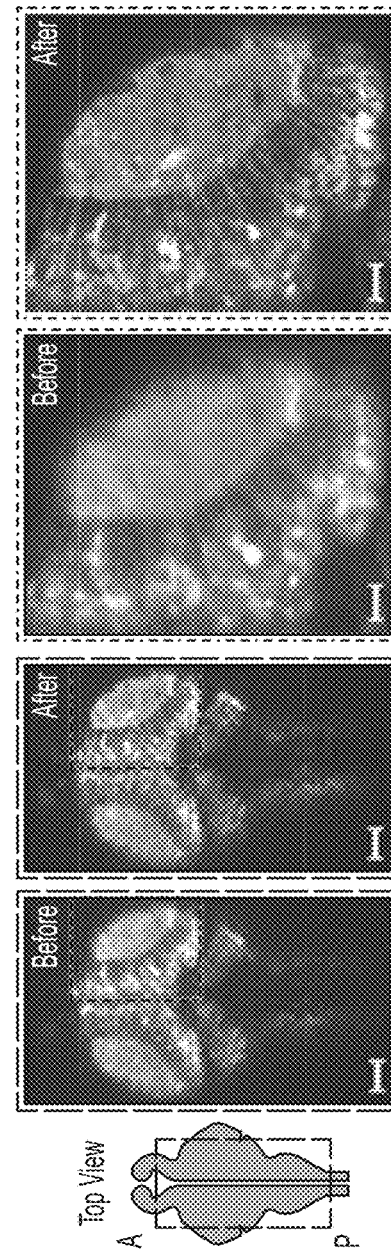
Fig. 20A
Fig. 20B
Fig. 20C

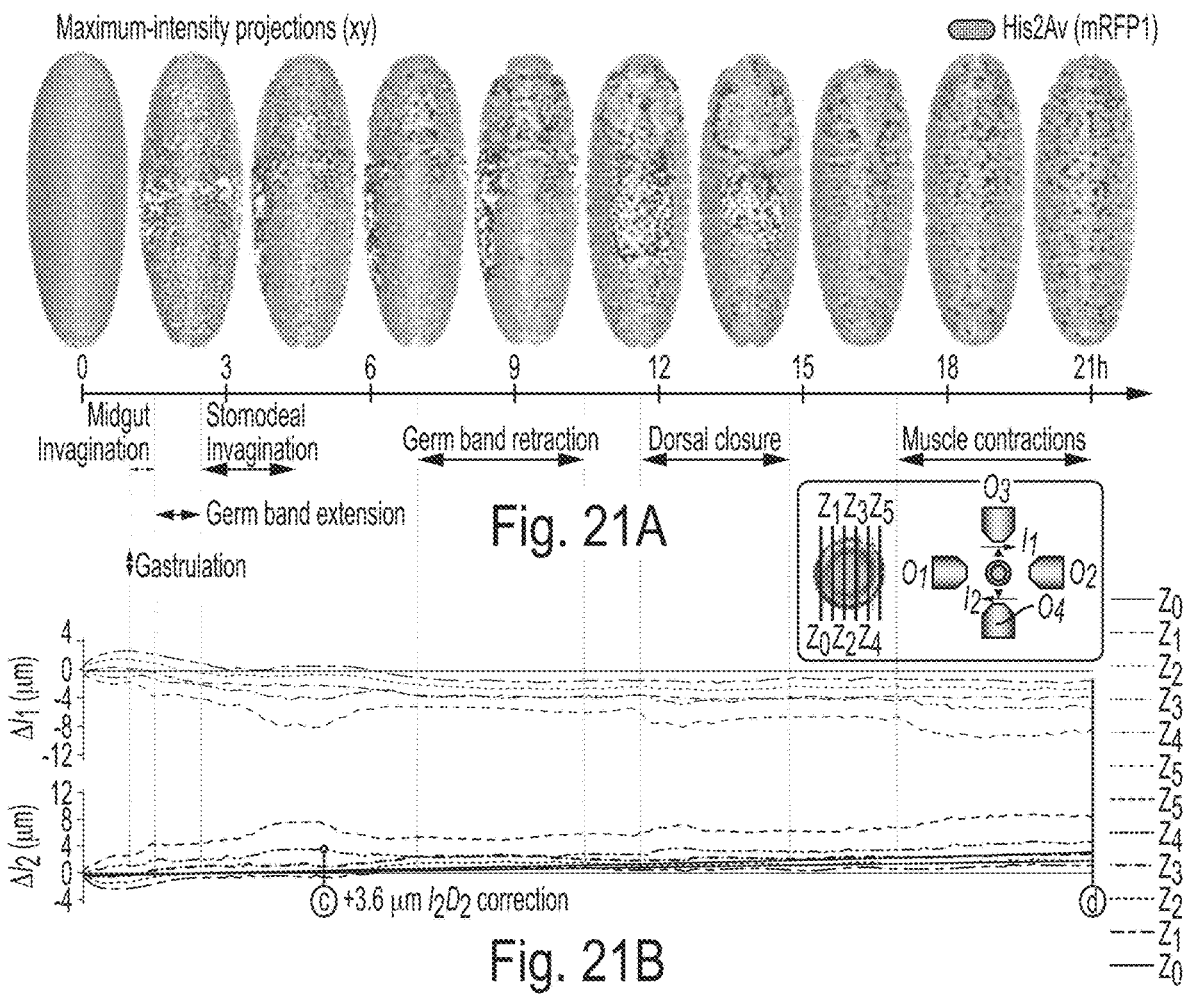
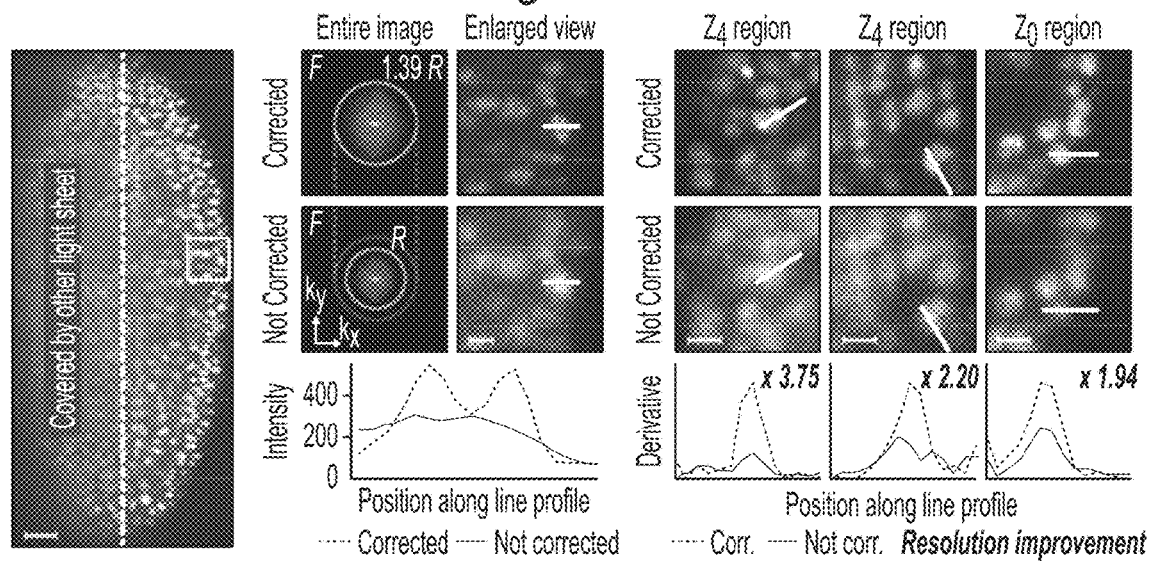
Fig. 21A  Fig. 21B  Fig. 21C  Fig. 21D

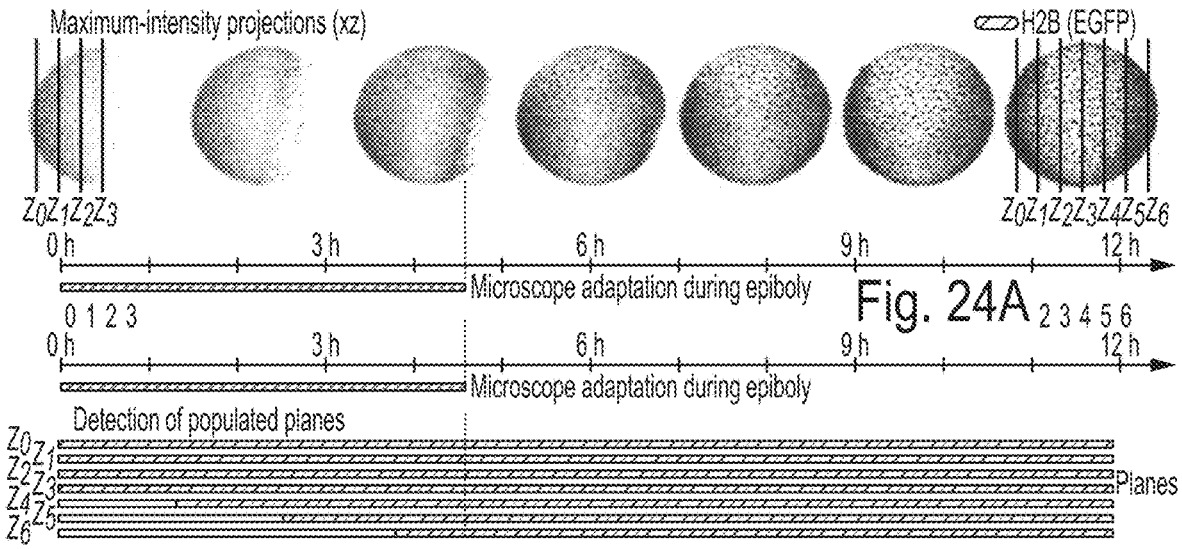
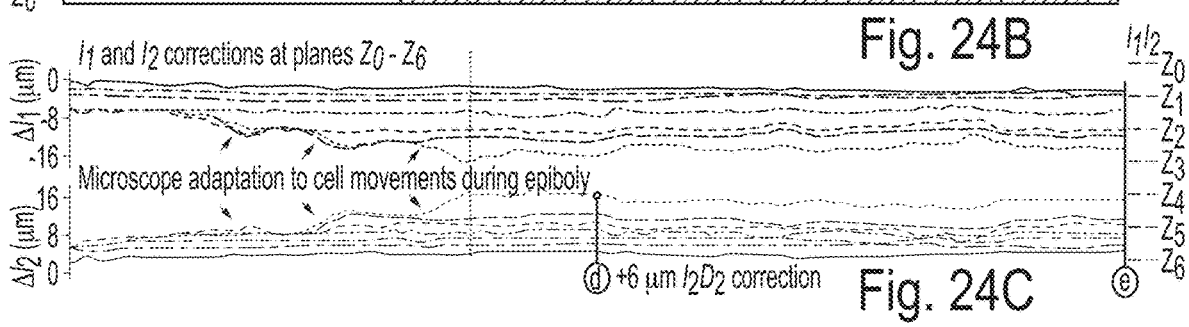
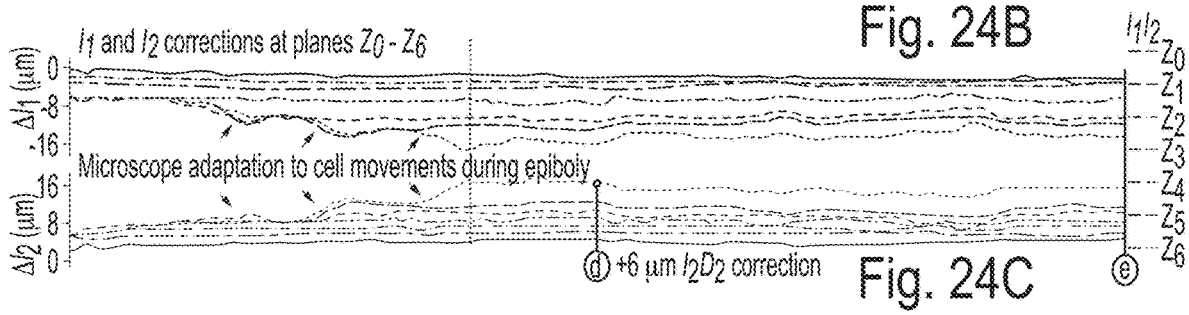
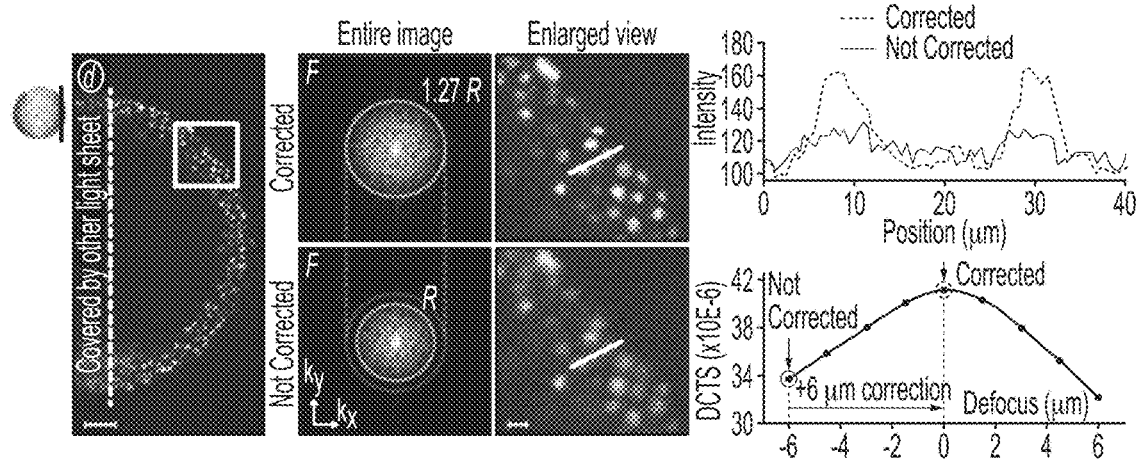
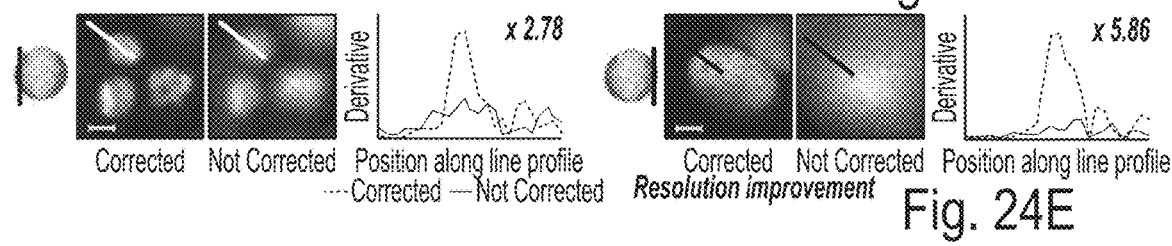

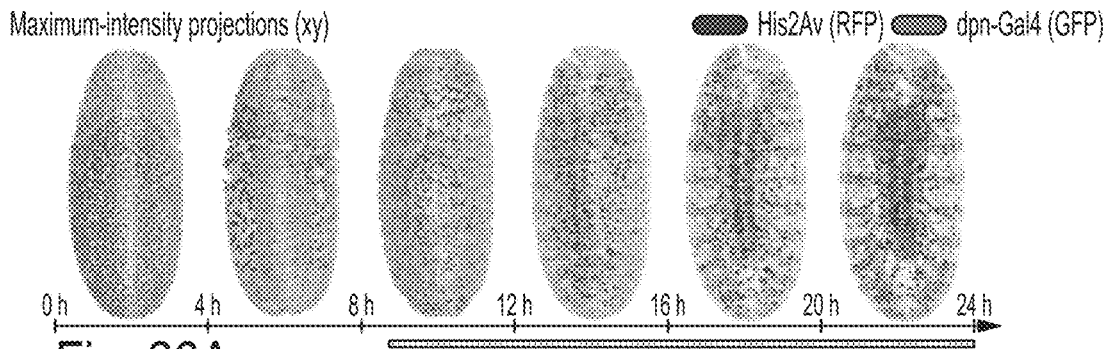
Fig. 26A
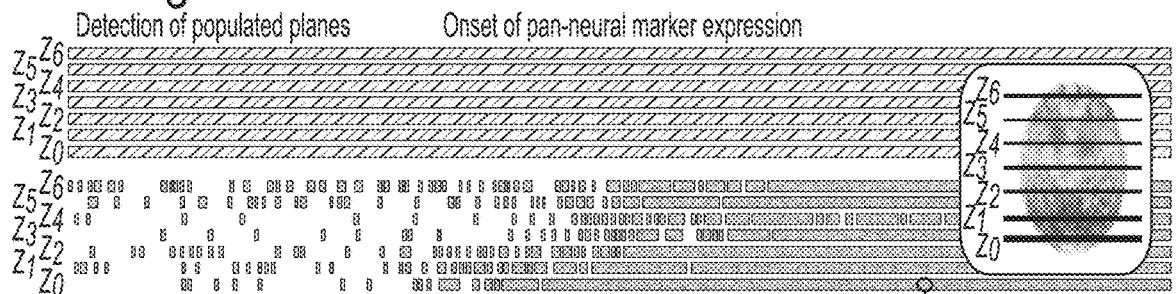
Fig. 26B
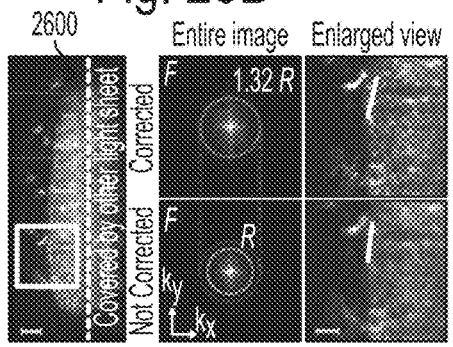
Fig. 26C
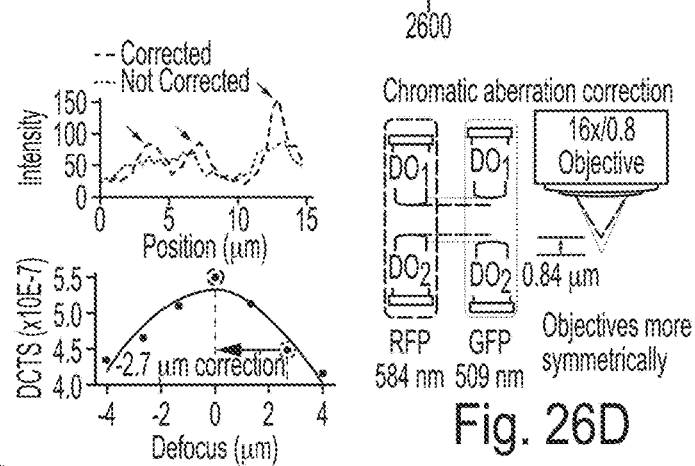
Fig. 26D
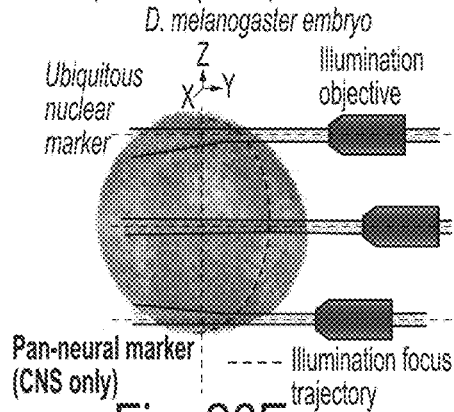
Fig. 26E
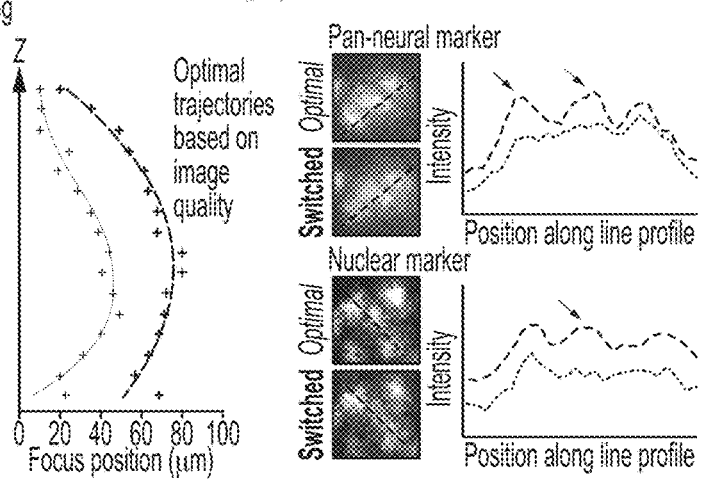

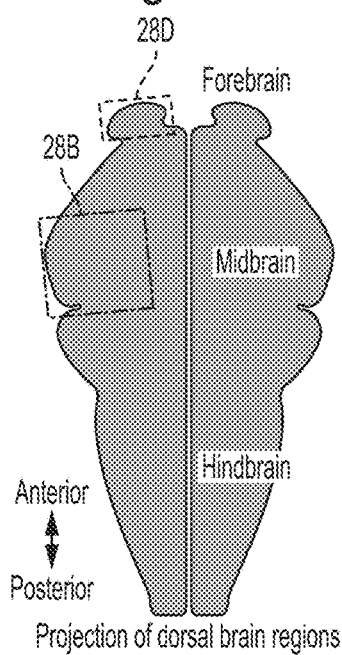
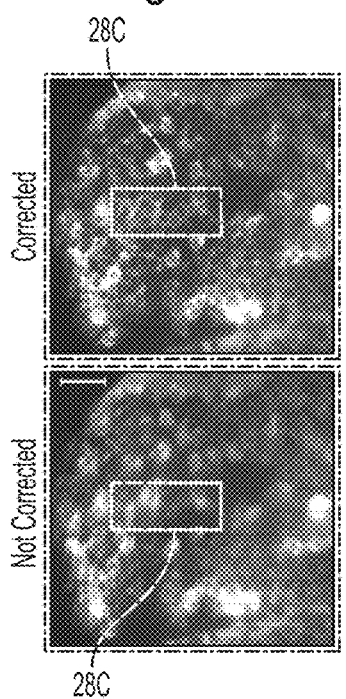
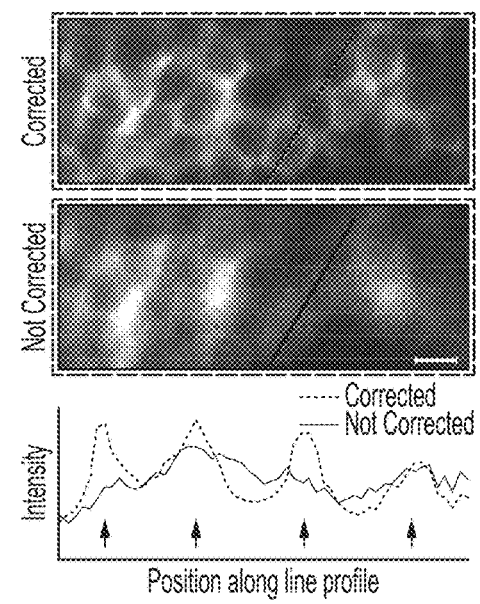
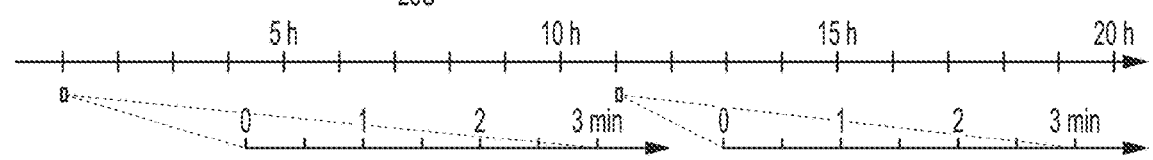
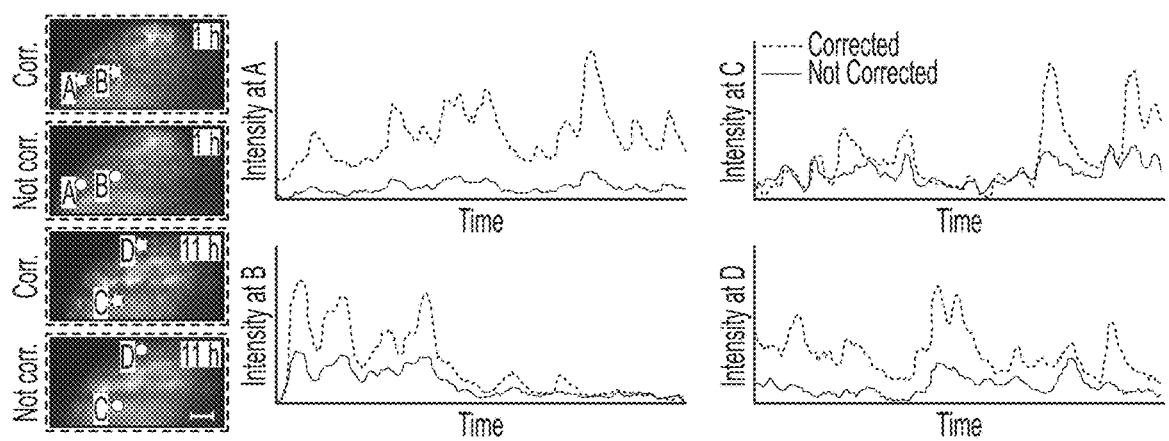
Fig. 28A
Fig. 28B
Fig. 28C
Fig. 28D

AUTOMATED ADJUSTMENT OF LIGHT SHEET GEOMETRY IN A MICROSCOPE

CROSS REFERENCE TO RELATED APPLICATIONS

This application is a continuation of U.S. application Ser. No. 16/309,057, which is a national phase of PCT/US2017/038970, filed Jun. 23, 2017, which claims priority to U.S. Application No. 62/354,384, filed Jun. 24, 2016 and to U.S. Application No. 62/447,154, filed Jan. 17, 2017. All of these applications are incorporated herein by reference in their entirety.

TECHNICAL FIELD

This description generally relates to light-sheet microscopy.

BACKGROUND

Light-sheet microscopy is a technique for imaging the development and function of biological systems. In order to successfully produce high-resolution images, these microscopes achieve overlap between a thin sheet of light used to illuminate the sample and the focal plane of the objective used to form an image. Whenever this overlap is not present, spatial resolution and image contrast suffer.

SUMMARY

In some general aspects, a method includes: imaging a sample using light-sheet imaging. The light-sheet imaging includes generating light, forming one or more light sheets from the light at one or more positions within the sample along respective illumination axes, and recording images of fluorescence emitted along a detection axis from the sample due to the optical interaction between the one or more light sheets and the sample. The method includes measuring one or more properties relating to the light-sheet imaging; analyzing the one or more measured properties; and adjusting one or more operating parameters associated with light-sheet imaging based on the analysis of the one or more measured properties.

Implementations can include one or more of the following features. For example, the sample can include a live biological specimen that remains living throughout light-sheet imaging and during the measurement of the one or more properties.

The one or more light sheets can be formed from the light at one or more positions within the sample by forming two light sheets from the light at one or more positions within the sample. A first light sheet extends along a first illumination axis and a second light sheet extends along a second illumination axis. The first illumination axis can be anti-parallel with the second illumination axis. The light sheets spatially and temporally overlap within the sample along an image plane, and optically interact with the sample within the image plane. The images of fluorescence can be recorded by recording, at each of a plurality of detection focal planes, images of the fluorescence emitted along the detection axis from the sample due to the optical interaction between the two light sheets and the sample. The temporal overlap between the light sheets can be within a time shift that is less than a resolution time that corresponds to a spatial resolution limit of the light-sheet imaging.

The one or more measured properties can be analyzed by analyzing the one or more measured properties without making any assumptions about the sample. The one or more properties can be analyzed without making any assumptions about the sample by analyzing the one or more properties without making any assumptions about: the physical properties of the sample, the optical properties of the sample, and the distribution and number of fluorescent markers within the sample.

The one or more properties relating to the light-sheet imaging can be measured by measuring one or more of: a quality of one or more recorded images, a position of the light sheet inside the sample, and an orientation of the light sheet inside the sample.

The one or more operating parameters associated with light-sheet imaging can be adjusted by adjusting one or more of: an angle between the light sheet and a detection focal plane at which the images of fluorescence along a detection axis are recorded, the one or more positions at which the light sheet is formed within the sample, and a relative position between the light sheet and the detection focal plane. The one or more operating parameters associated with light-sheet imaging can be adjusted by adjusting characteristics of one or more of: the one or more light sheets, the sample, and a focal plane at which the images of fluorescence are recorded.

The one or more properties relating to the light-sheet imaging can be measured by measuring the one or more properties at a time during which the images of fluorescence are not being recorded for performing the light-sheet imaging of the sample.

The one or more operating parameters associated with light-sheet imaging can be adjusted by rotating one or more light sheets relative to the sample. The one or more operating parameters associated with light-sheet imaging can be adjusted by translating one or more light sheets along a direction perpendicular to the illumination axis. The one or more operating parameters associated with light-sheet imaging can be adjusted by translating one or more light sheets along a direction parallel to the illumination axis. The one or more operating parameters associated with light-sheet imaging can be adjusted by translating a waist of a light sheet along the illumination axis. The one or more operating parameters associated with light-sheet imaging can be adjusted by translating a focal plane at which the images of fluorescence are recorded along the detection axis.

The one or more properties relating to the light-sheet imaging can be measured by: forming an image of a portion of the sample that is illuminated by the light sheet; and quantifying a quality of the formed image.

The method can include creating a structured light sheet. The one or more properties relating to the light-sheet imaging can be measured by measuring one or more properties relating to imaging of the sample with the structured light sheet. The structured light sheet can be created by modulating a property of the formed light sheet at a frequency. The frequency of modulation can be determined based on an optical transfer function associated with performing light-sheet imaging. The property of the formed light sheet can be modulated at the frequency by modulating an intensity of the light sheet at the frequency as a function of spatial location within the image plane.

The one or more properties relating to the light-sheet imaging can be measured by forming an image of a portion of the sample that is illuminated by the light sheet, the image including light radiating from a set of fluorescent markers within the sample; and measuring the property at each formed image in a plurality of formed images. Each formed image can correspond to a distinct portion of the sample that is illuminated by the light sheet. The image of the sample portion that is illuminated by the light sheet can be formed by forming the image of the sample portion at which images of fluorescence are recorded for performing light-sheet imaging.

The one or more operating parameters associated with light-sheet imaging can be adjusted by adjusting a relative position between the light sheet and a focal plane defined by the location at which images are recorded. The light sheet can be formed by scanning the light along a scanning direction that is normal to the illumination axis to form the light sheet in a plane defined by the scanning direction and the illumination axis.

The one or more properties relating to the light-sheet imaging can be measured by selecting at least one reference region of the sample; changing at least one operating parameter relating to the light-sheet imaging to a set of discrete values; and, for each value of the operating parameter in the set and at the selected reference region: recording an image of fluorescence emitted from the reference region; and determining a quality of each recorded image. The one or more measured properties can be analyzed by observing which operating parameter value in a range of operating parameter values at the selected reference region produces the recorded image with the highest quality; and storing a quantity associated with the observation for the operating parameter for this reference region. The quality of a recorded image can be determined by applying an image quality metric to the recorded image to produce a real number that represents the quality of the recorded image.

The range of parameter values can be based on the set of discrete values of the at least one operating parameter. The method can include determining how to adjust the one or more operating parameters associated with light-sheet imaging based on the stored quantity, and this determination can be based on one or more constraints that limit how the one or more operating parameters can be adjusted.

The at least one operating parameter relating to light-sheet imaging can be changed by changing one or more of a plane of the light sheet and/or a focal plane at which the images of fluorescence are recorded.

At least one reference region of the sample can be selected by selecting a plurality of reference regions of the sample. The at least one operating parameter relating to light-sheet imaging can be changed by adjusting at least a first operating parameter relating to light-sheet imaging. The one or more operating parameters associated with light-sheet-imaging can be adjusted by adjusting at least a second operating parameter that is distinct from the first operating parameter. The method can include determining how to adjust the second operating parameter based on the stored quantities associated with the observation for the operating parameter for each reference region in the plurality of reference regions.

The second operating parameter can be adjusted by adjusting an angle between the light sheet and the focal plane. The observation of which operating parameter value in the range of operating parameter values at the selected reference region produces the recorded image with the highest quality can be an observation of which focal plane at which fluorescence is detected produces the recorded image with the highest quality. The quantity associated with the observation that is stored can be a position in three dimensional space that is defined by the set of: a value at which the focal plane is positioned along a z direction and the corresponding reference region defined in the xy plane. The determination of how to adjust an angle between the light sheet and the focal plane can be a determination of a most likely plane passing through each the stored position in three dimensional space.

The at least one reference region of the sample can be selected by: selecting a set of z reference positions in a z direction from a detection focal plane; and for each z reference position in the set, selecting a plurality of reference regions defined in the xy plane that is perpendicular to the z direction, wherein each of the reference regions is distinct from other reference regions.

In other general aspects, a microscope system includes at least one illumination subsystem, at least one detection subsystem, and a control system connected to the at least one illumination subsystem and the at least one detection subsystem. The illumination subsystem includes a light source and a set of illumination optical devices arranged to produce and direct a light sheet along an illumination axis toward a sample, and a set of actuators coupled to one or more illumination optical devices, The detection subsystem includes a camera and a set of detection optical devices arranged to collect and record images of fluorescence emitted from the sample along a detection axis, and a set of actuators coupled to one or more of the camera and the detection optical devices. The control system is configured to: receive a measurement of one or more properties relating to light-sheet imaging with the at least one illumination subsystem and the at least one detection subsystem; analyze the one or more measured properties; and send a control signal to one or more actuators of the at least one illumination subsystem and the at least one detection subsystem based on the analysis.

Implementations can include one or more of the following features. For example, the sample can include a live biological specimen.

The at least one illumination subsystem can include two illumination subsystems, each illumination subsystem arranged to direct the light sheet along a respective illumination axis, the illumination axes being anti-parallel with each other. The light sheets can spatially and temporally overlap within the sample along an image plane, and optically interact with the sample within the image plane; and the temporal overlap between the light sheets is within a time shift that is less than a resolution time that corresponds to a spatial resolution limit of the microscope system.

The at least one detection subsystem can include two detection subsystems, each defining a detection axis, the detection axes being anti-parallel with each other.

The actuators of the at least one illumination subsystem can include: an actuator configured to translate the light sheet about a transverse offset with respect to the illumination axis; an actuator configured to translate the light sheet about a longitudinal offset with respect to its position within the sample; an actuator configured to rotate the light sheet through an angle about the illumination axis; and an actuator configured to rotate the light sheet through an angle about a direction normal to the illumination axis. The illumination subsystem can include a scanning apparatus that is configured to scan light along a scanning plane to form the light sheet, the scanning plane being defined by the illumination axis and the normal direction about which the light sheet is rotated.

The at least one detection subsystem can include: an objective lens configured to produce an image of the sample illuminated by the light sheet in an image plane; and a detector configured to detect, in the image plane, the image of the sample illuminated by the light sheet. The actuators of the at least one detection subsystem can include an actuator configured to translate the objective lens along the detection axis to thereby move the image plane.

The sample can include a set of fluorescent markers; and the image of the sample illuminated by the light sheet is produced by the set of fluorescence markers radiating light of a fluoresced wavelength, the fluoresced wavelength being distinct from a wavelength of the light sheet.

The one or more of the actuators can include one or more of a piezo electric actuator and a galvanometer scanner.

The control system can be configured to analyze the recorded images of fluorescence and to create an image of the specimen based on the analysis. The measurement of one or more properties relating to light-sheet imaging can occur during a period that happens between recording images of fluorescence used for creating the image of the sample. The one or more received properties can be recorded images of fluorescence, and the control system can be configured to analyze the recorded images by generating an image quality metric based on the recorded images.

In other general aspects, a microscope includes: a source of light configured to produce light having a specified wavelength; illumination optics configured to form the light into a light-sheet at a position within a sample along an optical axis in the microscope; a first controller configured to translate the light sheet about a transverse offset with respect to the optical axis; a second controller configured to translate the light sheet about a longitudinal offset with respect to the position within the sample; a third controller configured to rotate the light sheet through a roll angle about the optical axis; and a fourth controller configured to rotate the light sheet through a yaw angle about a direction normal to the optical axis.

Implementations can include one or more of the following features. The source of light can be a laser. The light produced by the laser can include a beam having a Gaussian profile through a cross-section of the beam, the beam having a waist at a location along the optical axis where the Gaussian profile of the beam has a minimum width. The second controller that is configured to translate the light sheet about the longitudinal offset with respect to the position in the sample can be configured to move the waist of the beam along the optical axis.

The third controller that is configured to rotate the light sheet through the roll angle about the optical axis can include a dual-axis galvanometer scanner.

The fourth controller that is configured to rotate the light sheet through a yaw angle about the direction normal to the optical axis can include a dual-axis pivot galvanometer scanner having a vertical tilting mirror and a lateral tilting mirror. The vertical tilting mirror is configured to angularly displace the light in a first direction Ox relative to the optical axis. The lateral tilting mirror is configured to angularly displace the light in a second direction Oz relative to the optical axis. The second direction is normal to the first direction, and the yaw angle is an aggregation of Ox and Oz. The fourth controller that is configured to rotate the light sheet through a yaw angle about the direction normal to the optical axis can include two relay lenses. The dual-axis pivot galvanometer scanner can be positioned at a focal-distance between two relay lenses such that the collimated beam from the laser is focused onto the vertical scanning mirror by the first relay lens, and the second relay lens restores collimation and directs the beam onto the dual-axis light-sheet galvanometer scanner.

The microscope can also include: an objective lens configured to produce an image of the sample illuminated by the light sheet in an image plane; a detector configured to detect, in the image plane, the image of the sample illuminated by the light sheet; and a fifth controller configured to translate the detector along the optical axis. The sample can include a set of fluorescent markers. The image of the sample illuminated by the light sheet can be produced by the set of fluorescent markers radiating light of a fluoresced wavelength into the objective lens. The fluoresced wavelength can be different than the specified wavelength.

The microscope can include an adaptive controlling mechanism configured to control each of the first controller, the second controller, the third controller, the fourth controller, and the fifth controller according to an optimization of an image quality metric of the image. The adaptive controlling mechanism can be configured to perform a convolution operation on the image with a Gaussian kernel function prior to a performance of the optimization of the image quality metric. The image quality metric can be invariant to affine transformations of intensities of pixels of the image. The image quality metric can depend only on spatial frequencies that can pass through an optical band pass. The image quality metric can include a spectral image quality metric. The spectral image quality metric can include a Normalized Discrete Cosine Transform (DCT) Shannon Entropy metric. The adaptive controlling mechanism, in performing the optimization of the image quality metric, can perform a low-pass filter configured to suppress spatial frequencies outside of a square of side $2r_p$ centered at a frequency origin, the quantity $r_p = w(I)/r_o$ being a radius of a point spread function of the objective lens, where w is the width of a square image I in the image plane and $r_o$ being a support radius of an optical transfer function (OTF) of the microscope.

The fifth controller can include a piezo actuator, the piezo actuator being configured to move the objective lens.

The source of light and the illumination optics can be further configured to form the light into a second light-sheet at a second position within a sample along the optical axis in the microscope. The microscope can include: a second objective lens configured to produce a second image of the sample illuminated by the second light sheet in a second image plane; a second detector configured to detect, in the second image plane, the second image of the sample illuminated by the second light sheet; a sixth controller configured to translate the second light sheet about a second transverse offset with respect to the optical axis; a seventh controller configured to translate the second light sheet about a second longitudinal offset with respect to the second position within the sample; a eighth controller configured to rotate the second light sheet through a second roll angle about the optical axis; a ninth controller configured to rotate the second light sheet through a second yaw angle about a second direction normal to the optical axis; and a tenth controller configured to translate the second detector along the optical axis.

In other general aspects, a method includes: generating, in a microscope, light having a specified wavelength; forming a light-sheet from the light at a position within a sample along an optical axis in the microscope; forming an image of a portion of the sample that was illuminated by the light-sheet; generating an image metric based on the formed image; and based on the image metric, adjusting the light sheet by (i) translating the light sheet in a direction transverse to the optical axis, (ii) translating the light sheet in a direction along to the optical axis, (iii) rotating the light sheet through a roll angle about the optical axis, and (iv) rotating the light sheet through a yaw angle about a direction normal to the optical axis.

In further general aspects, a computer program product includes a nontransitory storage medium, the computer program product including code that, upon execution of the computer program product on an electronic device, causes the electronic device to perform a method. The method includes: generating an image metric based on an image of a sample in a microscope at a position within the sample illuminated with a light-sheet along an optical axis; and based on the image metric, adjusting the light sheet by (i) translating the light sheet in a direction transverse to the optical axis, (ii) translating the light sheet in a direction along to the optical axis, (iii) rotating the light sheet through a roll angle about the optical axis, and (iv) rotating the light sheet through a yaw angle about a direction normal to the optical axis.

The automated spatiotemporal adaptive system improves spatial resolution and signal strength two to five-fold, recovers cellular and sub-cellular structures in many regions that are not resolved by non-adaptive imaging, adapts to spatiotemporal dynamics of genetically encoded fluorescent markers and robustly optimizes imaging performance during large-scale morphogenetic changes in living organisms.

The automated spatiotemporal adaptive system is suited to high-resolution imaging of living specimens because it maintains high light-efficiency and maintains high spatial resolution (including high axial resolution and high lateral resolution).

DESCRIPTION OF DRAWINGS

FIG. 3 is a schematic illustration showing the four primary views of the microscope system of FIG. 1;

FIG. 4A is a perspective view of a specimen being imaged at a set of reference planes by the microscope system of FIG. 1;

FIG. 4B is a perspective view of the specimen of FIG. 4A within a support matrix mounted to a holder;

FIG. 5B is a perspective view of the specimen being imaged with light sheets produced by the optical microscope;

FIG. 5C is a side cross-sectional view of the specimen of FIG. 5B taken along the XZ plane as the specimen is being imaged with a light sheet and showing a change in an operating parameter I(ls) of the optical microscope;

FIG. 5D is a top cross-sectional view of the specimen of FIG. 5B taken along the ZY plane as the specimen is being imaged with a light sheet and showing a change in an operating parameter D(fp) of the optical microscope;

FIG. 5E is a side cross-sectional view of the specimen of FIG. 5B taken along the XZ plane as the specimen is being imaged with a light sheet and showing a change in an operating parameter α(ls) of the optical microscope;

FIG. 5F is a top cross-sectional view of the specimen of FIG. 5B taken along the ZY plane as the specimen is being imaged with a light sheet and showing a change in an operating parameter β(ls) of the optical microscope;

FIG. 5G is a top cross-sectional view of the specimen of FIG. 5B taken along the ZY plane as the specimen is being imaged with a light sheet and showing a change in an operating parameter Y(ls) of the optical microscope;

FIG. 6 is a schematic illustration showing an implementation of a process workflow performed by the adaptive system of FIG. 1;

FIG. 10A is a block diagram of an implementation of one of the illumination subsystems of the optical microscope of FIG. 1;

FIG. 10B is a block diagram showing the path of the light beam in a pivot optical arrangement of the illumination subsystem of FIG. 10A;

FIG. 10C is a block diagram of the implementation of the illumination subsystem FIG. 10A in which the light beam has been pivoted off of a central axis with the pivot optical arrangement;

FIG. 10D is a block diagram showing the path of the light beam in the pivot optical arrangement of the illumination subsystem of FIG. 10C;

FIG. 16A shows a representation of a constraint graph used by the computation framework of FIG. 1 for defining relationships between two or more of the operating parameters of the optical microscope;

FIG. 16B shows a matrix that describes a linear relationship between a state variable of the optical microscope of FIG. 1 and defocus and constraint relationships;

FIG. 16C shows an illustration of an example of a constraint that is a system anchoring constraint that defines a fixed center of mass of the positions of detection objectives of the optical microscope of FIG. 1, such constraint required to prevent drive of the center of mass of the optical microscope of FIG. 1;

FIG. 16D shows an illustration of an example of a constraint that adjusts values of parameters if the fluorescence signal produced in the optical microscope of FIG. 1 is too weak during an experiment;

FIG. 17A is a graph of an output from an image quality metric as a function of time during an experiment of Drosophila embryogenesis, in which perturbations of detection objective positions and offsets of the light sheets of the optical microscope of FIG. 1 are introduced manually;

FIG. 17B is a graph showing several operating parameters of the optical microscope of FIG. 1 as a function of time for a reference plan as the perturbations of FIG. 17A are performed;

FIGS. 17C, 17D, and 17E show maximum-intensity projections output from a detection subsystem of the optical microscope of FIG. 1 at specific times during the experiment of FIG. 17A;

FIG. 18A shows a cross-sectional view through a specimen imaged by the optical microscope of FIG. 1, in which the angle θ of the light sheet inside the specimen changes at each image plane as a result of refraction at the interface between the specimen and the matrix;

FIG. 18B shows a cross-sectional view through the specimen of FIG. 18A illustrating how not all regions of the specimen illuminated by the light sheet are in focus simultaneously even though the light sheet and detection focal planes are co-planar outside the specimen but tilted with respect to each other inside the specimen;

FIG. 18C shows images of the specimen that illustrate how measuring and correcting angular mismatches between the light sheets and detection focal planes improves spatial resolution in the optical microscope of FIG. 1;

FIG. 20A shows a graph of a time line of optimization of the optical microscope as it images a brain of a larval zebrafish, in which three iterations of optimization are performed;

FIG. 20B shows graphs showing a focus dependency of an image quality metric for the light sheet at a specific reference plane during each of the iterations of FIG. 20A;

FIG. 20C shows exemplary images output from the optical microscope of FIG. 1 as the optimizations of FIGS. 20A and 20B are performed;

FIG. 21A shows a dorsoventral maximum-intensity image projection of a D. melanogaster embryo expressing RFP in a time-lapse experiment in which the adaptive system of FIG. 1 performs spatiotemporal adaptive imaging;

FIG. 21B shows a graph illustrating real-time corrections of the positions of light sheets relative to respective detection focal planes as a function of time and spatial location in the embryo of FIG. 21A;

FIG. 21C shows an image that demonstrates that spatial resolution and image quality in the imaging of the embryo of FIGS. 21A and 21B is improved using the spatiotemporal adaptive imaging;

FIG. 21D shows a side-by-side comparison of image quality and spatial resolution in a representative regions of an image for adaptively corrected (top row) and uncorrected (middle row) microscope states;

FIG. 24A shows a series of lateral maximum-intensity projections of a D. rerio embryo expressing GFP in cell nuclei in a time-lapse experiment performed by the optical microscope of FIG. 1;

FIG. 24B shows how the computation framework of the optical microscope automatically flags reference locations lacking fluorescence signal (gray lines) and monitors the emergence of a fluorescence signal as a function of time and spatial location in the specimen (thick blue lines) of FIG. 24A;

FIG. 24C show plots visualizing real-time corrections of the positions of the two light sheets (green and orange) relative to the respective detection focal planes as a function of time and spatial location in the embryo of FIG. 24A;

FIG. 24D show image data for the spatial location marked in FIG. 24C at 6 hours along with a Fourier analysis of the data (second column) acquired with (top) and without (bottom) corrections to the optical microscope computed by the computation framework of the adaptive system of FIG. 1;

FIG. 24E show side-by-side comparisons of image quality and spatial resolution in two representative image regions for adaptively corrected and uncorrected operating parameters of the optical microscope at the end of epiboly;

FIG. 26A shows dorsoventral maximum-intensity image projections of a D. melanogaster embryo expressing RFP, representing a 20 hour time-lapse experiment using the adaptive system of FIG. 1;

FIG. 26B is a graph that shows automatic detection of the onset of the expression of pan-neural marker using the adaptive system of FIG. 1;

FIG. 26C show exemplary image data for the spatial location marked in FIG. 26B at 18.5 hours with a Fourier analysis of the image data (second column) acquired with (top) and without (bottom) corrections to the operating parameters of the optical microscope of FIG. 1;

FIG. 26D is a schematic illustration of an implementation of the detection subsystem that uses a Nikon 16x/0.8 objective;

FIG. 26E shows a cross-sectional view of the embryo of FIG. 26A in which the adaptive system optimizes the position of the beam waist of the illuminating light sheet by real-time adjustment of the illumination objectives during imaging (left) and an analysis of the trajectory of the illumination focus for each color channel;

FIG. 28A shows a schematic drawing of a dorsal half of a zebrafish larval brain as viewed from a dorsal perspective that is an example of a specimen to be imaged by the microscope system of FIG. 1;

FIG. 28B shows a side-by-side comparison of image quality and spatial resolution in adaptively corrected and uncorrected image data of the region marked 28B in FIG. 28A after 11 hours of imaging with the microscope system of FIG. 1;

FIG. 28C shows top and enlarged view of the region marked 28C in FIG. 28B; and

FIG. 28D shows a close-up of the region marked 28D in FIG. 28A for corrected (blue) and uncorrected (red) microscope states and for two versions of the imaging performed by the microscope system of FIG. 1.

DETAILED DESCRIPTION

Figure 1:
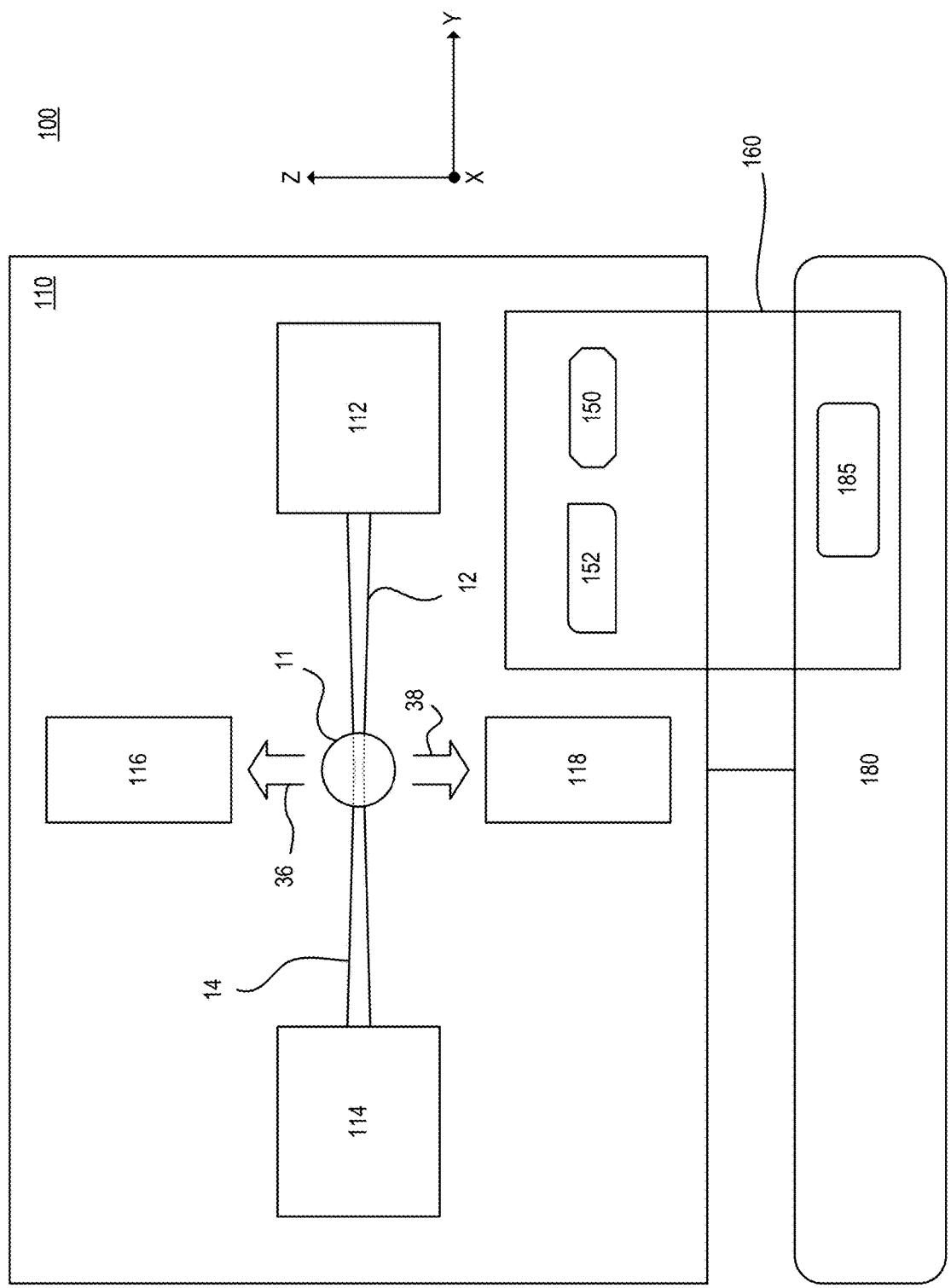
FIG. 1 is a block diagram of a microscope system that includes an automated spatiotemporal adaptive system integrated within an optical microscope.

Referring to FIG. 1, a microscope system 100 is designed for imaging of a sample or specimen 11 in its entirety and includes an automated spatiotemporal adaptive system 160 that operates within an optical microscope 110. The optical microscope 110 is a multi-view light-sheet microscope that images the specimen 11 using light-sheet imaging. The automated spatiotemporal adaptive system 160 turns the optical microscope 110 into a smart light-sheet microscope that is capable of substantially improving spatial resolution of the light-sheet imaging of the specimen 11 by continuously and automatically adapting to the dynamic optical conditions encountered in specimens that change during the course of the light-sheet imaging. The process of light-sheet imaging of the specimen 11 can be referred to herein as the primary light-sheeting imaging of the specimen 11 or the time-lapse light-sheet imaging experiment while the adaptive aspects performed by the adaptive system 160 can be referred to herein as the spatiotemporal adaptive imaging.

The specimen 11 can be a complex and living biological specimen 11 such as a developing embryo. For example, the complex biological specimen 11 can start off as a fertilized egg; in this case, the microscope system 100 can capture the transformation of the entire fertilized egg into a functioning animal, including the ability to track each cell in the embryo that forms from the fertilized egg as it takes shape over a period of time on the scale of hours or days. The microscope system 100 can provide a compilation of many images captured over the course of hours to days, depending on what is being imaged, to enable the viewer to see the biological structures within the embryo that begin to emerge as a simple cluster of cells morph into an elongated body with tens of thousands of densely packed cells. The microscope system 100 uses light-sheet microscopy technology that provides simultaneous multiview imaging, which eliminates or reduces spatiotemporal artifacts that can be caused by slower sequential multiview imaging. Additionally, because only a thin section (for example, on the order of a micrometer (μm) wide taken along the Z axis) of the specimen 11 is illuminated at a time with a scanned sheet of laser light while a detector records the part of the specimen 11 that is being illuminated, damage to the specimen 11 is reduced. No mechanical rotation of the specimen 11 is required to perform the simultaneous multiview imaging.

The microscope system 100 includes the optical microscope 110 (which is the multiview light-sheet microscope) and a control system 180. The optical microscope 110 and the control system 180 are configured to exchange information with each other. In general, the optical microscope 110 is made up of a plurality of light sheets (for example, light sheets 12, 14) that illuminate the specimen 11 from distinct and respective illumination directions that lie along an illumination axis, and a plurality of detection subsystems (for example, detection subsystems 116, 118) that collect the resulting fluorescence along a plurality of detection directions or views that are parallel with a detection axis. In the example that follows, two light sheets 12, 14 are produced in respective illumination subsystems 112, 114, which illuminate the specimen 11 from opposite directions, which are referred to as light sheet directions or illumination directions, and which are parallel with the illumination axis. The respective detection subsystems 116, 118 collect the resulting fluorescence 36, 38 along two detection views (or detection directions) defined by the orientation of respective detection objectives and the detection directions are parallel with a detection axis. In this particular example, a light sheet direction is defined by the direction along which that light sheet 12, 14 is traveling as it enters the specimen 11 and the detection direction is defined by the orientation of the respective detection objective of the detection subsystem 116 or 118 relative to the specimen 11. Thus, in this example, the light sheet directions are parallel with a Y axis, which is the illumination axis; and the detection directions are parallel with a Z axis, which is the detection axis and is perpendicular to the Y axis. The X, Y, and Z axes define an absolute coordinate system of the optical microscope 110.

Figure 2:
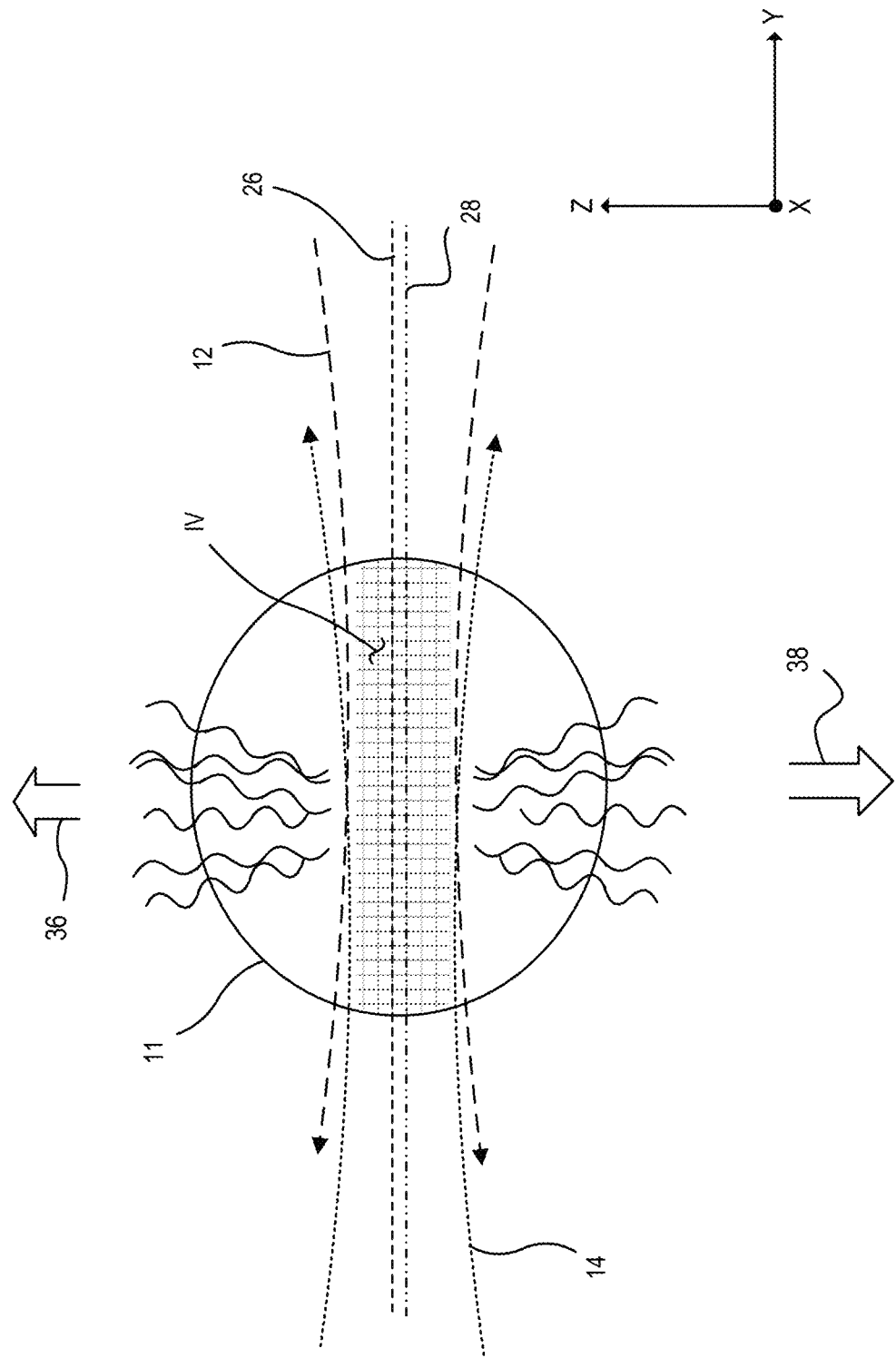
FIG. 2 is a schematic illustration showing a specimen imaged using the microscope system of FIG. 1.

As shown in more detail in FIG. 2, the thin section (for example, on the order of a micrometer (μm) wide taken along the Z axis) of the specimen 11 is illuminated at a time with a sheet of laser light 12 or 14. For example, the light sheet 12 is directed along the +Y axis and the light sheet 14 is directed along the −Y axis. Each light sheet 12, 14 also has an extent along the X axis and a smaller extent along the Z axis so that a planar region of each light sheet 12, 14 coincides or traverses the specimen 11. The extent along the Z axis is much smaller than the extent of the light sheet 12, 14 along either the X or Y axes, and this Z-axis extent is thinnest at the waist of the light sheet 12, 14.

The light sheets 12, 14 spatially overlap and temporally overlap each other within the specimen 11 along an image volume IV that extends along the Y-X plane, and optically interact with the specimen 11 within the image volume IV. The temporal overlap is within a time shift or difference that is less than a resolution time that corresponds to the spatial resolution limit of the optical microscope 110. In particular, this means the light sheets 12, 14 overlap spatially within the image volume IV of the specimen 11 at the same time or staggered in time by the time difference that is so small that any displacement of tracked cells within the biological specimen 11 during the time difference is significantly less than (for example, an order of magnitude below) a resolution limit of the microscope 110, where the resolution limit is a time that corresponds to a spatial resolution limit of the optical microscope 110.

In some implementations, the light sheet 12, 14 is formed by scanning or deflecting a light beam across the X axis. As another example, the light sheet 12, 14 is formed instead by directing a laser beam through a cylindrical lens oriented with its curvature along the Z axis to thereby focus the light sheet 12, 14 along the Z axis but leave it unchanged along the X axis.

The light sheet 12, 14 is adjusted by components within the respective illumination subsystem 112, 114 so that the waist of the light sheet 12, 14 lies within the specimen 11 as shown in FIG. 2. The waist of the light sheet 12, 14 is the thinnest part of the light sheet 12, 14 in the direction of the Z axis. A planar region of the light sheet 12, 14 can be defined by the X and Y axes, and the planar regions of the light sheets 12, 14 slice through the specimen 11. The light sheet 12, 14 (specifically, the planar region of the light sheet 12, 14) illuminating the specimen 11 and a focal region of the orthogonally-oriented detection objective (within respective detection subsystems 116, 118) must overlap with each other within the specimen 11 in order for the detection subsystems 116, 118 to efficiently collect the fluorescence 36, 38 emitted from the specimen 11.

In this example, the microscope system 100 provides near-complete coverage with the acquisition of four complementary (and different) optical views. For example, referring to FIG. 3, the first view (View 1) comes from the detection system 116 detecting the fluorescence 36_2 emitted due to the interaction of the light sheet 12 with the specimen 11; the second view (View 2) comes from the detection system 116 detecting the fluorescence 36_4 emitted due to the interaction of the light sheet 14 with the specimen 11; the third view (View 3) comes from the detection system 118 detecting the fluorescence 38_2 emitted due to the interaction of the light sheet 12 with the specimen 11; and the fourth view (View 4) comes from the detection system 118 detecting the fluorescence 38_4 emitted due to the interaction of the light sheet 14 with the specimen 11.

The microscope system 100 uses light-sheet fluorescence microscopy, which enables live imaging of biological specimens 11, offering excellent spatial and temporal resolution and facilitating long-term observation of biological processes within the specimen 11 under physiological conditions. The biological specimen 11 is living, and therefore has complex optical properties that are not only heterogeneous in space but also dynamic in time. This complexity typically leads to significant, spatiotemporally variable mismatches between the planar region defined by the light sheet 12, 14 and the imaging plane defined by the focal regions of the detection systems 116, 118. Although it is feasible to achieve high spatial resolution close to the diffraction limit in small, transparent specimens 11, such as individual cells in culture or at the surface of multi-cellular organisms, it can be difficult to achieve high-resolution images of larger, more optically challenging specimens such as entire embryos. These challenges are directly linked to the principle requirement in light-sheet microscopy that the planar region of the light sheet 12, 14 overlap the focal region of detection objectives in the detection systems 116, 118. As a first-order approximation, the planar region of the light sheet 12, 14 can be considered as a light-sheet plane (for example, parallel with the X-Y plane) and the focal region of the detection objective can be considered as a focal plane (such as focal planes 26, 28 shown in FIG. 2); then the light sheet planes must be co-planar with the focal planes of the detection objectives. Whenever and wherever this spatial relationship is violated, spatial resolution and image quality are degraded.

Thus, optimal image quality in microscopy that uses light sheets 12, 14 requires an overlap between the plane of the illuminating light sheet 12, 14 and the focal plane 26, 28 of the detection objective within respective detection subsystems 116, 118. However, as discussed above, mismatches between the light-sheet planes and the detection planes 26, 28 can happen because of the spatiotemporally varying optical properties of living specimens 11. In practice, many factors contribute to spatiotemporally varying mismatches between the planes of the light sheets 12, 14 and the detection focal planes 26, 28 in live specimens 11 and four examples of these contributions are described next.

First, a live specimen 11 that is a multicellular organism typically has a complex three-dimensional (3D) shape. As the average refractive indices of the specimen 11, the surrounding support matrix (for example, agarose), and the medium (for example, water) in the microscope chamber that holds the specimen 11 usually differ substantially, light refraction can occur at the surface of the specimen 11 and can lead to mismatches in relative position and 3D orientation of the planes of the light sheets 12, 14 and the detection planes 26, 28. These mismatches change as the light sheet 12, 14 is moved to different regions of the specimen 11 over the course of volumetric imaging.

Second, referring to FIG. 4, the specimen 11 itself has spatially varying optical properties as a result of local differences in cell density, cell size, and biochemical composition. For example, the lipid-rich yolk in an embryo of a *Drosophila* or a zebrafish has distinct cell density, cell size, and biochemical composition from the tissue regions of the embryo. This spatial heterogeneity, which changes continuously during development, further impacts the direction and length of optical paths traversed by the light sheet 12, 14 inside the specimen 11. For example, in FIG. 4, a specimen 41 is mounted in a support matrix 405 (which can be, for example, an agarose gel) which is supported by a holder 410. In this example, at this point in time, the specimen 41 includes four distinct regions C1, C2, C3, and C4, each having a distinct refractive index, $n_{C1}$, $n_{C2}$, $n_{C3}$, and $n_{C4}$. Moreover, the support matrix 405 has a different refractive index $n_B$ and the environment surrounding the support matrix 405 has a distinct diffractive index $n_A$. The light sheet 12 or 14 will be altered differently depending on the region that it encounters as it travels toward and through the specimen 41 and this causes changes in the direction and length of the optical path traversed by the light sheet 12, 14.

Third, wavelength-dependent effects and chromatic aberrations introduce additional mismatches in the planes of the light sheets 12, 14 and the detection planes 26, 28, and these mismatches vary as a function of imaging depth and depend on the spectral illumination and detection windows of fluorescent markers. Thermal, mechanical and electronic drifts in microscope components during live imaging can further contribute to a degradation of spatial resolution.

Fourth, fluorescent marker distributions frequently undergo spatiotemporal changes during imaging experiments, particularly in experiments involving the use of genetically encoded markers targeted to specific (potentially non-stationary) cell populations or the tracking of specific gene products. When imaging developing organisms, such as early zebrafish (*D. rerio*) embryos during epiboly, one also needs to consider that optical conditions change continuously as a function of time and spatial location in the sample. Live imaging of genetically encoded fluorescent markers, such as a pan-neural fluorescent marker tracking the developing nervous system in *Drosophila*, is further complicated by spatiotemporal dynamics in marker expression. Recovering optimal resolution in the imaging experiment thus requires spatiotemporal adaptation of the microscope to the dynamic optical conditions while tracking dynamic fluorescent signals.

The spatial relationship of the planes of the light sheets 12, 14 and the detection planes 26, 28 is thus subject to dynamic changes during the experiment that cannot be quantitatively accounted for at the beginning of the experiment.

Figure 5A:
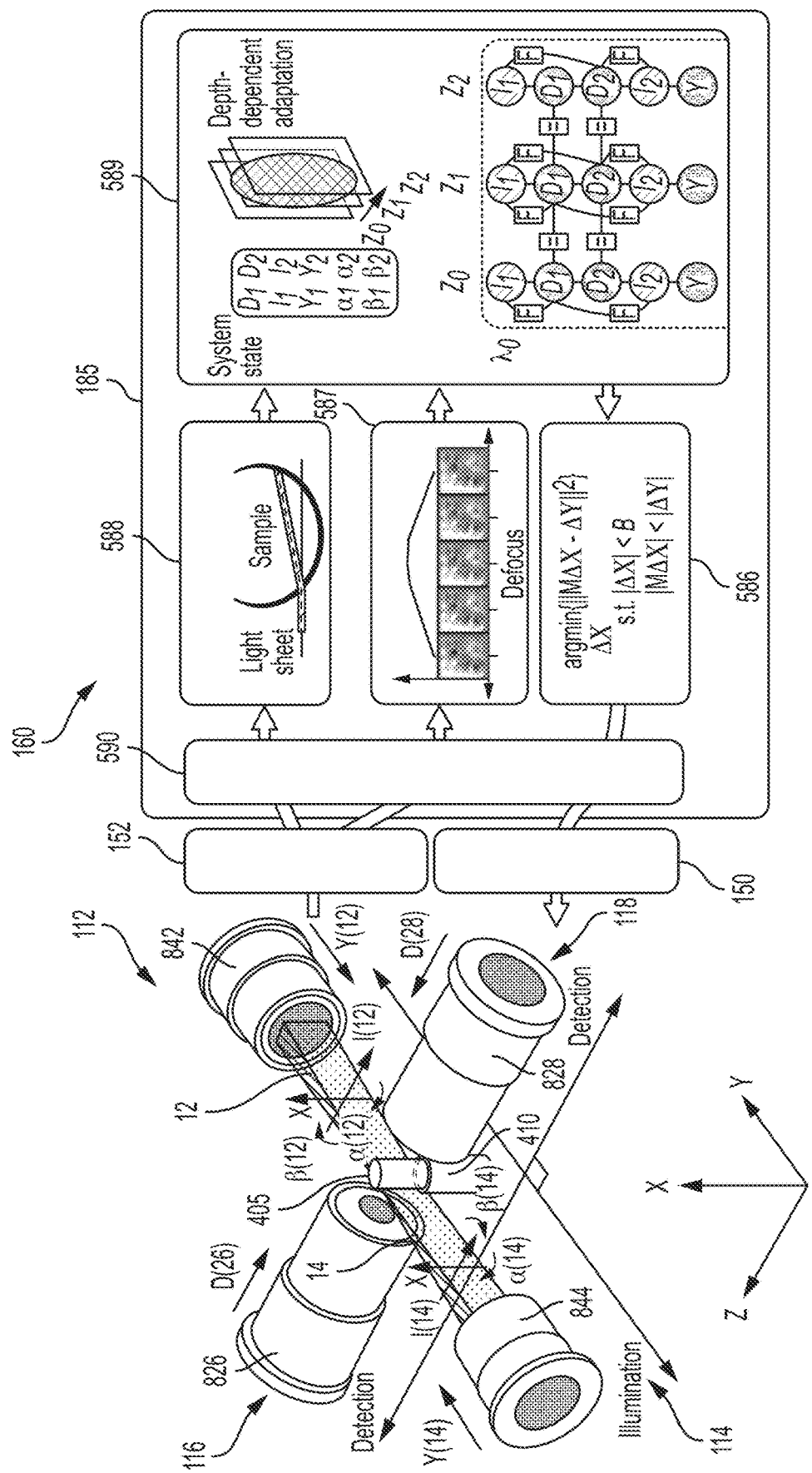
FIG. 5A is a perspective view and block diagram of the adaptive system including a computation framework.

Referring again to FIG. 1, and also to FIGS. 5A and 5B, in order to achieve and maintain high spatial resolution in the resulting images produced by the control system 180, despite these factors that are acting to reduce spatial resolution, the microscope system 100 includes the automated spatiotemporal adaptive system 160 (referred to herein as an adaptive system) that ensures spatiotemporal adaptive imaging. The adaptive system 160 is capable of continuously analyzing and optimizing (or improving) aspects associated with light-sheet imaging of the specimen 41. For example, the adaptive system 160 can improve the spatial and temporal relationship between the planes of the light sheets 12, 14 and the detection planes 26, 28 across the volume of the specimen 41. The adaptation performed by the adaptive system 160 is performed in real time, which means that it is performed in conjunction with the performance of primary imaging acquisition using the optical microscope 110. The adaptive system 160 systematically assesses and optimizes spatial resolution across specimens 41 (such as living organisms) by adapting to the optical properties of the specimen 41 and its environment and because of this, the adaptive system 160, when integrated within the optical microscope 110, provides an automated multi-view light-sheet microscope 110.

The adaptive system 160 includes a measurement 152 of one or more properties relating to imaging with the light sheets 12, 14 of the optical microscope 110; an automated computation framework 185 that receives the one or more properties from the measurement 152, performs one or more analyses based on this received measurement 152, and outputs one or more control signals based on the analyses; and an actuation apparatus 150 connected to the optical microscope 110 for controlling or adjusting one or more operating parameters of the optical microscope 110 based on received control signals from the framework 185. The operating parameters that are controlled or adjusted can be considered as degrees of freedom (DOF) for the operation of the optical microscope 110.

The measurement 152 can relate to a quality of an image. Specifically, image quality can be sampled at a set of reference regions (which can be reference planes) within the specimen 11. For example, as shown in FIG. 4A, reference planes $PL_0$-$PL_4$ are used to sample the image quality of the specimen 41. The image quality can be estimated based on an image quality metric. An image quality metric is defined as a function that takes an image as its argument and returns a real number. During downtime of the optical microscope 110 (the idle time, which is discussed with reference to FIG. 6 below), the optical microscope 110 is probed by perturbing (or changing incrementally) known operating parameters at each of the reference planes in the set across the specimen 11 and then analyzing how these perturbations impact the quality of the images sampled at these reference planes. Some of the images that are sampled may have a set of perturbed operating parameters that produce more blur (or defocus) in a sampled image, and thus the quality of such images in those reference planes is reduced. While other of the images that are sampled may have a set of perturbed operating parameters that reduce the blur (or defocus) in a sampled image, and thus the quality of such images is improved. Because the adaptive system 160 knows the set of parameters that are fed into the system during this probing, it is possible to determine which operating parameters produce images of higher quality. Moreover, these image quality values can be compared with the current image obtained during the primary light-sheet imaging and the adaptive system 160 can decide whether to adjust one or more of the operating parameters of the optical microscope 110 to improve the imaging by sending a signal to the actuation apparatus 150. The one or more operating parameters that are adjusted as a result of the analysis of the measurement 152 may be distinct from or the same as the one or more operating parameters that are changed to perturb the optical microscope 110 while probing to determine the measurement 152.

The operating parameters are discussed next with reference to FIGS. 5A-5E before discussing the components of the actuation apparatus 150. In FIGS. 5B-5E, the light sheet 12, 14 is represented generally as ls (where ls can be 12 or 14) and the detection focal plane 26, 28 is represented generally as fp (where fp can be 26 or 28). Additionally, in FIGS. 5A-5E, the specimen 41 is mounted in the support matrix 405. The illustrations of FIGS. 5A-5E are not drawn to scale and may be exaggerated to show details.

The actuation apparatus 150 is integrated within the optical microscope 110 to adjust one or more operating parameters associated with light-sheet imaging. The actuation apparatus 150 actuates one or more components within the optical microscope 110 based on instructions from the computation framework 185. The actuation apparatus 150 includes actuators coupled to elements of the optical microscope 110 for rotating and/or translating light sheet planes and/or detection planes in one or more of the three X, Y, and Z axes.

For example, with reference to FIGS. 5B and 5C, the parameters I(ls) associated with translation of the light sheets ls along a direction (for example, along the Z axis) that is perpendicular to the illumination axis (the Y axis) can be referred to, respectively, as I(12) and I(14). With reference to FIGS. 5B and 5D, the parameters D(fp) associated with the location of the detection focal plane fp taken along the Z axis can be referred to, respectively, as D(26) and D(28).

With reference to FIGS. 5B and 5E, the parameters α(ls) associated with the rotation of the light sheet ls about the propagation direction of the light sheet can be referred to, respectively, as α(12) and α(14). If the propagation direction of the light sheet ls lies on the Y axis, then the parameter can be considered an angle α(ls) rotated about the Y axis.

Referring to FIGS. 5B and 5F, the parameters β(ls) associated with the rotation of the light sheet ls about the axis defined by points representing the location of the waist of the light sheet ls can be referred to, respectively, as β(12) and β(14). The points of the waist location lie along a direction that is parallel with the X axis and thus, the parameters β(ls) are associated with rotating the light sheet ls about a direction parallel with the X axis.

As another example, the actuation apparatus 150 includes actuators coupled to elements of the optical microscope 110 for translating the light sheet ls along the illumination axis which is parallel with the Y axis. As shown in FIGS. 5A and 5G, the parameters Y(ls) associated with the location of the waists W(ls) of the light sheets ls taken along the Y axis can be referred to, respectively, as Y(12) and Y(14).

As another example, the actuation apparatus 150 includes actuators coupled to elements of the optical microscope 110 (such as, for example, the detection subsystem 116, 118 or the specimen 11 holder) for changing a volume at which the fluorescence 36, 38 is imaged to thereby compensate for a change in geometry of the sample 11. The volume at which the fluorescence 36, 38 is imaged can be changed in the Z axis by moving the specimen 11 across a larger range of values along the Z axis. In a high-speed, functional imaging experiment, in which the specimen 11 remains stationary, and the objectives and light sheets 12, 14 for three-dimensional (3D) imaging are adjusted, then the actuators coupled to the detection subsystem 116, 118 can be adjusted. For slower, developmental imaging of very large specimens 11, the specimen 11 can be moved instead, and then the adaptive system 160 would need to update the range across which the specimen 11 is moved to capture the full sample volume. In this case, the light sheets 12, 14 and the focal planes 26, 28 are still adjusted but only for the purpose of correcting mismatches between light sheets 12, 14 and focal planes 26, 28. In these cases, the computation framework 185 includes algorithms for tracking the specimen 11 in each of the X, Y, and Z axes so that its geometrical center (or fluorescence center of mass) remains stationary.

As another example, the actuation apparatus 150 includes actuators coupled to elements of the detection subsystem 116, 118 for correcting a wavefront of the fluorescences 36, 38. For example, the actuators can be deformable mirrors or the actuators can be coupled to tube lenses in the detection subsystem 116, 118.

The adaptive system 160 includes a fully automated computation framework 185 within the control system 180 that rapidly analyzes the measurement 152 from the optical microscope 110, and continuously optimizes or improves the spatial resolution across the volume of the specimen 11 in real time based on this analysis. The measurement 152 is a measurement of one or more properties relating to imaging with the light sheets 12, 14 of the optical microscope 110. In some implementations, the measurement 152 is obtained from one or more of the detection subsystems 116, 118. For example, the measurement 152 can be a measurement of a geometry (for example, a size, shape, and/or a location) associated with the specimen 11. As another example, the measurement 152 can be a measurement relating to the image of the specimen 11 that is formed by the microscope system 100. For example, the measurement 152 can be a quality of the image of the specimen 11 that is formed by the microscope system 100. The measurement 152 can be taken of a wavefront of the fluorescence 36, 38.

Referring also to FIG. 6, an exemplary process workflow 600 for spatiotemporal adaptive imaging using the adaptive system 160 is illustrated. Generally, the primary image acquisitions 605 in a time-lapse experiment on the specimen 11 are performed by the microscope system 100 in a repeated and discrete fashion. For example, the start of consecutive image acquisitions 605 can be separated by a time period T605. Moreover, there is an idle time 610 between the end of one primary image acquisition 605 and the start or beginning of the next primary image acquisition 605. During this idle time 610, one or more sub-actions 615 of the adaptive system 160 are performed. For example, the measurement 152 for the adaptive system 160 is performed during this idle time 610 and after the primary image acquisition 605 is completed. The measurements 152 are taken for as short a period of time as possible and they are therefore distributed in time during the time-lapse experiment in order to minimize photo-bleaching, photo-toxicity, and impact on temporal resolution in the imaging of the specimen 11 that can be caused from the performance of the measurements 152. The one or more sub-actions 615 that are performed during the idle time 610 can also include computations performed by the computation framework 185 based on the measurement 152 received during that idle time 610. It is also possible that the one or more sub-actions 615 that are performed during an idle time 610 include the computation framework 185 sending a signal to the actuation apparatus 150, which then adjusts one or more operating parameters associated with light-sheet imaging during the next primary image acquisition 605. However, it may be beneficial for the computation framework 185 to acquire several sets of measurements 152 over a plurality of idle times 610 before performing an analysis based on a plurality of measurements 152 from plural idle times 610 before sending the signal to the actuation apparatus 150. In this case, an update 620 to the optical microscope 110 (which includes the computation framework 185 sending a signal to the actuation apparatus 150, and the actuation apparatus 150 actuating one or more components within the optical microscope 110 based on the instructions from the computation framework 185) can be performed after a plurality of idle times 610.

Figure 7A:
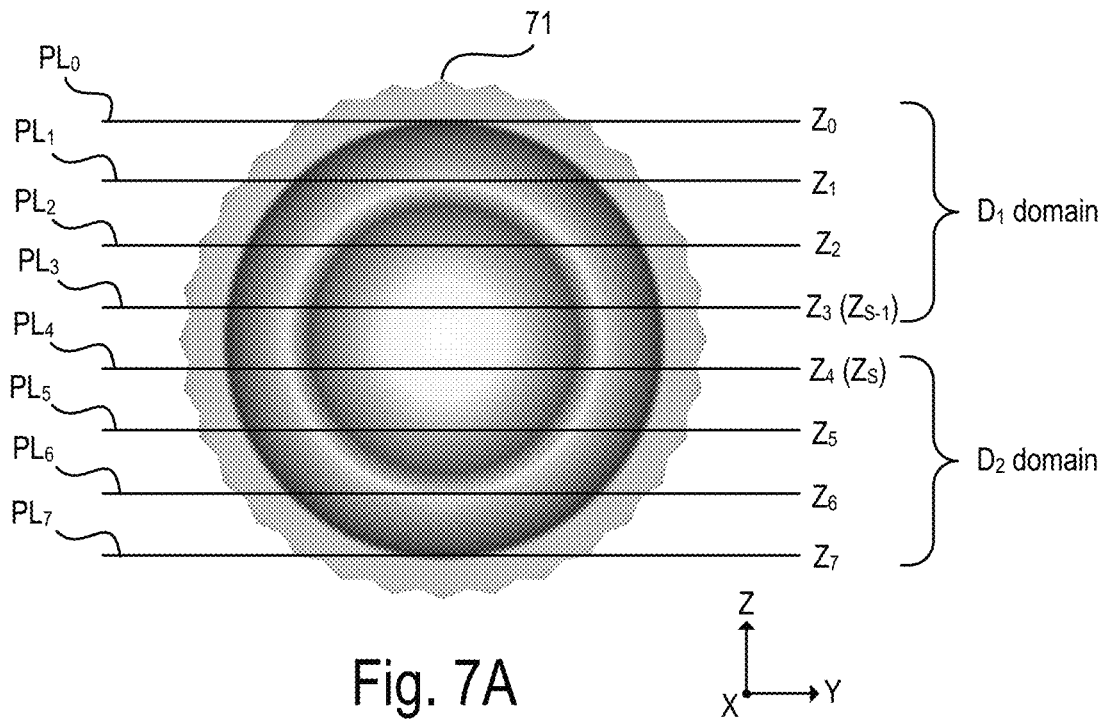
FIG. 7A is a top cross-sectional view of the specimen taken along the ZY plane showing a set of reference planes PL that are used for imaging by the adaptive system of FIG. 1.

Referring also to FIG. 7A, if the measurement 152 is a measurement of one or more properties relating to imaging with the light sheets 12, 14 of the optical microscope 110, then the computation framework 185 can control when and where the images of a specimen 701 for use in the adaptive system 160 are taken. For example, the measurement 152 can be an acquired image (of the fluorescence 36 or 38) taken at eight discrete and separated reference planes $PL_0$, $PL_1$, ... $PL_7$ that are parallel with the XY plane and are distributed through the specimen 71 at eight distinct locations $Z_0, Z_1, \ldots Z_7$ along the Z axis. When imaging large, partially opaque specimens, some of the reference planes (for example, planes $PL_0$, $PL_1$, $PL_2$, and $PL_3$) are more associated with the detection subsystem 116 that is more proximal to such reference planes while others of the reference planes (for example, planes $PL_4$, $PL_5$, $PL_6$, and $PL_7$) are more associated with the detection subsystem 118 that is more proximal to such reference planes. Additionally, a subset of reference planes (for example, planes $PL_{S-1}$ and $PL_S$, referred to as sync planes) typically located near the center of the specimen 71 at respective locations $Z_{S-1}$ and $Z_S$ can be associated with both of the detection subsystems 116, 118. The related degrees of freedom associated with these sync planes are subject to constraints that differ from those used in the rest of the volume of the specimen 71 and measurements 152 performed at these sync planes are used to ensure spatial continuity throughout the volume of the specimen 71.

Figure 7B:
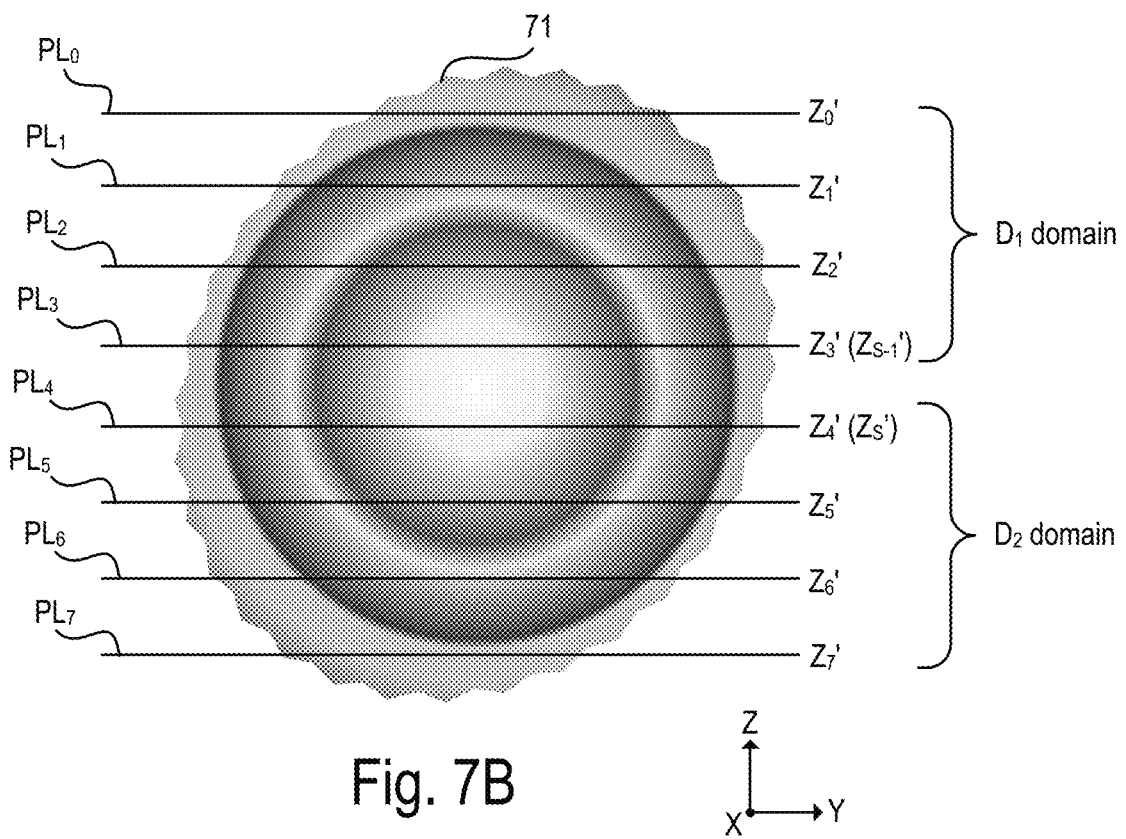
FIG. 7B is a top cross-sectional view of the specimen taken along the ZY plane showing a set of shifted reference planes PL that are used for imaging by the adaptive system of FIG. 1.

With reference to FIG. 7B, it is possible to adjust the locations of the reference planes during imaging of the specimen 71. As mentioned above, the measurement 152 can be a measurement of the geometry (for example, a size, shape, and/or location) associated with the specimen 71. In this case, the computation framework 185 can analyze the images detected at the reference planes and determine the edge, perimeter, size, and/or center of the specimen 71. Moreover, once the computation framework 185 makes this determination, it may also need to adjust the locations of the reference planes within the specimen 71 to accommodate for the change in geometry of the specimen 71 as the specimen 71 changes over time. For example, as shown in FIG. 7B, the geometry of the specimen 71 has changed (by an increase in its size or volume, a change in its centroid, or a change in its shape) and the locations of the reference planes $PL_0, PL_1, \ldots PL_7$ have been adjusted to new locations $Z_0', Z_1', \ldots Z_7'$ to accommodate the change in geometry of the specimen 71.

Written more generally, the measurement 152 can be of images taken at a set number K of reference planes, where K is any integer number greater than 1. Thus, fewer than eight or more than eight reference planes can be used. The set of reference planes can be referred to as the set $[PL_0, PL_1, \ldots PL_{K-1}]$ taken at the set of locations $[Z_0, Z_1, Z_{K-1}]$. As another example, as shown in FIG. 4A, the images are recorded at five reference planes $PL_0$, $PL_1$, $PL_2$, $PL_3$, and $PL_4$.

The computation framework 185 continuously adapts to dynamic changes in the specimen 11 in order to maintain optimal image quality over the course of long-term, high-speed imaging experiments. All decisions are data driven and based on real-time evaluation of image-derived information collected using time- and light-efficient procedures operating in the background of the experiment. The computation framework 185 within the control system 180 continuously optimizes or improves the spatial resolution of the imaging by sending a signal to the actuation apparatus 150 to thereby adjust one or more operating parameters associated with light-sheet imaging (such as translating, rotating, or both translating and rotating one or more of the planes of the light sheets 12, 14 and the planes of the detection subsystems 116, 118 in the three dimensions or changing a volume at which the specimen 11 is imaged). The computation framework 185 within the control system 180 includes software or programs to control the optical microscope 110, and this control software is integrated with an optimization procedure capable of rapidly detecting if (and which) changes to the configured of the optical microscope 110 are needed to recover and maintain maximum image quality across the specimen 11.

Referring again to FIG. 5A, the computation framework 185 of the adaptive system 160 includes several software modules 586, 587, 588, and 589 and a data interface 590 through which data travels between the software modules 586, 587, 588, 589 and the actuation apparatus 150 and measurement 152.

Software module 587 is an image quality software module that estimates a quality of the images that are received from the measurement 152, compares the image quality in different system states, and uses an image quality metric for performing the estimate. Software module 588 is a light-sheet geometry estimation software module that computes optimal settings for parameters (from a single defocus image sequence) to reconstruct the light-sheet geometry in the specimen 11 for the purpose of reducing or minimizing the effect of the measurement 152 at the reference planes $[PL_0, PL_1, \ldots PL_{K-1}]$. The light-sheet geometry estimation software module 588 is used to improve the overall adaptive scheme. The light-sheet geometry estimation software module 588 can determine a position of the light sheet 12, 14 inside the specimen 11, or an orientation of the light sheet 12, 14 inside the specimen 11 based on the images that are provided by the measurement 152.

Software module 589 is an optimization software module that receives the output from the modules 587 and 588, and performs an analysis based on the received output to determine a correction state for the operating parameters of the optical microscope 110 to improve imaging of the specimen 11. The optimization software module 589 can employ a constraint graph, which is a mathematical object that represents the opto-mechanical degrees of freedom of the microscope 110 and their spatial, temporal, and spectral relationships with each other. The constraints can be fixed, that is, relating to invariant geometric and optical requirements. The constraints can be dynamic, that is, relating to the changing received measurements 152. The output from the image quality software module 587 is used to control the light-sheet and detection focal plane parameters $I(12)$, $I(14)$, $D(26)$, and $D(28)$ and translation of the light sheet 12, 14 along the illumination axes ($Y(12)$ and $Y(14)$). The output from the light-sheet geometry estimation software module 588 is used to control the angles $\alpha(12)$, $\alpha(14)$, $\beta(12)$, $\beta(14)$ of the light sheets 12, 14.

Software module 586 is an actuation software module that determines how the operating parameters of the optical microscope 110 should be adjusted based on the output of the analysis from the software module 589. Once this determination is made, the software module 586 provides real-time control signals to the actuation apparatus 150 to effect the adjustment to the optical microscope 110.

The adaptive system 160 provides fully digitally-adjustable opto-mechanical degrees of freedom for computer-controlled translation and rotation of the planes of the light sheets 12, 14 and detection focal planes in all dimensions. The adaptive system 160 also compensates for specimens 11 that are not invariant in size during imaging. For example, the adaptive system 160 can determine a spatial extent and shape of the specimen 11 using the measurement 152 as the specimen 11 develops during imaging and the adaptive system 160 can thus change aspects about how the specimen 11 is imaged to accommodate for the expanding specimen 11. The adaptive system 160 robustly assesses and systematically tracks spatial resolution and image quality across the specimen 11 in real time using the measurement 152. The measurement 152 of the properties relating to imaging are spatiotemporal measurements and are taking in a manner that is designed to minimize or reduce the impact of the measurement on the photon budget associated with the specimen 11, on the physiology of the specimen 11, and on the speed at which the optical microscope 110 images.

The adaptive system 160 enables a smart light-sheet microscope, that is, a combined hardware and software framework for automated spatiotemporally adaptive imaging. The adaptive system 160 is robust with respect to different biological model systems, biological processes, marker strategies, spatiotemporal signal dynamics, and optical configurations of the optical microscope 110. The adaptive system 160 improves spatial resolution and signal strength two- to five-fold across large, multi-cellular organisms when compared with an optical microscope 110 that lacks such an adaptive system 160.

A description of the adaptive system 160 is next, beginning with the optical microscope 110 and the actuation apparatus 150.

Optical Microscope and Actuation Apparatus

The light sheet 12, 14 illuminates the specimen 11 along the Y axis on opposite sides of the specimen 11. Rapid scanning of a thin volume and fluorescence direction at a right angle (along the Z axis) to the illumination axis (which is generally parallel with the Y axis) provides an optically sectioned image. The light sheets 12, 14 excite fluorophores within the specimen 11 into higher energy levels, which then results in the subsequent emission of a fluorescence photon, and these fluorescence photons collectively are referred to as the fluorescence 36, 38, which are detected in respective detection subsystems 116, 118. The fluorophores that are excited in the specimen 11 can be labels that are attached to the cells of the specimen 11, such as, for example, genetically-encoded fluorescent proteins such as GFP or dyes such as Alexa-488. The fluorophores can, in some implementations, be actual or native proteins within the cells of the specimen 11, such proteins emitting light of specific wavelengths upon exposure with the light sheets 12, 14.

A detailed discussion about the light sheets 12, 14 and their interaction with the specimen 11, as well as the illumination subsystems 112, 114, and the detection subsystems 116, 118 can be found in U.S. Pat. No. 9,404,869, entitled "Multi-view Light Sheet Microscopy," issued on Aug. 2, 2016, which is incorporated herein by reference in its entirety.

Figure 8:
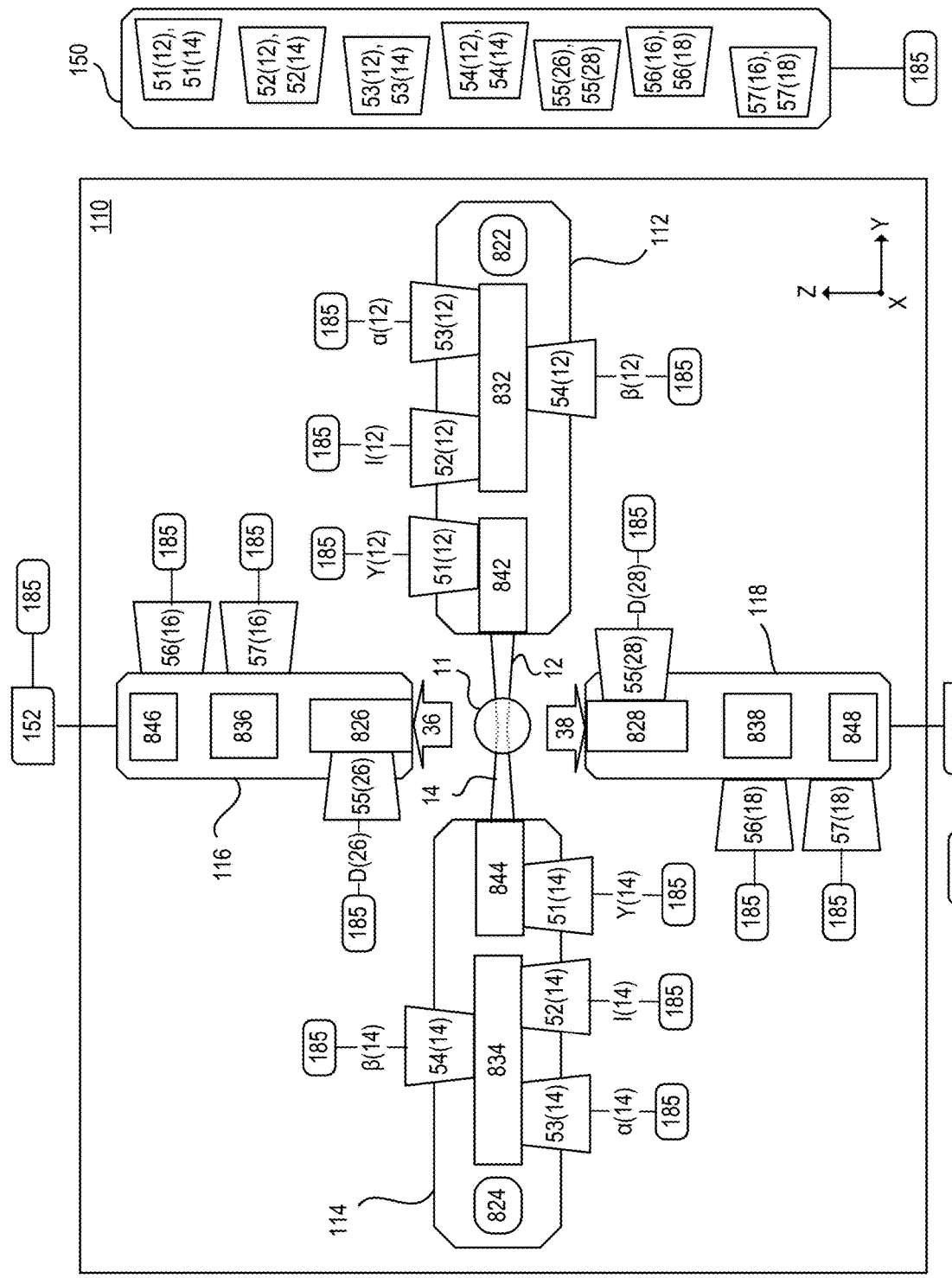
FIG. 8 is a block diagram of an implementation of the optical microscope including the adaptive system of FIG. 1.

Referring to FIG. 8, an implementation of the optical microscope 110 is shown in block diagram form. Each illumination subsystem 112, 114 of the optical microscope 110 includes a respective light source 822, 824 and each light source 822, 824 outputs a light beam. The light beams output from each light source 822, 824 are modified by respective sets 832, 834 of optical components. These optical components modify properties such as direction, size, angle, geometry, etc. of the light beam to produce the respective light sheet 12, 14. For example, the light sheets 12, 14 produced within the illumination subsystems 112, 114 can be produced by scanning an output of the respective light sources 822, 824, as discussed in detail below. After passing through the sets 832, 834 of optical components, the respective light sheet 12, 14 is directed through a respective illumination objective 842, 844 which focuses the light sheet 12, 14 to an illumination plane within the specimen 11. The illumination objective 842, 844 can be a relatively long working distance air objective in some implementations.

Each detection subsystem 116, 118 includes a respective detection objective 826, 828 that collects respective fluorescence 36, 38 emitted from the specimen 11. The fluorescence 36, 38 collected by respective detection objectives 826, 828 is then directed through a respective set 836, 838 of one or more optical components before entering a respective camera 846, 848. The measurement 152 of the one or more properties of light sheet imaging can therefore be a measurement of properties of the images output from the camera 846, 848, and this measurement 152 is directed to the computation framework 185 for processing and analysis. Each set 836, 838 of optical components can include a component such as a filter for rejecting light of wavelengths outside a wavelength band centered around the wavelength of the light to be detected. Each set 836, 838 of optical components can include one or more lenses (such as tube lenses) that focus the collected fluorescence onto a sensor of the respective camera 846, 848.

Next, the actuators within the actuation apparatus 150 are described relative to these components of the microscope 110. The actuation apparatus 150 includes actuators 51(12), 51(14) that are physically coupled to respective illumination objectives 842, 844 for adjusting a waist of the light sheet 12, 14 along the illumination axis (which is generally parallel with the Y axis), with the location of the waists being given by parameters Y(12) and Y(14), respectively, as discussed above. The actuator 51(12), 51(14) can effect an adjustment to the waist of the respective light sheet 12, 14 by translating the respective illumination objective 842, 844 along the illumination axis (the Y axis).

The actuation apparatus 150 includes actuators 52(12), 52(14) that are physically coupled to respective optical components within the respective sets 832, 834 to translate the illumination plane (which is parallel with the XY plane) of the light sheet 12, 14 along the detection axis (which is the Z axis). The location of the illumination plane of the light sheet 12, 14 on the Z axis is given by the parameter I(12), I(14).

The actuation apparatus 150 includes actuators 53(12), 53(14) that are physically coupled to respective optical components within the respective sets 832, 834 to rotate the respective light sheet 12, 14 about the illumination axis (which is the Y axis). The angle at which the light sheet 12, 14 is rotated about the Y axis is given by the respective parameter $\alpha(12)$, $\alpha(14)$, which can be referred to as roll.

The actuation apparatus 150 includes actuators 54(12), 54(14) that are physically coupled to respective optical components within the respective sets 832, 834 to rotate the respective light sheet 12, 14 about the X axis, which is perpendicular to the illumination axis. The angle at which the light sheet 12, 14 is rotated about the X axis is given by the respective parameter $\beta(12)$, $\beta(14)$, which can be referred to as yaw or pivot.

The actuation apparatus 150 includes actuators 55(26), 55(28) that are physically coupled to respective detection objectives 826, 828 for adjusting a location of the focal plane 26, 28 along the detection axis (which is the Z axis), with the location of the focal plane 26, 28 being given by respective parameters D(26) and D(28), as discussed above. The actuator 55(26), 55(28) can affect an adjustment to the focal plane 26, 28 of the fluorescence 36, 38 by translating the respective detection objective 826, 828 along the detection axis.

The actuation apparatus 150 includes actuators 56(16), 56(18) coupled to elements of the detection subsystem 116, 118 for changing a volume at which the fluorescence 36, 38 is imaged to thereby compensate for a change in geometry of the sample 11. For example, the actuators 56(16), 56(18) can be coupled to one or more of the camera 846, 848, the optical components of the sets 836, 838, and the cameras 846, 848 for adjusting the distinct Z locations of the reference planes [$PL_0$, $PL_1$, . . . $PL_K$] that are analyzed by the computation framework 185.

As another example, the actuation apparatus 150 includes actuators 57(16), 57(18) coupled to elements of the detection subsystem 116, 118 for correcting a wavefront of the fluorescences 36, 38. For example, the actuators can be deformable mirrors or coupled to tube lenses in the set 836, 838 of optical components.

The actuation apparatus 150 can include other actuators not shown in FIG. 8.

Figure 9:
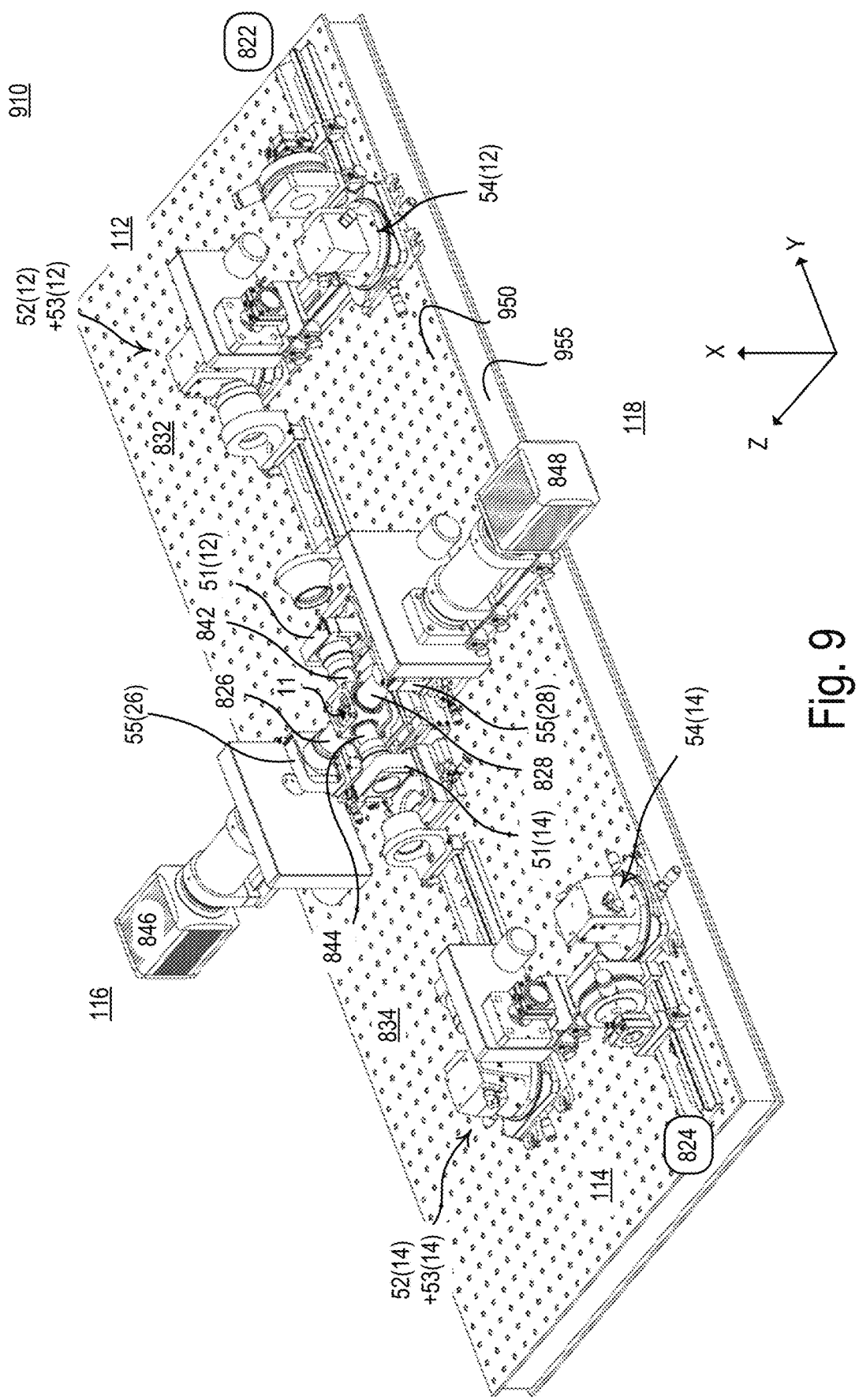
FIG. 9 is a perspective view of an implementation of the optical microscope including the adaptive system of FIG. 1.

Referring to FIG. 9, an implementation of an optical microscope 910 is shown in perspective view, in which the light sheets 12, 14 are created by scanning an output of the respective light sources 822, 824 and in which some of the actuators of the actuation apparatus 150 shown in FIG. 8 are used. In this implementation, the optical microscope 910 includes a chamber that houses the specimen 11.

For example, the actuation apparatus 150 of the optical microscope 910 includes actuators 51(12), 51(14) physically coupled to respective illumination objectives 842, 844 for adjusting a waist of the light sheet 12, 14 along the Y axis (based on parameters Y(12) and Y(14)) by translating the respective objective 842, 844 along the Y axis. The actuators 51(12), 51(14) can be piezo positioners. For precise control of the position of light-sheet waists (Y(12) and Y(14)) along the optical axis of the respective illumination subsystem 112, 114 (the Y axis), the actuators 51(12), 51(14) are P-628.1CD Hera piezo positioners with 800 µm travel range, operated with E-665 piezo amplifiers and controllers (from Physik Instrumente) and the respective objective 842, 844 is mounted to the piezo positioners.

The actuation apparatus 150 of the optical microscope 910 includes actuators 55(26), 55(28) that are physically coupled to respective detection objectives 826, 828 for adjusting the location of the focal plane 26, 28 along the Z axis (based on parameters D(26) and D(28)) by translating the respective detection objective 826, 828 along the Z axis.

The actuators 55(26), 55(28) can be piezo positioners. For precise control of the position of detection focal planes (D(26) and D(28)) along the optical axis of the respective detection subsystem 116, 118, the actuators 55(26) and 55(28) can be P-622.1CD Hera piezo positioners with 250 µm travel range, operated with E-665 piezo amplifiers and controllers (from Physik Instrumente) and the respective objective 826, 828 are mounted to the piezo positioners.

The actuation apparatus 150 of the optical microscope 910 includes actuators 52(12), 52(14) and actuators 53(12), 53(14) that are physically coupled to respective optical components (such as mirrors) within the respective sets 832, 834 to affect a combined adjustment to two operating parameters of the light-sheet imaging. Specifically, the combined set of actuators 52(12), 52(14) and actuators 53(12), 53(14) work together on optical components in respective sets 832, 834 to both translate the illumination plane (which is parallel with the XY plane) of the light sheet 12, 14 along the Z axis (based on parameters I(12), I(14)) and to rotate the respective light sheet 12, 14 about the Y axis (based on parameters $\alpha(12)$, $\alpha(14)$).

In some implementations, one or more of the actuators 52(12), 52(14), 53(12), 53(14) are piezoelectric drivers. In other implementations, the actuators 52(12), 52(14), 53(12), 53(14) are galvanometer scanners, such as the model 6215HSM40B from Cambridge Technology. In some implementations, the actuators 52(12), 52(14), 53(12), 53(14) and the mirrors of the sets that they control can be integrated with each other, for example, using S-334 miniature piezo tip/tilt mirrors by Physik Instrumente (PI). The piezo-controlled mirrors can offer the same functionality as the galvanometer scanners, but provide additional analog offset inputs that can simplify the introductions of hidden system perturbations. In the absence of a requirement for additional analog offset inputs, the galvanometer scanners can provide improved temperature stability and faster line repetition rates than the piezo-control provides.

The actuation apparatus 150 of the optical microscope 910 also includes actuators 54(12), 54(14) that are physically coupled to respective optical components (such as mirrors) within the respective sets 832, 834 to rotate the respective light sheet 12, 14 about the X axis (based on respective parameters $\beta(12)$, $\beta(14)$). In some implementations, one or more of the actuators 54(12), 54(14) are piezoelectric drivers. In other implementations, the actuators 54(12), 54(14) are galvanometer scanners, such as the model 6215HSM40B from Cambridge Technology.

For precise control of light-sheet offsets perpendicular to the optical axis of the respective illumination system (412) and I(14)) as well as roll ($\alpha(12)$ and $\alpha(14)$) light sheet angles in the space at the specimen 11, the actuators 52(12), 52(14) and 53(12), 53(14) can be formed in a single unit as dual-axis 6215H galvanometer scanners (Cambridge Technology). Similarly, for precise control of the yaw ($\beta(12)$ and ($\beta(14)$) light sheet angles in the space at the specimen 11, the actuators 54(12), 54(14) can be formed as dual-axis 6215H galvanometer scanners (Cambridge Technology). In each illumination subsystem 112, 114, the first dual-axis galvanometer scanner (the actuator 54(12), 54(14)) that interacts with the light beam from the light source 822, 824 is conjugated to the plane of the specimen 11 and controls the angular orientation of the light sheet 12, 14 in the space of the specimen 11, whereas the second dual-axis galvanometer scanner (the pair of actuators 52(12)/53(12), 52(14)/53(14)) that interacts with the light beam is conjugated to the focal plane 26, 28 of the detection objective 826, 828 and controls the lateral (Z axis) light-sheet offset (and also facilitates scanned light-sheet illumination itself).

In order to optimize image quality and spatial resolution during long-term imaging of dynamic biological processes within the specimen 11, such as whole-embryo development or the formation of tissues and organs, the approach to spatiotemporally adaptive imaging enabled by the adaptive system 160 relies on digital control of these ten operating parameters (which can be considered as degrees of freedom), Y(12), Y(14), D(26), D(28), I(12), I(14), $\alpha(12)$, $\alpha(14)$, $\beta(12)$, and $\beta(14)$], which characterize the relative offsets and angles between all light sheets 12, 14 and the detection focal planes 26, 28. By automating the control of these degrees of freedom, the framework 185 of the adaptive system 160 is able to compensate for spatiotemporal changes in the optical properties of the specimen 11, for local and global distribution and maturation of fluorescent markers in the specimen 11, and for mechanical and thermal drift in various components of the optical microscope 110.

Referring to FIGS. 10A and 10B, a schematic diagram of an implementation of the illumination subsystem 114 of FIGS. 8 and 9 is shown and described. The illumination subsystem 112 is similar in design and operation to the illumination subsystem 114, and for simplicity only the components of the illumination subsystem 114 are discussed.

The light source 824 produces a light beam 1000 that is first directed to a pivot optical arrangement 1005 that is controlled and adjusted by the actuator 54(14). The pivot optical arrangement 1005 is also in the illumination subsystem 114 of FIG. 9, but is not visible due to other components blocking the arrangement 1005. The pivot optical arrangement 1005 is sandwiched between two relay lenses 1010, 1015, at a distance of one focal length to each lens 1010, 1015. The pivot optical arrangement 1005 includes a first tilting mirror 1005A and a second tilting mirror 1005B that are used in combination to adjust or control the yaw angle $\beta(14)$ of the light sheet 14 output from the illumination subsystem 114. As discussed below, the pivot optical arrangement 1005 can be configured to cause an adjustment to the light sheet 14 at the specimen 11 that is constrained by rotation about the X axis only. In this way, other components of the illumination subsystem 114 can be used for controlling other properties of the light sheet 14.

The illumination subsystem 114 includes an optical scanner arrangement 1020 that receives the light beam 1000 that passes through the relay lens 1015. The collimated light beam 1000 produced by the light source 824 is focused onto the tilting mirror 1005A by the relay lens 1010 and the relay lens 1015 restores the collimation and directs the light beam 1000 to the optical scanner arrangement 1020.

The optical scanner arrangement 1020 is controlled and adjusted by the actuators 52(14) and 53(14). The optical scanner arrangement 1020 deflects the light beam 1000 along the X axis to form a light sheet 1025, which is directed toward an f-theta lens 1030, a tube lens 1035, and the illumination objective 844, the output of which forms the light sheet 14. The optical scanner arrangement 1020 includes a first tilting mirror 1020A and a second tilting mirror 1020B that are used in combination to perform several functions, which are briefly described next. The tilting mirrors 1020A, 1020B are adjusted to scan the light beam 1000 across the X axis to form the light sheet 1025. The tilting mirrors 1020A, 1020B are adjusted to offset or translate the plane of the light sheet 14 along a direction perpendicular to the illumination axis (which is parallel with the Y axis); for example, the plane of the light sheet 14 can be offset along the Z axis. As discussed above, the amount of offset of the plane of the light sheet 14 perpendicular to the illumination axis is given by the parameter I(14). Moreover, the tilting mirrors 1020A, 1020B are adjusted to control or adjust the roll angle, α(14) of the light sheet 14, which is the rotation of the light sheet 14 about the Y axis.

While the pivot optical arrangement 1005 is responsible for controlling the yaw angle β(14) of the light sheet 14, the optical scanner arrangement 1020 controls the roll angle α(14) and the light sheet translation I(14). In order to reduce the footprint (or size) of the optical microscope 110, each of these arrangements 1005, 1020 is set up with dual-axis scanners (which means that their respective actuators control or rotate the light beam about two different axes).

The primary function of the optical scanner arrangement 1020 is to deflect the incident light beam 1000 to produce an angular range that defines the height of the light sheet 14 along the X axis in the specimen 11. And, the angle of the light beam 1000 that exits the optical scanner arrangement 1020 is converted into a displacement along the X axis or direction by the f-theta lens 1030 because the optical scanner arrangement 1020 is positioned to be located at the focal plane of the f-theta lens 1030, thus producing a macroscopic light sheet 14. The pair of the tube lens 1035 and the illumination objective 844 focuses the macroscopic light sheet 14 output from the f-theta lens 1030 into the microscopic light sheet 14 at the specimen 11. The illumination objective 844 can be a relatively long working distance air objective.

The control of the yaw angle β(14) of the light sheet 14 is described next. The yaw angle β(14) is a rotation of the light sheet 14 at the specimen 11 about the X axis defined by the points representing the location of the waist of the scanned light beam 14. The yaw angle β(14) is adjusted by either physically displacing the actuator 52(14) or 53(14) laterally or by displacing the light beam 1000 that interacts with the optical scanner arrangement 1020 laterally. The second approach (to displace the light beam 1000 that interacts with the optical scanner arrangement 1020 laterally) is more practical because it is a simpler design and can be performed in an automated and digitally-controlled manner.

By adjusting the angles or tilts of the tilting mirrors 1005A and 1005B, the light beam 1000 can be positioned off the optical axis anywhere in the XZ plane at the plane of the relay lens 1015. In the configuration of FIGS. 10A and 10B, the first tilting mirror 1005A and the second tilting mirror 1005B are not engaged and are in a non-pivot and on-axis position, which means that the light sheet 14 has not been pivoted and the value of the yaw angle β(14) is zero. In the configuration of FIGS. 10C and 10D, the first tilting mirror 1005A and the second tilting mirror 1005B are engaged and are in a pivot position, which means that the light sheet 14 has been pivoted and the value of the yaw angle β(14) is non-zero.

As noted above, the pivot optical arrangement 1005 is positioned between two relay lenses 1010 and 1015 at a distance of one focal length to each lens. Because of this, the combined system (of the pivot optical arrangement 1005 and the lenses 1010, 1015) introduces a parallel displacement of the light beam 1000 relative to its optical axis and that parallel displacement is converted by downstream optical components of the illumination subsystem 114 into a pivot motion or adjustment, that is the yaw angle β(14) at the specimen 11 location. FIGS. 10C and 10D show the introduction of the displacement of the light beam 1000 to produce the pivot motion β(14). The pivoted light beam 1025 (shown in FIGS. 10C and 10D) is displaced laterally (along the Z axis) relative to the on-axis light beam 1025 (shown in FIGS. 10A and 10B) after the optical scanner arrangement 1020.

When the first tilting mirror 1005A is rotated from the non-pivot position of FIGS. 10A and 10B to its pivoted position of FIGS. 10C and 10D, the mirror 1005A displaces the light beam 1000 along X by angle $\theta_X$. When the second tilting mirror 1005B is rotated from its non-pivot position of FIG. 10A to its pivoted position of FIG. 10C, the mirror 1005B displaces the light beam 1000 along Z by angle $\theta_Z$. The cumulative effect of rotating both tilting mirrors 1005A and 1005B as shown in FIGS. 10C and 10D is an angular displacement of the light beam 1000 in the XZ plane by an angle γ relative to the on-axis/non-pivoted light beam 1000 of FIGS. 10A and 10B at the tilting mirror 1005A.

Figure 11:
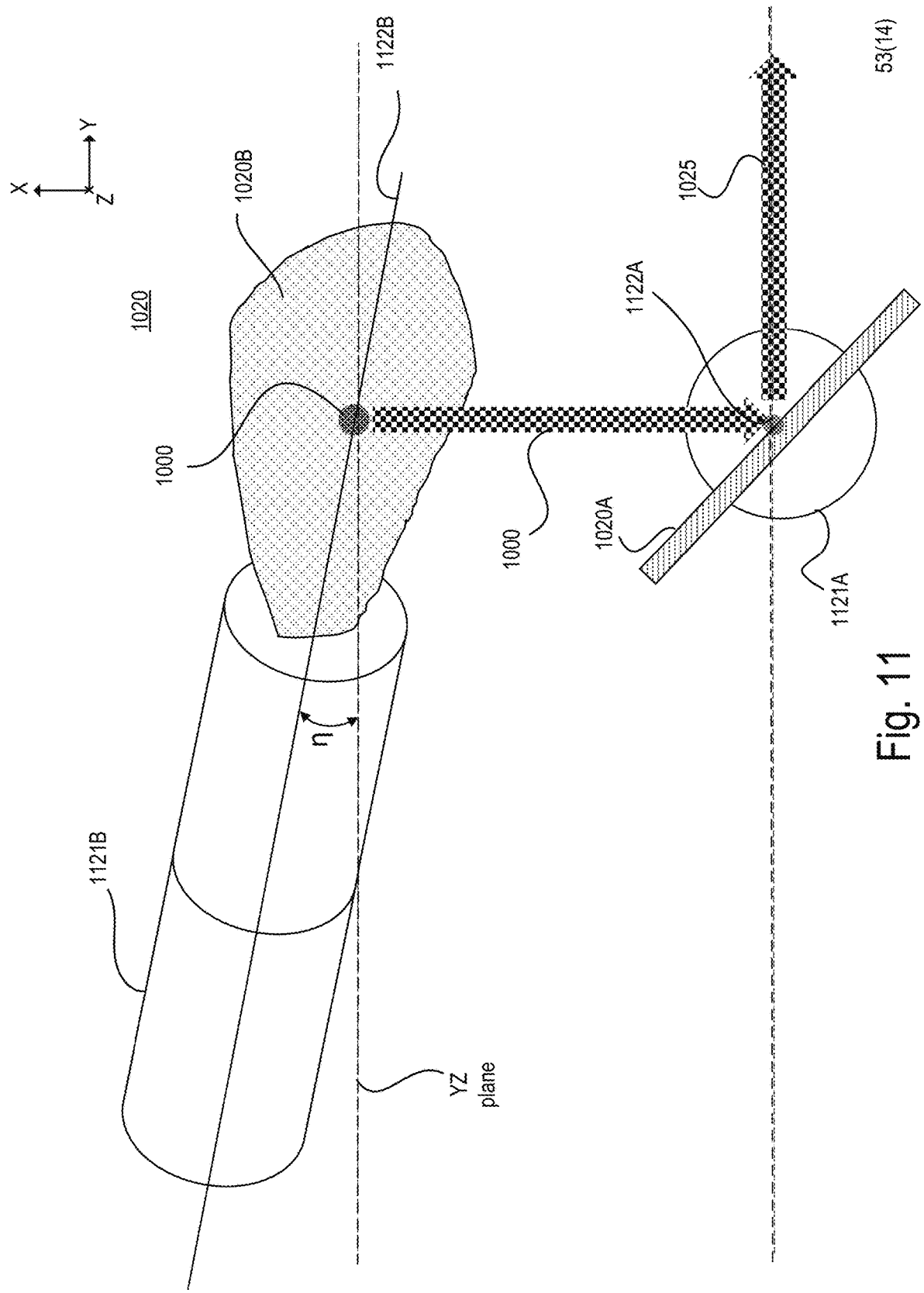
FIG. 11 is a block diagram showing the path of the light beam through an optical scanner arrangement of the illumination subsystem of FIG. 10A.
Figure 12A:
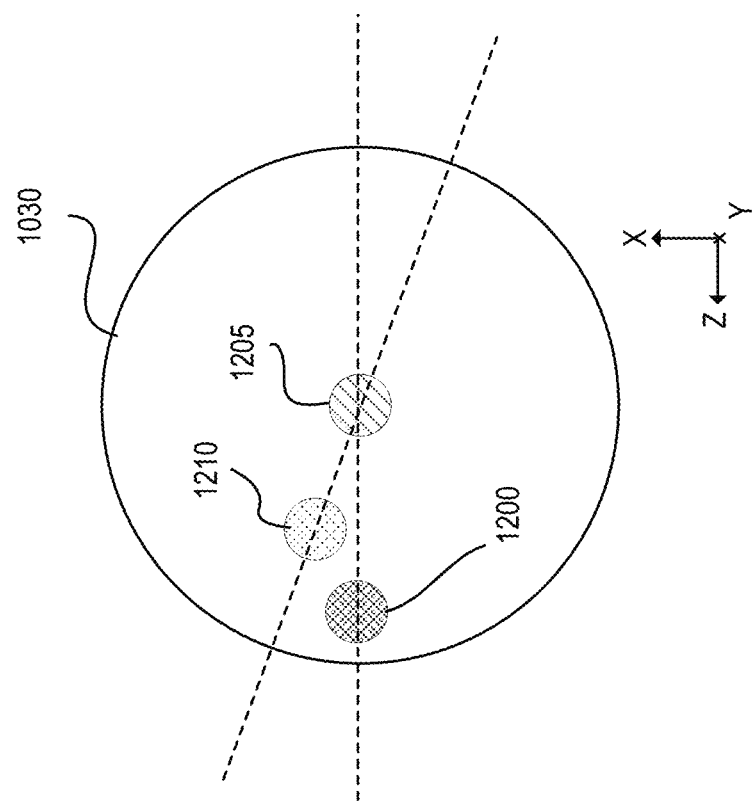
FIG. 12A is a schematic illustration showing a location of possible three paths taken by a light beam at a relay lens between the pivot optical arrangement and the optical scanner arrangement of FIG. 10A.
Figure 12B:
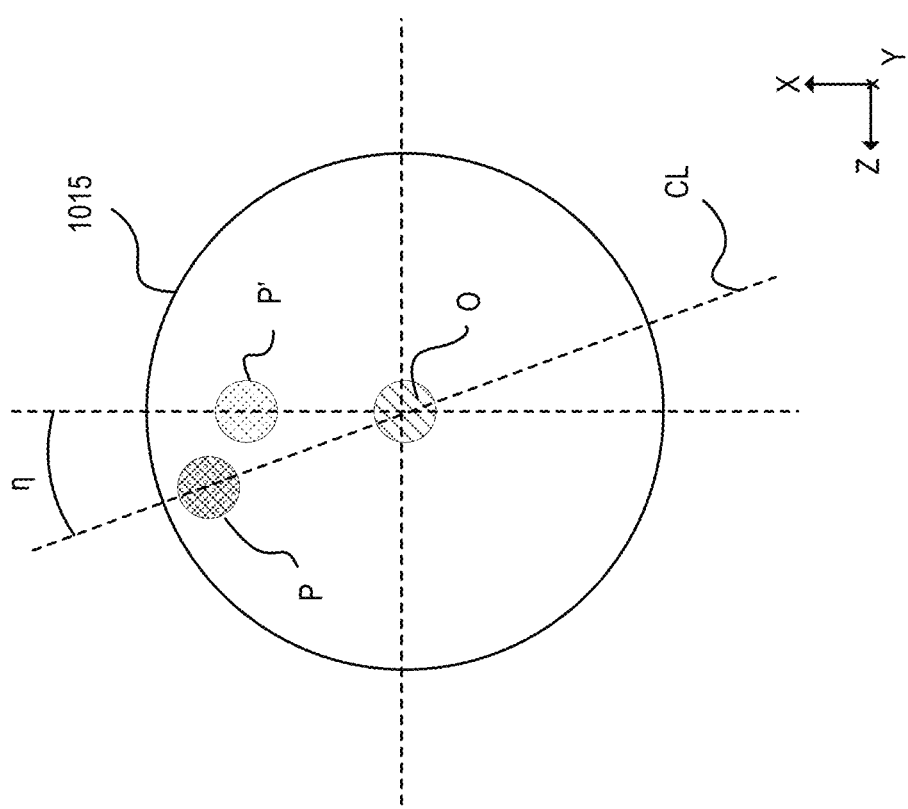
FIG. 12B is a schematic illustration showing a location of the respective possible three paths taken by the light beam at the relay lens of FIG. 12A at an f-theta lens that follows the optical scanner arrangement of FIG. 10A.

The rotation of the tilting mirrors 1005A, 1005B can be constrained in a manner to ensure that the overall effect of the adjustment due to the pivot optical arrangement 1005 is to cause the light sheet 14 to be deflected by the yaw angle β(14) at the specimen 11 without causing a deflection of the light sheet 14 about another axis other than the X axis. The constraint that ensures this overall effect relates to the design of the optical scanner arrangement 1020, and is discussed next with reference to FIGS. 11, 12A, and 12B. As shown in FIG. 11, the tilting mirrors 1020A, 1020B in the optical scanner arrangement 1020 are mounted on respective shafts 1121A, 1121B, which are components of respective actuators 52(14) and 53(14). Each shaft 1121A, 1121B defines a primary axis 1122A, 1122B and the shaft 1121A, 1121B is fixed in place while the respective mirror 1020A, 1020B is mounted to a motor rotor that is able to rotate about the respective primary axis 1122A, 1122B. The primary axis 1122B of the shaft 1121B is fixed at an angle of q relative to the YZ plane in which the primary axis 1122A of the shaft 1122A lies. This angle q defines the orientation of the shifted position of the light beam 1000 relative to the X axis at the relay lens 1015, as shown in FIGS. 12A and 12B. If the actuator pair 52(14) and 53(14) is a dual-axis scanner such as the model 6215H by Cambridge Technology using a 61021506R40 XY mount, then the value of η is about 17° (but other values are possible).

Specifically, the pivot location P at the relay lens 1015 at which the light beam 1000 impinges should lie on a constraint line CL in the XZ plane. The constraint line CL is at an angle η relative to the X axis. This means that the displacement of the light beam 1000 by the pivot optical arrangement 1005 causes the pivot location P at the relay lens 1015 to remain on the constraint line CL in the XZ plane. Moreover, after passing through the optical scanner arrangement 1020, the light beam 1025 remains deflected along the Z axis only and does not exhibit any deflection along the X axis. This is evident from the position of the deflected plane 1200 at the f-theta lens 1030. Because of this, the light sheet 14 output from the tube lens 1035 and the illumination objective 844 is rotated about the X axis only and along the Z axis only. Thus, when the pivot location P is constrained to the constraint line CL, the overall impact due to the adjustment caused by the pivot optical arrangement 1005 is to cause the light sheet 14 to be rotated about the X axis only (the yaw angle β). For comparison, the non-pivoted location of the light beam 1000 at the relay lens 1015 is labeled as O in FIG. 12A, and the position of the non-deflected position at the f-theta lens 1030 is labeled as 1205 in FIG. 12B.

If the light beam 1000 is adjusted by the pivot optical arrangement 1005 so that the shifted pivot location P' at the relay lens 1015 is deflected from the constraint line CL, as shown in FIG. 12A, then the light beam 1025 output from the optical scanner arrangement 1020 is now deflected along both the Z axis and the X axis, as shown in FIG. 12B. This is evident from the position of the deflected location 1210 at the f-theta lens 1030. Because of this, the light sheet 14 output from the tube lens 1035 and the illumination objective 844 is rotated about not only the X axis but also the Z axis.

In general, the orientation of the pivot location P flips by 90°−η as the light beam 1025 exits the optical scanner arrangement 1020 and impinges upon the f-theta lens 1030. Thus, the actuator 54(14) displaces the light beam 1000 by an angle of θx to create a lateral displacement after the optical scanner arrangement 1020. And, to correct for the shaft angle η, the light beam 1000 is displaced by $\theta_Z$. Cumulatively, the light beam is displaced by the angle γ with respect to the optical axis measured at the tilting mirror 1005A, where the light beam 1000 is brought to focus, and this thereby culminates in the light sheet 14 being pivoted by the angle β(14) about the X axis in the plane 1040 at the specimen 11 (as shown in FIG. 10C).

Additionally, the position of the rotation axis of the light beam 14 (which relates to both the yaw angle β(14) and the roll angle α(14)) can be changed by translating the light sheet 1000 according to the value of the light sheet offset I(14).

The following mathematical relationships help establish the optical angles $\theta_X$ and $\theta_Z$ to be generated by the tilting mirrors 1005A, 1005B of the pivot optical arrangement 1005. The deviation of the light beam from the optic axis is given by γ (shown in FIG. 10D) and is given by:

$$\gamma = \tan^{-1}\left(\frac{OP}{f_R}\right),$$

where $f_R$ is the focal length of the lens 1015, and OP is the distance between the centers of the location P and the location O. Moreover, the pivot or yaw angle β(14) in the plane 1040 of the specimen 11 is given by:

$$\beta(14) = \tan^{-1}\left(\frac{M \times OP}{f_{1030}}\right),$$

where M is the magnification of the tube lens 1035 and the illumination objective 844 given $f_{TL}/f_{obj}$, and $f_{1030}$ is the focal length of the lens 1030. The angular deviation of the light beam 1025 from the optic axis γ can be rewritten in terms of known quantities as follows:

$$\gamma = \tan^{-1}\left(\frac{1}{f_R} \times \frac{f_{1030}}{M} \times \tan\beta(14)\right).$$

Note that in the above equations, all angles are defined in free space.

Experimentally, the pivot angle β(14) is in the immersion medium, which is the medium in which the specimen 11 is immersed, and the pivot angle is given by $\beta_m = \beta/n_m$, where $n_m$ is the refractive index of the immersion medium. Hence, once the intended pivot β(14) is defined, the deviation of the light beam 1000 from the optic axis given by γ can be obtained using the above relationship, and the optical angles to be generated by the two tilting mirrors 1005A, 1005B in the pivot optical arrangement 1005 can be ascertained using the following equations derived using the geometric configuration shown in FIGS. 10B and 10D as follows:

$$\theta_X = \tan^{-1}(\tan\gamma \times \cos\eta); \text{ and}$$

$$\theta_Z = \tan^{-1}\left[\frac{\tan\gamma \times \sin\eta}{\sqrt{1 + \tan^2\gamma\cos^2\eta + 2\left(\frac{\Delta}{f_R}\right) + \left(\frac{\Delta}{f_R}\right)^2}}\right],$$

where Δ is the separation between the tilting mirrors 1005A and 1005B in the pivot optical arrangement 1005.

Examples of the hardware components of the optical microscope 110 are described next. References to only one illumination subsystem 114 apply to both illumination subsystem 112.

The optical microscope 110 includes the two illumination subsystems 112, 114, which include the light sources 822, 824, which can be laser systems, two detection subsystems 116, 118, a specimen chamber that houses the specimen 11, a positioning system for adjusting the position of the specimen 11 within the chamber in the X, Y, or Z axes, a computer workstation and real-time electronics for the control system 180 that provides for control of the microscope 110 and data acquisition, LabVIEW-based software for control of the microscope 110, and a Java and LabVIEW-based software for the computation framework 185. An overview of the components is provided.

In some implementations, the optical microscope 110 or 910 (including all of the optics and positioning hardware for the specimen 11) is assembled on an optical breadboard (which is an array or rectangular grid of tapped holes in either metric or imperial units) 950 and optical table 955 (FIG. 9). The optical breadboard 950 can be a custom RG grade breadboard by Newport Corporation, for example product code 04SI69108). The optical table 955 can be an ST-UT2-48-8 optical table equipped with an IQ-200-YG-8 damper upgrade, supported by four S-2000 series 28" isolators with automatic leveling by Newport Corporation.

In some implementations, the light source 822, 824 is formed from a single laser source, the output of which is split to form the two beams for use in each illumination subsystem 112, 114. The single laser source can be a pulsed titanium:sapphire (Ti:Sapphire) laser, such as the Chameleon Ultra II by Coherent, Inc.) that outputs a light beam having a wavelength in the infrared (IR) range, for example, a wavelength of value between 650 nm and 1100 nm. The light from the single laser source can be split with beam-splitting optics from, for example, Melles Griot, Casix, or Linos. For example, the beam splitter can be a model PBSH-450-2000-100 broadband polarizing cube beam splitter by Melles Griot or a WPA 1312-2-700-1000 achromatic ½ wave plate by Casix. In some implementations, the light from the light source 822, 824 can be directed through a Pockels cell such as a model 350-80-LA-02 KD*P series electro-optic modulator and a model 302RM driver by Canoptics.

In other implementations, the light source 822, 824 consists of a plurality of lasers, such as a laser array with three solid-state lasers coupled into a dual-port fiber module, fiber collimators, and dichroic mirrors for combining the laser beams in the visible and IR portions of the spectrum. An example of a solid-state laser coupled into a dual-port fiber module is a SOLE® Laser Light Engine produced by Omicron-Laserage Laserprodukte GmbH of Rodgau-Dudenhofen, Germany such as a SOLE-3 from Omicron.

In other implementations, it is possible to use a plurality of light sources and/or a plurality of light sheets having different colors at any given time, that is simultaneously, and equip each detection subsystem 116, 118 with dichroic beam splitters and a plurality of cameras, such that different color channels can be recorded simultaneously.

In some implementations, each illumination subsystem 112, 114 includes a laser shutter such as a Uniblitz laser shutter model VS14S2ZM1-100 having an AlMgF2 coating with a VMM-D3 three-channel driver. Each illumination subsystem 112, 114 can include a filter wheel equipped with notch and neutral density filters. The filter wheel can be model 96A351 filter wheel controlled by model MAC6000 DC servo controller by Ludl, the neutral density filter can be an NDQ neutral density filter by Melles Griot, and the notch filter can be a laser cleanup notch filter model 488/10, 561/10, or 594/10 by Chroma.

The tilting mirrors 1005A, 1005B of the pivot optical arrangement 1005 can be silver-coated 6 mm mirrors and the actuator 54(14) of the pivot optical arrangement 1005 can be a two-axis galvanometer scanner onto which the silver-coated mirrors are fixed. The two-axis galvanometer scanner can be model 6215HSM40B galvanometer scanner by Cambridge Technology with a MicroMax 673XX dual-axis integrating servo driver amplifier. The silver-coated 6 mm mirrors can be mounted to the scanner as a set. The power supply for the actuator 54(14) can be a MK320S-24 power supply by Astrodyne.

Similarly, the tilting mirrors 1020A, 1020B of the optical scanner arrangement 1020 can be silver-coated 6 mm mirrors and the actuator 52(14)/53(14) of the optical scanner arrangement 1020 can be a two-axis galvanometer scanner onto which the silver-coated mirrors are fixed. The two-axis galvanometer scanner can be model 6215HSM40B galvanometer scanner by Cambridge Technology with a MicroMax 673XX dual-axis integrating servo driver amplifier. The silver-coated 6 mm mirrors can be mounted to the scanner as a set. The power supply for the actuator 54(14) can be a MK320S-24 power supply by Astrodyne.

The relay lenses 1010, 1015 can be a relay lens pair, such as model 49-361-INK by Edmund Optics. The f-theta lens can be a custom f-theta lens supporting a light beam 1025 having a wavelength of about 488 nm to about 1100 nm, such as a model 66-S80-30T-488-1100 nm by Special Optics. The tube lens 1035 and the illumination objective 844 can be a matched set such as made by Olympus or Nikon, which can be optimized for one- and two-photon excitation. For example, the tube lens module can be a model U-TLU-1-2 camera tube by Olympus, the actuator 51(14) for the illumination objective 844 can be a piezo positioner such as a model P-622.1CN PIHera piezo linear stage and using E-665 piezo amplifier and servo controller made by Physik Instrumente. The illumination objective 844 can be a model LMPLNSXIR 5×/0.10, a model LMPLN10XIR 10×/0.30, or a model XLFLUOR 4×/340/0.28 by Olympus.

The detection objectives 826, 828 can be high numerical aperture water-dipping detection objectives having the following exemplary specifications. For example, the detection objective can provide a magnification of 16× or 20× and have a numerical aperture of at least 0.8. The detection objective can be model CFI60/75 LWD water-dipping series by Nikon or an apochromat/plan-apochromat water-dipping series by Carl Zeiss.

The set of optical components 836, 838 can include a tube lens matched to respective detection objective 826, 828 plus a filter wheel equipped with an appropriate filter at the input to the camera 846, 848. The tube lens matched to the detection objective 826, 828 can be a CFI second lens unit by Nikon or an AxioImager 130 mm ISD tube lens by Carl Zeiss. The filter wheel can be a model 96A354 filter wheel with a MAC6000 DC servo controller by Ludl. The filter on the filter wheel can be one or more of a RazorEdge and EdgeBasic long-pass filter at 488 nm, 561 nm, and/or 594 nm or a BrightLine band-pass filter at 525 nm and/r 550 nm by Semrock.

The actuator 55(26), 55(28) for the detection objective 826, 828 can be a piezo positioner such as a model P-622.1CN PIHera piezo linear stage and using E-665 piezo amplifier and servo controller made by Physik Instrumente. The camera 846, 848 can be an Orca Flash 4.0 v2 camera with a JULABO water chiller by Hamamatsu.

As discussed with reference to FIG. 4B, the specimen 41 is mounted in a support matrix 405 that is supported by a holder 410. That holder is positioned within a specimen chamber that has four openings for permitting the light sheets 12, 14 to enter the specimen 41 and for permitting the fluorescence 36, 38 to enter the respective detection subsystems 116, 118. The specimen chamber also includes an opening for receiving the specimen 41. The chamber can be manufactured from black Delrin. The specimen holder 410 can be a holder cup manufactured from medical-grade stainless steel. Moreover, the specimen holder 410 can be mounted to a multi-stage positioning system for moving the specimen holder 410 and therefore the specimen 41 along any one of the X, Y, or Z axes. For example, the specimen holder 410 can be mounted to three translation stages, each translation stage arranged to translate the specimen holder 410 along one of the X, Y, or Z axes. The translation stage can be a model M-111K046 stage by Physik Instrumente. The specimen holder 410 can be mounted to a rotary stage such as a model M-116.2DG rotary stage by Physik Instrumente. The multi-stage positioning system can include a motion input/output interface and amplifier and a motion controller that communicates with the control system 180. For example, the amplifier can be a model C-809.40 4-channel servo-amplifier by Physik Instrumente and the motion controller can be a model PXI-7354 4-axis stepper/servo motion controller by National Instruments.

Details about the control system 180 and the computation framework 185 are provided next. The control system 180 includes hardware such as one or more output devices (such as a monitor or a printer); one or more user input interfaces such as a keyboard, mouse, touch display, or microphone; one or more processing units; including specialized workstations for performing specific tasks; memory (such as, for example, random-access memory or read-only memory or virtual memory); and one or more storage devices such as hard disk drives, solid state drives, or optical disks. The processing units can be stand-alone processors, or can be sub-computers such as workstations in their own right.

Figure 13:
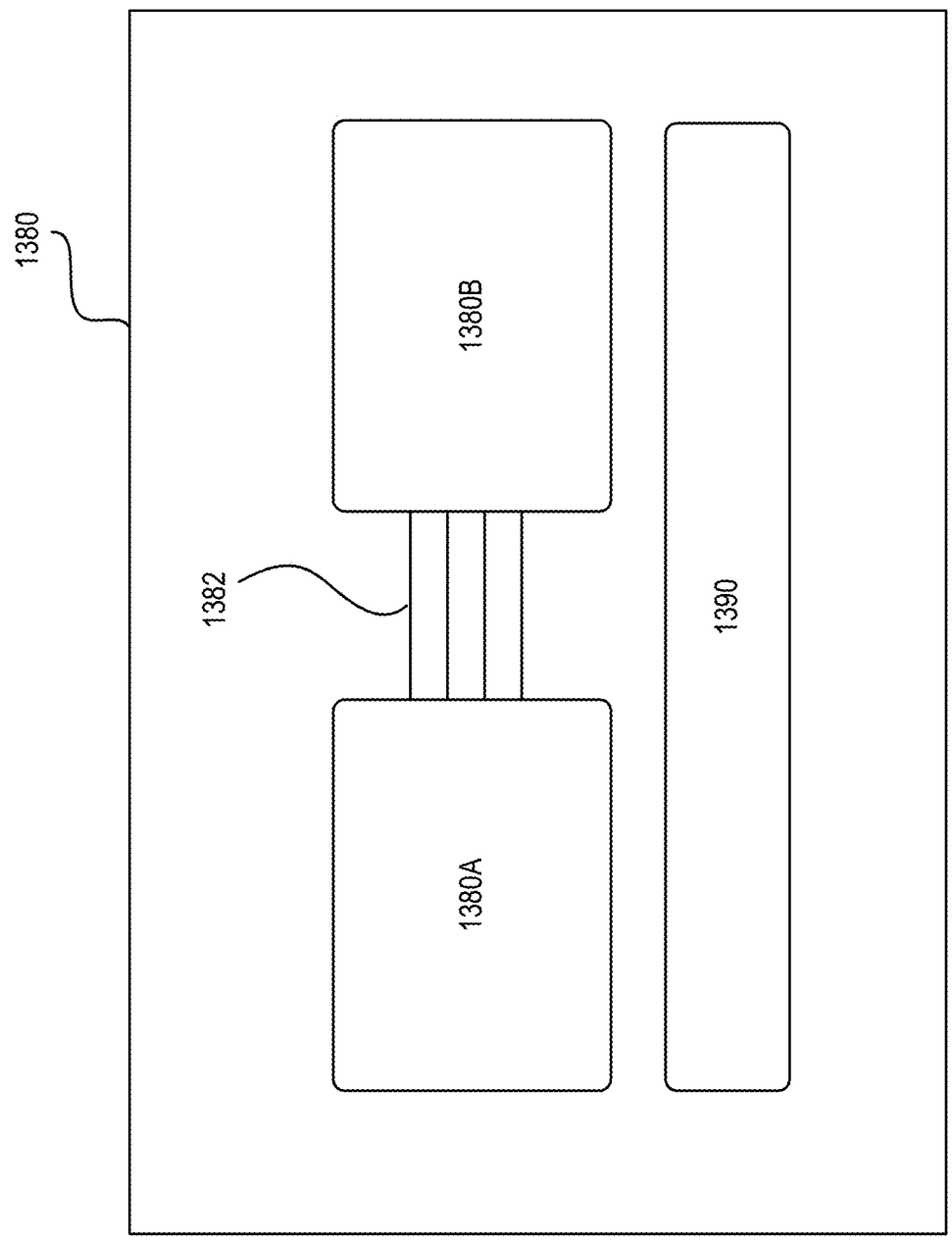
FIG. 13 is a block diagram of an implementation of a control system of the optical microscope of FIG. 1.

Referring to FIG. 13, the control system 180 can be designed as a control system 1380 having a distributed architecture in which some functions are allocated or located on a host computer (such as a high-performance workstation) 1380A while other functions are allocated or located on a real-time control system 1380B. For example, the user interface, short-term data storage, data management software, and the image acquisition and file logging can be located on the high-performance workstation. Moreover, the instrument control (the control for the optical microscope 110), the waveform generation, and experiment sequencing control software can be located on the real-time control system. The high-performance workstation 1380A and the real-time control system 1380B can, for example, communicate by way of a TCP/IP server client architecture 1382. The control system 1380 also includes a library 1390 for storing algorithms relating to the adaptive process for use by the computation framework 185. This library 1390 includes algorithms for focus and image quality metrics; the programming interface for state modeling and optimization; algorithms for mapping the three-dimensional geometry of the light sheet 12, 14 inside the specimen 11; and an interface for integrating the adaptive process with the primary control software.

In some implementations, the real-time control system 1380B is a PXI-8110 real-time controller (by National Instruments). This real-time controller can be equipped with four PXI-6733 high-speed analog input/output interface boards (by National Instruments), a PXI-8432/2 serial interface board (by National Instruments), and a PXI-7354 four-axis stepper/servo motion controller (by National Instruments), as well as a C-809.40 four-channel servo amplifier (by Physik Instrumente) and four BNC-2110 shielded connector blocks (by National Instruments). The software layer for real-time instrument control, waveform generation, experiment sequencing is deployed on the PXI-8110 real-time controller of the real-time control system 1380B. The PXI chassis holds four PXI-6733 8-channel analog output modules, which are used to control the galvanometer scanners (that is, the actuators 52(12, 14), 53(12, 14), and 54(14)), the light sources 822, 824, the triggers for the cameras 846, 848, the piezo positioners (for actuators 51(12, 14) and 55(26, 28)), the Pockels cell, and shutter states. Other PXI modules are used to control filter wheels and the motion of the holder 410.

In some implementations, the high-performance computer workstation 1380A is a high-performance computer workstation by Colfax International). This workstation can be equipped with two Xeon E5-2687W CPUs (Intel), 192 GB of memory allocated to imaging ring buffers, 14 SAS hard disks (2.5 XE 900 GB, Western Digital) combined into two RAID-0 arrays using an RS2WG160 SAS RAID controller (Intel) for concurrent streaming from two sCMOS cameras and an X520-SR1 10G fiber controller (Intel) for data offloading to the storage server. The workstation 1380A includes software modules for receiving, processing and online visualization of image data streams and a graphical user interface (GUI) for configuring primary imaging experiments and adaptive control using the adaptive system 160.

The adaptive system 160 operates in two distinct modes: an initial system optimization prior to primary light-sheet image acquisitions in a time-lapse imaging experiment on the specimen 11, and microscope state updates during the time-lapse experiment (such as shown in FIG. 6). A user of the adaptive system 160 conducts the initial system optimization mode, which automatically determines the values to use for each parameter [for example, Y(12, 14), D(26, 28), I(12,14), α(12,14), and β(12,14)] for each reference plane PL in the specimen 11 and for each wavelength of the light sheet 12, 14, by executing multiple converging iterations of microscope state adaptation. Then, during the time-lapse imaging experiment, the microscope state updates (which are assumed to be small corrections) occur at the user-defined intervals between experimental time points, as discussed above with reference to FIG. 6. This ensures that continuous spatiotemporal adaptation of the optical microscope 110 to dynamic changes in morphology and optical properties of the specimen 11, fluorescent marker distributions inside the specimen 11, and optical properties of the environment of the specimen 11.

As discussed above with reference to FIG. 6, to minimize or reduce the impact of the adaptive system 160 on the speed at which the images are acquired during the time-lapse experiment, the computation framework 185 monitors image quality exclusively during the idle time between time-point acquisitions (using less than 5% of the total microscope bandwidth) and quickly searches for better parameter settings at user-defined reference planes PL distributed throughout the volume of the specimen 11, 41 (typically 4-8 planes that partition the volume in 20-80 µm steps). To minimize or reduce the impact of the measurements taken at these reference planes PL, an algorithm is developed that is capable of computing optimal settings for three parameter classes simultaneously from a single defocus image sequence. This algorithm reconstructs the 3D light-sheet geometry inside the specimen 11 and thereby determines light-sheet angles α and β as well as light-sheet defocus offsets I.

The measurements performed across the volume of the specimen 11 for all ten degrees of freedom (parameters) are collectively used to formulate an optimization problem, from which a new, optimal state of the optical microscope 110 is computed. This optimization procedure employs a constraint graph, a mathematical object that represents the opto-mechanical degrees of freedom of the optical microscope 110 and their spatial, temporal and spectral relationships. In the constraint graph, each node represents a parameter and edges define constraints that are either fixed or dynamic in nature. Fixed constraints encode invariant geometrical and optical requirements, for example, enforcing continuity in image space across the two camera fields and aligning image data in multiple color channels.

Dynamic constraints relate to image quality measurements, presence or absence of local signal and local light-sheet geometry in the sample. In case of temporally dynamic or spatially sparse fluorescence-marker distributions, substitution constraints automatically tackle the lack of fluorescence signal at certain time points and at certain spatial locations in the specimen 11.

Figure 14:
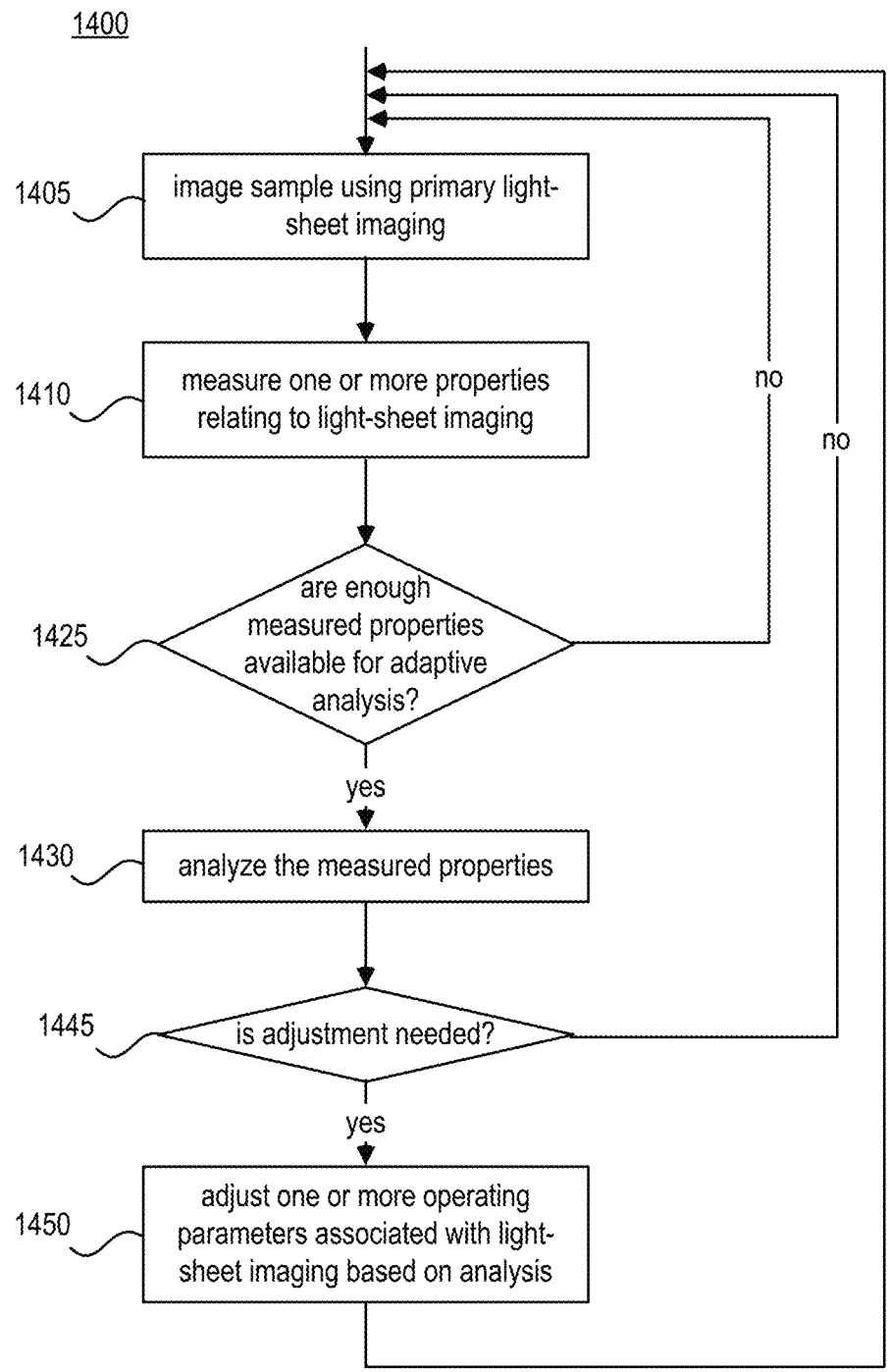
FIG. 14 is a flow chart of a procedure performed by the optical microscope of FIG. 1 under control of the control system for adaptive imaging.

Referring to FIG. 14, a procedure 1400 is performed by the optical microscope 110 under control of the control system 180 for adaptive imaging. The procedure 1400 includes imaging a sample (such as specimen 11, 41) using the light-sheet imaging (1405) under control of the control system 180. For example, with reference to FIG. 6, this the light-sheet imaging refers to the primary image acquisitions 605 in a time-lapse experiment on the specimen 11. As discussed above, light-sheet imaging (1405) includes generating light, forming one or more light sheets 12, 14 from the light at one or more positions within the sample along respective illumination axes, and recording images of fluorescence 36, 38 emitted along a detection axis from the sample due to the optical interaction between the one or more light sheets and the sample.

Next, one or more properties relating to the light-sheet imaging are measured (1410) under control of the adaptive system 160. For example, with reference to FIG. 6, these measurements (1410) can take place during the idle time 610 between the end of the last light-sheet imaging (1405) and the beginning of the next light-sheet imaging.

The adaptive system 160 determines whether enough measurements have been acquired (1425) in order to perform a complete analysis for determining if the optical microscope 110 needs to be adjusted. If enough measurements have been acquired, then the one or more measured properties are analyzed (1430) under control of the adaptive system 160. For example, with reference to FIG. 6, the analysis (1430) can coincide with the idle time 610 or it can run parallel with one or more of the primary image acquisitions 605. Otherwise, the procedure 1400 continues to perform light-sheet imaging (1405).

The adaptive system 160 determines whether, based on the analysis (1430), an adjustment to the optical microscope 110 is warranted (1445). If an adjustment is warranted (1445), then one or more operating parameters associated with light-sheet imaging (1405) are adjusted based on the analysis (1430) of the one or more measured properties (1450). This adjustment can be performed (1450) during the update 620 to the optical microscope 110 during the idle time 610 in between primary image acquisition 605.

The analysis (1430) of the one or more measured properties can be performed without making any assumptions about the sample 11. For example, the analysis (1430) can be performed without making assumptions about the physical properties of the sample 11, the optical properties of the sample 11, and the distribution and number of fluorescent markers within the sample 11.

The one or more properties relating to the light-sheet imaging that are measured can include one or more of: a quality of one or more recorded images, a position of the light sheet 12, 14 inside the sample 11, and/or an orientation of the light sheet 12, 14 inside the sample 11.

The one or more operating parameters associated with light-sheet imaging that are adjusted (1450) can include characteristics of one or more of: the one or more light sheets 12, 14, the sample 11, and the focal plane 26, 28 at which the images of fluorescence 36, 38 are recorded, such as, for example, one or more of: an angle between the light sheet 12, 14 and the detection focal plane 26, 28 at which the images of fluorescence 36, 38 along the detection axis are recorded, the one or more positions at which the light sheet 12, 14 is formed within the sample 11, and a relative position between the light sheet 12, 14 and the detection focal plane 26, 28.

The adjustment to the one or more operating parameters (1450) can include one or more of: rotating one or more light sheets 12, 14 relative to the sample 11; translating one or more light sheets 12, 14 along a direction perpendicular to the illumination axis Y; translating one or more light sheets 12, 14 along a direction parallel to the illumination axis Y; translating a waist of the light sheet 12, 14 along the illumination axis Y; and/or translating a focal plane 26, 28 at which the images of fluorescence 36, 38 are recorded along the detection axis Z.

Figure 15B:
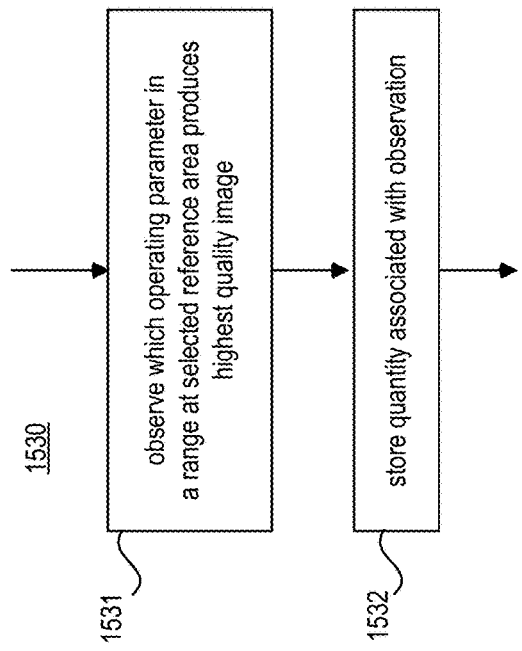
FIG. 15B is a flow chart of a procedure performed by the optical microscope of FIG. 1 for analyzing the properties measured by the procedure of FIG. 15A.
Figure 15A:
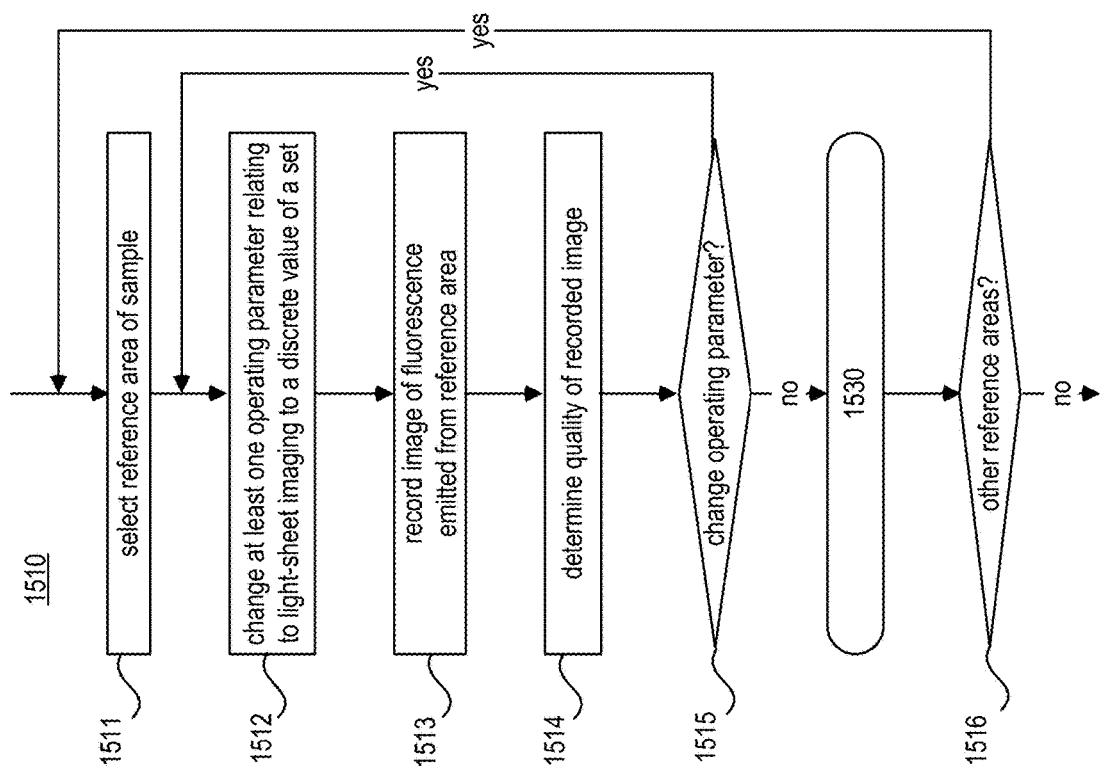
FIG. 15A is a flow chart of a procedure performed by the optical microscope of FIG. 1 for measuring one or more properties relating to light-sheet imaging.

Referring also to FIGS. 15A and 15B, the one or more properties relating to light-sheet imaging are measured according to a procedure 1510. The procedure 1510 is performed by the optical microscope 110 under control of the adaptive system 160, and specifically the computation framework 185.

At least one reference region of the sample 11 is selected (1511) for probing by the adaptive system 160. For example, the computation framework 185 can send a signal to the actuation apparatus 150 to configure the optical microscope 110 to probe the selected reference region of the sample 11 (for example, by adjusting properties of the detection subsystem 116, 118 and/or the illumination subsystem 112, 114). Next, at least one operating parameter relating to the light-sheet imaging is changed to a discrete value of a set of discrete values (1512). For example, the computation framework 185 can send a signal to the actuation apparatus 150 based on the discrete value of the operating parameter. Thus, after 1512 is completed, the adaptive system 160 is ready to probe the quality of imaging at a particular reference region and discrete value of at least one operating parameter. For example, the operating parameter relating to light-sheet imaging that is changed (1512) can be a plane of the light sheet and/or a focal plane 26, 28 at which the images of fluorescence 36, 38 are recorded.

The image of fluorescence 36 or 38 emitted from the reference region is recorded by the detection subsystem 116, 118 (1513). This recorded image is sent to the computation framework 185, which determines a quality of the recorded image (1514). The quality of the recorded image can be determined (1514) by applying an image quality metric to the recorded image to produce a real number that represents the quality of the recorded image. The computation framework 185 determines whether the operating parameter should be changed to another discrete value in the set of discrete values (1515). If so, then the computation framework 185 proceeds to change the operating parameter to another discrete value in the set of discrete values (1512). If all of the discrete values of the operating parameter in the set have been probed (and thus the image quality of the recorded image at each of these discrete values has been recorded (1514)), then, the procedure 1510 performs a procedure 1530 for analyzing the qualities of the recorded images, as shown in FIG. 15B. After the completion of the procedure 1530 that performs the analysis, the computation framework 185 determines whether other reference regions of the sample 11 need to be probed (1516), and if so, the next reference region of the sample is probed.

With reference to FIG. 15B, the procedure 1530 that performs the analysis includes the computation framework 185 (and specifically the software module 588 and/or software module 589) observing which operating parameter value in a range of operating parameter values at the selected reference region produces the recorded image with the highest quality (1531). The range of operating parameter values is not limited to the set of discrete values of operating parameters. In particular, a fitting strategy can be used based on the discrete value set to extract the location of an operating parameter value with higher resolution than the discrete values of operating parameters in the set. A quantity associated with the observation for the operating parameter for this reference region is then stored (1532) by the computation framework 185.

In some implementations, the procedures 1510 and 1530 are performed by the software modules 587 and 589, as discussed next. In these implementations, the computation framework 185 determines how to adjust the one or more operating parameters associated with light-sheet imaging based on the stored quantity obtained during the procedure 1530 and then proceeds to adjust the one or more operating parameters (1450). These operating parameters that are adjusted at 1450 can therefore correspond to the operating parameters that are changed during probing (1512). The computation framework 185 can make the determination of how to adjust the one or more operating parameters also based on one or more constraints that limit how the one or more operating parameters can be adjusted.

Moreover, a plurality of reference regions of the sample can be selected at 1511. For example, each of the reference planes $PL_0$, $PL_1$, ... $PL_K$ can be selected at 1511. A discussion relating to how the software modules 587 and 589 perform the procedures 1510 and 1530 is provided below with reference to FIGS. 16A-16D and 17A-17E.

In other implementations, the procedures 1510 and 1530 are performed by the software module 588. In these implementations, a plurality of reference regions of the sample are selected at 1511. Each reference region can correspond to a portion or sub-region of an image acquired by the detection subsystems 116, 118. For example, a set of z reference positions in a z direction from a detection focal plane are selected, and for each z reference position in the set, a plurality of reference regions (that correspond to the sub-region of the image) defined in the xy plane that is perpendicular to the z direction are selected. Each of the reference regions is distinct from other reference regions. A z direction is a direction perpendicular to the Z axis, and the xy plane is a plane parallel with the XY plane defined by the X and Y axes.

The operating parameter that is changed can be considered to be a first operating parameter relating to light-sheet imaging (such as a position of the plane of the light sheet 12, 14 or a position of the focal plane 26, 28).

In these implementations, the one or more operating parameters associated with light-sheet-imaging that are adjusted (1450) correspond to a second operating parameter that is distinct from the first operating parameter. For example, the second operating parameter than can be adjusted can be an angle between the light sheet 12, 14 and the focal plane 26, 28 of the detection subsystem 116, 118. Moreover, the procedure 1510 can include a determination regarding how to adjust the second operating parameter and this determination can be based on the stored quantities associated with the observation for the operating parameter for each reference region in the plurality of reference regions (1532).

In these implementations, the operating parameter value in the range of operating parameter values that is observed as producing the recorded image with the highest quality (1531) can be the focal plane that produces the recorded image with the highest quality. Moreover, the quantity associated with the observation that is stored can be a position in three dimensional space that is defined by the set of: a value at which the focal plane is positioned along a z direction and the corresponding reference region defined in the xy plane. In order to determine how to adjust the angle between the light sheet and the focal plane, the computation framework 185 can determine a most likely plane passing through each the stored position in three dimensional space.

A discussion relating to how the software module 588 performs the procedures 1510 and 1530 is provided below with reference to FIGS. 18A-18E.

Image Quality Metric

Fully automated spatiotemporally adaptive imaging critically requires a fast and robust procedure or method for estimating and quantitatively comparing image quality in different system states in order to observe which operating parameter value in the range of operating parameter values produces the recorded image with the highest quality (1531). An image quality metric that is highly sensitive to changes in resolution of the optical microscope 110 is one way in which image quality can be estimated.

A fundamental challenge in spatiotemporally adaptive imaging and optimizing the system state of complex, multi-axis microscopes such as the optical microscope 110 is the estimation and comparative analysis of image quality (1531).

Image quality metrics are evaluated for the purpose of automated image analysis in light-sheet microscopy. Imaging with light-sheet microscopy is very different from other imaging modalities such as wide-field microscopy and photography. Optical sectioning of a thin volume is achieved with spatially confined illumination. Subsequently, an image of this volume section is acquired using an objective with a similarly thin depth of field. Different parts of the illuminated volume appear more or less in focus depending on their position relative to the detection focal plane. Further differences arise from the hyperbolic axial profile of the Gaussian light sheet, aberrations introduced by the sample, and loss of contrast as a result of light scattering. Moreover, the relative impact of noise increases with increasing imaging speed and decreasing exposure time. Thus, an evaluation of existing image quality metrics can be performed in order to identify the best-performing metrics for the purpose of adaptive imaging in light-sheet microscopy using the adaptive system 160.

Image quality metrics, including conventional and modified candidate metrics are evaluated on image data sets covering a wide spectrum of types of specimen 11 (biological model systems), marker strategies, and imaging assays. Some image quality metrics rely on correlation between neighboring pixels in the image (such as a Vollath measure). Some image quality metrics rely on simple statistical quantities such as mean, max, variance, kurtosis, or histogram of pixel intensities. Some image quality metrics rely on the fact that light microscopy images are degraded by readout noise at the camera 846, 848 and are acquired by a band-limited optical system (that uses an optical band-pass filter in the set of optical component 836, 838), and these metrics are explicitly designed to quantify all and only the information that can pass through the optical band-pass filter of the optical microscope 110. Examples of image quality metrics that were evaluated based on this concept include data transforms such as Discrete Fourier Transform (DFT), Discrete Cosine Transform (DCT), and Discrete Wavelet Transform (DWT).

Using synthetic- and real-data benchmarks, the Shannon entropy of the normalized Discrete Cosine Transform (DCTS) is identified as one of the optimal or useful metrics for light-sheet fluorescence microscopy (that is performed by the optical microscope 110). The DCTS offers the best focus localization accuracy (mean error of 320 nm for a light sheet full-width at a half-maximum thickness of 3.0 µm and a detection depth of focus of 1.75 µm), high signal-to-background ratio near the global optimum and low density of local maxima along the focus curve, while operating at a median processing speed of 27 ns per pixel.

A detailed description of the metrics that were evaluated is included in U.S. Application No. 62/447,154, filed Jan. 17, 2017 and U.S. Application No. 62/354,384, filed Jun. 24, 2026, both of which are incorporated herein by reference in their entireties.

Software Modules 587/589 Performing Procedures 1510 and 1530

In principle, once the image metric is selected, then each operating parameter [I(12, 14), D(26,28), Y(12,14), α(12, 14), β(12,14)] can be adjusted and evaluated in isolation to optimize or improve the image quality output from the microscope 110. Nevertheless, in a complex optical microscope 110 with plural detection subsystems 116, 118 and plural illumination subsystems 112, 114, all of these operating parameters are interdependent. In the following, the mathematical theory behind optimization is discussed. For the sake of simplicity and clarity only, this description relates to an optical microscope 110 having up to two illumination subsystems 112, 114 and up to two detection subsystems 116, 118, and considering only system parameters corresponding to the translation of the detection plane and the planes of the light sheets 12, 14. The theory is then extended to a global optimization theory.

The optical microscope 110 consists of two coaxial detection arms (detection subsystems 116, 118) and two coaxial illumination arms (illumination subsystems 112, 114) in an orthogonal configuration. The state variables or parameters relevant for focusing are the positions of the two detection planes, denoted D(26) and D(28), and the positions of the two light sheets 12, 14 along the detection axis Z, denoted I(12) and I(14). These four state variable constitute the state vector S of the system:

$$S = \begin{pmatrix} D(26) \\ D(28) \\ I(12) \\ I(14) \end{pmatrix}.$$

The two detection arms image the fluorescence 36, 38 emitted by the specimen 11 onto two cameras 846 and 848, respectively. For each camera 846 and 848 there are two different images that can be formed by illuminating the specimen 11 using either the first light sheet 12 or the second light sheet 14. Therefore, for each combination of illumination and detection arm (I(12,14),D(26,28)), the optical microscope 110 can produce an image that is more or less focused depending on the values of I(12,14) and D(26,28). These variables are directly controllable by the microscope's electronics and software framework (discussed above) and have arbitrary undefined zero positions that cannot be assumed to correspond to a focused state.

Manual focusing of a four-arm light-sheet microscope 110 consists of, for example, fixing the parameter or variable D(26) and then adjusting I(12) and I(14) independently. Finally, variable D(28) can be set to two a priori different values based on the previously determined values I(12) and I(14). In order to reconcile these two values, one can simply take the average (if imaging eventually needs to be performed with both light sheets simultaneously). Other orders are possible, for example: fix I(12) first, then determine D(26) and D(28), and finally find a compromise for I(14). This naïve sequential approach has several shortcomings: (i) The only constraint that can be defined is the fixing of a variable, (ii) there is no guarantee that the overall system corrections are minimal, and (iii) the scheme is inherently progressive and as such it is not possible to take all necessary measurements before changing the state of the system. In the following, we show how these shortcomings are addressed in our focus optimization theory.

Referring again to FIGS. 5A-5G, the ten exemplary state variables relevant to adaptive imaging that are shown are D(26), D(28), I(12), I(14), Y(12), Y(14), α(12), α(14), β(12), and β(14). The goal of the adaptive system 160 is to produce highly focused images of the specimen 11. Focusing of the images produced by the optical microscope 110 depends on the distance between each detection plane 26, 28 and each light sheet plane. These distances can be computed using a focus matrix M, given by:

$$M = \begin{pmatrix} +1 & 0 & -1 & 0 \\ +1 & 0 & 0 & +1 \\ 0 & +1 & +1 & 0 \\ 0 & +1 & 0 & -1 \end{pmatrix}.$$

The signs of the entries in M depend on the orientations of the axes. In practice, it is possible that different units are used for D(26), D(28), I(12), and I(14). If this is the case, a single unit is chosen and some entries in matrix M have values that differ from +1 or −1. Moreover, variables D(26), D(28), I(12), and I(14) have a priori undefined zero positions because they directly translate into actuator (for example, the actuator 55(26), 55(28), 52(12), 52(14), 53(12), or 53(14) commands. It follows that the distances computed by the matrix M also have undefined offsets—a physical zero distance does not necessarily correspond to a numerical zero. The formalism can handle these under-determinacies, as discussed below. In fact, the primary purpose of the following theory is to be able to reason about the focused state of the optical microscope 110 in the absence of prior system calibration.

The matrix M computes from the state vector S the focus state vector F:

$$\begin{pmatrix} F_{12,26} \\ F_{12,28} \\ F_{14,26} \\ F_{14,28} \end{pmatrix} = F = MS.$$

Since the matrix M is rank-deficient of rank 3, it follows that different system states S correspond to the same focus state F. Intuitively, this can be understood by noting the focusing invariance when translating all planes in the same physical direction by the same amount. Formally, the system state S can be translated by any vector K in the kernel Ker(M) of M:

$$F=M(S+K)$$

In the case of the multi-view microscope 110 described here the kernel can be generated as follows:

$$Ker(M) = \left\{ k \begin{pmatrix} 1 \\ -1 \\ 1 \\ -1 \end{pmatrix} \middle| k \in \mathbb{R} \right\}.$$

In practice, since the state variables have limited ranges, the range of k is also limited.

Focusing the system means finding the optimal focus vector F such that all detection and illumination planes coincide. Each component $F_{u,v}$ of vector F is related to an image $J_{u,v}$ acquired with detector $D_u$, from which a focus value $f(J_{u,v})$ can be computed. Hence for each focus state F we can compute the following vector (by acquiring images and computing the focus value of each image):

$$\begin{pmatrix} \varphi_{12,26} \\ \varphi_{12,28} \\ \varphi_{14,26} \\ \varphi_{14,28} \end{pmatrix} = \varphi = \begin{pmatrix} f(J_{12,26}) \\ f(J_{12,28}) \\ f(J_{14,26}) \\ f(J_{14,28}) \end{pmatrix}.$$

For simplicity, φ can be written as f(F). The search for the optimum is achieved by independently varying each component $F_{u,v}$ of vector F until the maximum of each $\varphi_{u,v}$ is attained. Each $F_{u,v}$ can be varied by changing the position of the corresponding detection plane $D_u$ or $I_v$ (see first two columns of focus matrix M). However, in practice it is better to maintain the light sheets stationary in order to improve the comparability of the acquired images. Therefore, $F_{u,v}$ is varied by varying $D_u$. Corrections determined by varying $D_u$ instead or $I_v$ are valid for small displacements because we assume locality and continuity of corrections. Considering that the analysis and optimization begins from an a priori unfocussed focus state F and find by this method a new better focus state F', then:

$$\Delta F = F - F' = M(S - S') = M \Delta S,$$

where $\Delta F$ is the correction vector to the current focus state that achieves the highest focus quality and $\Delta S$ is the equivalent correction vector of the system state. Determining the system correction $\Delta S$ based on the focus state corrections $\Delta F$ requires the determination of the pseudo-inverse of the focus matrix M.

On exemplary pseudo-inverse is the Moore-Penrose pseudo-inverse. The Moore-Penrose pseudo-inverse of the matrix M is:

$$M^+ = \frac{1}{8}\begin{pmatrix} +3 & +3 & +1 & +1 \\ +1 & +1 & +3 & +3 \\ -3 & +1 & +3 & -1 \\ -1 & +3 & +1 & -3 \end{pmatrix}$$

The Moore-Penrose pseudo inverse returns the minimal $L_2$ norm solution $\Delta S$ of the system $\Delta F = M \Delta S$ for a given $\Delta F$:

$$\Delta S = M^+ \Delta F$$

The system can then be moved to a better-focused state S' by applying: $S' = S + \Delta S$. This formalism guarantees that the correction is mathematically well-defined.

In order to guarantee that the optimization process does not drift over time, the process can be anchored by requiring one of the variables D(26), D(28), I(12), or I(14) to be fixed. This can be achieved by adding to $\Delta S$ an appropriately chosen vector $\Delta K \in Ker(M)$ such the chosen component of $\Delta S$ becomes zero. Since $\Delta K$ belongs to $Ker(M)$ this new correction is still a solution to the system $\Delta F = M \Delta S$. This is similar to what could be achieved using the naïve manual approach. Alternatively, it is possible to maintain a fixed center of mass of the optical microscope 110. Since all degrees of freedom (parameters) considered here are along the same axis, and since the kernel $Ker(M)$ is of rank one, it follows that the center of mass can be parameterized by a single dimension obtained with the following product:

$$c = \begin{pmatrix} 1 \\ -1 \\ 1 \\ -1 \end{pmatrix}^T S$$

The alternating signs originate from the different axis orientations of D(26), D(28), I(12), and I(14). One can then adjust the correction $\Delta S$ by adding a $\Delta K \in Ker(M)$ such that the center of mass of the microscope 110 remains invariant. This capability addresses point (ii) mentioned previously when discussing manual focusing.

In those cases where only one detection arm and/or one illumination arm is needed, the corrections $\Delta S$ can be found by first setting the corresponding components of the focus correction vector $\Delta F$ to zero and computing the state corrections $\Delta S$.

$\Delta S$ can be determined from $\Delta F$ and $\Delta F$ is found by searching for the $F_{u,v}'$ that maximize the corresponding $\varphi_{u,v}'$. In practice, the optima $F_{u,v}'$ that maximize $\varphi_{u,v}'$ can be found by sampling m values of $F_{u,v}'$ around the initial values $F_{u,v}'$:

$$F_{u,v}^k = F_{u,v} + \left(\frac{2k - m + 1}{m - 1}\right) r,$$

where r is the search radius and $k \in [0, \ldots, m-1]$. In practice, it is useful to pick an odd number of samples m so that $$\frac{2k - m + 1}{m - 1}$$

can be zero, thus offering the possibility of no correction to the system. The optima $F_{u,v}'$ are then:

$$F_{u,v}' = \underset{F_{u,v}^k}{\mathrm{argmax}}\ \varphi_{u,v}^k$$

where $\varphi_{u,v}^k = f(J_{u,v}^k)$ and $J_{u,v}^k$ is the image acquired at detection subsystem u using the light sheet v. This simple ordered and batched sequential approach is faster than performing a Fibonacci search, a Golden section search, or Brent's method because of the preferred modes of operation of the microscope's hardware and electronics: The camera 846, 848 and low-level control electronics of the control system 180 perform much faster when instructed to acquire a deterministic, predefined sequence of images, and mechanical considerations require sequentially ordered commands. To improve robustness for low numbers of samples (m≤10) normalization of the focus values is performed:

$$\hat{\varphi}_{u,v}^k = \frac{\varphi_{u,v}^k - \varphi_{u,v}^{min}}{\varphi_{u,v}^{max} - \varphi_{u,v}^{min}}$$

Here, $$\varphi_{u,v}^{min} = \max_k \varphi_{u,v}^k \text{ and } \varphi_{u,v}^{max} = \min_k \varphi_{u,v}^k.$$

A standard Gaussian fit or our more robust argmax algorithm is applied to find $F_{u,v}'$.

Computing the argmax given k points of $\varphi_{u,v}^k = f(J_{u,v}^k)$ is described next. The simplest approach is to fit a Gaussian curve $$\phi_k = \alpha e^{-\frac{(k-\mu)^2}{\sigma^2}}$$

by optimizing the choice of $\alpha$, $\mu$, and $\sigma$ by means of the Levenberg-Marquardt algorithm. As discussed above, this Gaussian was found empirically to be a good model for the shape of the focus curve. Polynomial models are plagued by their natural tendency to oscillate and other Gaussian-like distributions such as Lorentz-Cauchy or Voigt do not perform well in practice and do not contribute anything more than added complexity. The MINPACK based implementation in the *Apache Commons Math* library (https://commons.apache.org/proper/commons-math) can be used with an initial step bound factor of 100, a cost relative tolerance of $10^{-10}$, a parameters relative tolerance of $10^{-10}$, and an orthogonality tolerance of $10^{-10}$. The optima $F_{u,v}'$ are then obtained by the following formula:

$$F_{u,v}' = F_{u,v} + \left(\frac{2\mu_{u,v} - m + 1}{m - 1}\right) r$$

While this approach performs well in many cases, it can lack robustness in imaging scenarios suffering from a low signal-to-noise ratio.

Argmax potentially has to be computed thousands of times during a time-lapse imaging experiment. In cases when the signal-to-noise ratio of the images is very low such as for pan-neural marker expression onset, this leads to noisy focus measurements $\varphi_{u,v}^{k}$, which in turn leads to noisy values that ultimately degrade the overall stability of the microscope 110. To address this problem, a robust argmax fitter algorithm can be developed that uses an ensemble approach.

Any straight-forward approach to fitting a curve to data points $\varphi_{u,v}^{k} = f(J_{u,v}^{k})$ and for finding the argmax is vulnerable to certain conditions. For example, Gaussian curve fitting works well with symmetric unimodal curves but is generally unsuited if the response is biased and asymmetric (non-null skewness). In this case, a $3^{rd}$ or $4^{th}$ order polynomial might be a better choice, but polynomials are notoriously bad interpolants that have a natural tendency to over-fit and catastrophically oscillate, especially in the presence of noise. Better approaches are, for example, spline interpolation or Loess filtering approaches, but again, there will be cases in which these fail, too. The solution is to estimate the argmax by leveraging many different approaches simultaneously. In the following, the argmax of $y=f(x)$ is searched. And, the following 11 estimates are computed in parallel:

1. Three point quadratic fit: This algorithm takes just three points (min, average, and max for x) and fits a single parabola.
2. Levenberg-Marquardt quadratic fit: This algorithm fits all the points to a parabola and returns the parabola's extremum location.
3. Levenberg-Marquardt Gaussian fit: This algorithm fits all the points to a Gaussian and returns the Gaussian's mean.
4. Levenberg-Marquardt quartic fit: This algorithm fits all the points to a quartic and returns its argmax.
5. Spline fit: An unclamped spline is fit to the data and determine the argmax empirically by high-resolution sampling.
6. Random spline fit: Random subsets of the data are selected, splines are fit to each, and the median argmax is computed across all data subsets. The objective is to achieve robustness against outliers.
7. Loess fit: The data is fit using the Local Regression Algorithm (Loess) and the argmax is computed empirically by high-resolution resampling.
8. Top 5 quadratic fit: The 5 data points (x, y) of highest y value are selected and a parabola is fit; the extremum location is returned.
9. Center-of-mass argmax: The center of mass of the data points is computed and interpreted as a distribution.
10. Mode: The mode of the data points is computed and interpreted as a distribution (x value for highest y value).
11. Median: The median of the data points is computed and interpreted as a distribution.

All these algorithms run simultaneously on different processor threads in the control system 180 and computing the median estimate combines their results into one robust estimate. It is highly unlikely that all or even many of the above argmax estimators will fail or give biased results for the same data sets. Overall, the median of all estimates gives us a more robust estimate of the ideal argmax value.

The capability to estimate the correct argmax value even in the presence of strong noise is important. However, knowing when to 'give up' is even more important. Thus, an evaluation can be made to determine when an argmax computation is reliable or not. In a worst-case scenario, the microscope 110 is being adjusted for a region of the specimen 11 devoid of significant fluorescence signal. This leads to a sequence of dark images $J_{u,v}^{k}$ dominated by noise and thus to a random sequence of $\varphi_{u,v}^{k}$ values. Most of the time, setting a threshold on the $\max_{F_{u,v}^{k}}(\varphi_{u,v}^{k})$ is sufficient to detect such cases and mark these measurements as unreliable. However, it is often necessary to adjust these thresholds for different types of experiments. It can be better to instead use a conservatively low DCTS threshold that excludes measurements that derive with high certainty from low quality images. Unfortunately, this leaves many borderline cases for which some signal is present but not enough to make a reliable argmax estimate. Another complementary approach is to set a threshold on the root mean square deviation (RMSD) of the data to a Gaussian fit. However, there is a fundamental difficulty in deciding on a threshold for the RMSD—this can be done empirically but with few guarantees. Overall, it would certainly be better if no such thresholds were needed in the first place. To solve this problem, the RMSD of the fit to the data is computed. Then, the RMSD values obtained by fitting Gaussians to hundred instances of the same data randomized by permutation of the $\varphi_{u,v}^{k}$ values is computed. In this way, an estimate of the probability that the observed RMSD is due to chance alone can be made. Intuitively, if the data is already random, it will be statistically undistinguishable after random permutation. However, if the data is not random—that is, it has a unimodal Gaussian-like shape—then after permutation it will lose its structure and the fit error will be drastically different. Formally, from the point of view of classical statistical hypothesis testing, the null hypothesis is that the data is random. By random permutation, the probability distribution of the RMSD under the null hypothesis is computed empirically—which permits the computation of the corresponding p-value. The p-value ($p_v$) is the probability of an event at least as extreme as the event that is considered (a given RMSD for true non-randomized data), assuming the truth of the null hypothesis. A threshold can be applied on an actual probability: $1-p_v$ which is usually well above 0.99 for good fits and can easily fall below 0.5 for highly noisy curves. In practice, thresholds such as 0.99 which have a well-defined interpretation are chosen while measurements that have a >1% probability of being 'hallucinated' from noisy data are rejected.

Before starting long term imaging sessions an initial focusing step is required. Since the optima $F_{u,v}'$ are a priori far from the current value $F_{u,v}$, r and m are set to large values (typically r=60 µm and m=121) to achieve an expected error of 0.5 µm. This would be too wasteful with respect to the available photon budget and might affect the physiology of, for example, early-stage embryos that are quite sensitive to light exposure. Instead, an iterative approach that incrementally narrows the search space can be used. For example, m can be set to 11, and the entire focusing procedure can be applied with radii from r=60 μm to r=3 μm in s steps, typically using s=3. This achieves a higher expected accuracy of ~0.25 μm (which is realizable in practice considering the benchmark performance of DCTS) for a total of only 33 samples (75% reduction of measurements).

In the absence of aberrations introduced by the specimen 11 or the medium in which the specimen 11 is embedded, one can assume that the determined focused state S remains valid at different depths in the specimen 11. However, in some specimens 11, such as entire fruit fly or zebrafish embryos, different corrections are required for optimal image quality at different imaging depths. To address this variability, the best state of the optical microscope 110 is determined at several imaging reference planes [$PL_0$, $PL_1$, ... $PL_{K-1}$] at respective locations along the Z axis [$Z_0$, $Z_1$, ... $Z_{K-1}$], and the corresponding optimal states [$S_0$, $S_1$, ... $S_{K-1}$] are stored. The computation framework 185 can linearly interpolate in between these stored optimal states, and linearly extrapolate outside the stored optical states to obtain a state $S_Z$ at an arbitrary imaging depth Z.

For not entirely transparent specimens, each detection subsystem 116, 118 can typically acquire high-quality image data only for about half of the specimen 11, that is, the half that the detection objective 826, 828 is facing, as shown in FIGS. 7A and 7B. For example, the detection subsystem 116 acquires high-quality image data for the half of the specimen 11 facing the detection objective 826. Moreover, the respective other detection subsystem 116, 118 generally provides better image quality for the other half of the specimen 11, owing to the shorter detection path length. With this in mind, centermost focusing reference planes PL are positioned at $Z_S$ and $Z_{S-1}$. For example, in FIGS. 7A and 7B, S=3. It follows that the determination of the optimal microscope states $S_{k \le s-1}$ for the half of the specimen 11 facing the detection subsystem 116 involves variables D(26), I(12), and I(14) whereas the determination of the optimal states $S_{k \ge s}$ in the half of the specimen 11 facing the detection subsystem 118 (Z>0) involves variables D(28), I(12), and I(14). Determining the optimal microscope state $S_k$ for each plane $Z_k$ independently would not ensure continuity of the imaged volume in the presence of relative drifts between variables D(26) and D(28). Spatial continuity is ensured for the half of the specimen 11 facing the detection subsystem 116 by maintaining D(26) in a fixed position and for the half of the specimen 11 facing the detection subsystem 118 by maintaining D(28) in a fixed position. Fixing the variables D(26) and D(28) can be a better choice than fixing the variables I(12) or I(14), in particular when using highly accurate actuators 55(26), 55(28) such as piezo positioners for moving the respective detection objectives 826, 828 (in contrast to the less accurate galvanometer scanners or tip-tilt mirrors responsible for moving the light sheets 12, 14). A continuous and well-defined link between the two halves of the specimen 11 is established by carrying over light sheet positions I(12) and I(14) at plane $Z_{S-1}$ to plane $Z_S$ and by solving the optical microscope system at plane $Z_S$ for D(28) by fixing both I(12) and I(14). This ensures seamless spatial continuity of the whole volume of the specimen 11.

During long-term imaging of specimens 11 such as developing embryos, which can take up to several days, imaging quality is usually at the mercy of thermal, mechanical, and electronic drifts as well as optical changes introduced by the specimen's own development. To improve optimal focusing throughout such time-lapse experiments, the best focused state $S^Z$ should be adjusted as successive points in time. The system state variable $S^{t,Z}$ becomes a function of time (t) and depth Z. Performing an entire refocusing sequence involving, for example, eight reference planes PL typically requires on the order of 80 image acquisitions. Given an average computational cost of 240 ms per image (including acquisition and processing), refocusing the whole microscope 110 would require approximately 19 seconds, which may not be acceptable depending on the available time budget. For example, when imaging *Drosophila* embryonic development for the purpose of cell tracking, a temporal resolution of 30 seconds is preferred in order to ensure that cells do not move by more than half a cell diameter from one time point to the next. When using motorized stages to move the specimen 11 for volumetric imaging in this scenario, there may not be more than 5 seconds of idle time (that is, time not spent on primary image acquisition) between time points that can be utilized for the measurements for the adaptive system 160 (such as shown in FIG. 6).

The solution to this problem is to distribute the measurements required for refocusing over multiple time points. The quanta of observation—the measurement that cannot practically be broken into smaller measurements—is the measurement of $\varphi_{u,v}^k$ for a given wavelength and depth Z. The acquisition duty cycle is often up to 90%. This means that less than 10% of time is available for the adaptive system 160 to perform image quality measurements. For typical acquisition settings in developmental time-lapse imaging, this translates to a time budget of 3 to 6 seconds between two time points available to acquire m images, compute the image quality metrics and determine the optimum parameter setting. Once all information is available to correct the microscope system state at depth Z, a new value $S^{t+1,Z}$ is computed, thus updating the previous value $S^{t,Z}$. FIG. 6 shows the experiment timeline and illustrates how image quality measurements can conceptually be distributed in time. In the case of high-speed functional imaging, it is typically not possible to perform image quality measurements without impacting the temporal resolution of the imaging experiment (simply because one would often run the acquisition at the maximum imaging speed the microscope 110 is capable of, thus leaving no time for image quality measurements). However, these types of recordings are usually so short that they only require initial focusing and do not benefit significantly from temporal refocusing.

The expression of fluorescent markers in the specimen 11 is not necessarily constant in space or time, for example, when imaging fluorescently tagged transcription factors or individually labeled populations of cells that move within the developing embryo. Thus, there is not always enough fluorescent signal from the fluorescence 36, 38 (that is, information) at a given time t and reference plane $Z_k$ to determine the best microscope system state $S^{t,Z}$. A spatio-temporal adaptive microscope 110 has to be robust to lack of signal either in time or space. Despite the high sensitivity of the DCTS image quality metric, focusing in the absence of a sufficient amount of fluorescent signal from the fluorescence 36, 38 introduces the risk of system oscillations due to noise. To address this challenge, two strategies are evaluated to decide whether a reference plane PL is devoid of signal: (i) an absolute focus value threshold $f_{min}$ is set, and (ii) an upper-bound for the error of the Gaussian fit is set. If, based on this definition, a reference plane $Z_k$ is empty, then the new microscope system state $S_k^t$ is set to the average $S_k^{t+1} = \frac{1}{3}(S_{k-1}^t + S_k^t + S_{k+1}^t)$, where $S_{k-1}^t$ and $S_{k+1}^t$ are the previously determined focused states from neighboring planes (if k−1<0 or k+1>n−1 then $S_k^t$ is used instead). It follows that reference planes PL that do not provide enough fluorescent signal from the fluorescence 36,38 follow the behavior of their neighboring planes until the local signal becomes strong enough to determine a better local optimum.

A common specimen 11 preparation strategy in light-sheet microscopy is based on embedding the specimen 11 in low-density agarose gels. These gels offer excellent imaging quality but they can also introduce a tendency of drift in which the specimen 11 moves along any one or more of the X, Y, or Z axes in long-term imaging sessions. In extreme cases, these drifts can jeopardize the recording itself if parts of the specimen 11 move outside of the imaged volume. In addition, the position of the planes $Z_k$ relative to the embryo may change because of these drifts, which can in principle affect the quality of the spatio-temporal focusing. To address this problem, three-dimensional specimen tracking techniques are implemented that maintain the specimen 11 stationary within the imaged volume.

Next, global optimization theory is discussed. The basis of the global optimization theory for spatiotemporally adaptive imaging is the realization that the inverse problem formulated in the basis of the focus matrix M can be extended so that a single potentially large linear inversion problem can represent all observations, linear parameter relationships, and constraints pertaining to all degrees of freedom (all parameters) for all reference planes PL [$PL_0$, $PL_1$, ... $PL_{K-1}$] and all color channels (wavelengths). The optimization is performed simultaneously for all degrees of freedom (parameters), thus reducing the propagation of noise from individual observations. This makes it possible to accurately compensate for chromatic aberrations in multi-color imaging and to introduce sophisticated parameter anchoring and bridging schemes.

In the following, some assumptions are made, without loss of generality. First, it is assumed that spatiotemporally adaptive imaging is performed for a multi-view light-sheet microscope 110 comprising two detection subsystems 116, 118 and two illumination subsystems 112, 114. The state vector S of the microscope 110 contains the values for all the degrees of freedom (the parameters) for all reference planes PL and all color channels (wavelengths).

$$S = \begin{pmatrix} D(26) \\ D(28) \\ I(12) \\ I(14) \\ Y(12) \\ Y(14) \\ A(12) \\ A(14) \\ B(12) \\ B(14) \\ \ldots \end{pmatrix}.$$

The degrees of freedom D(26), D(28), I(12), I(14) are the same variables previously described. The new state variables Y(12), Y(14) correspond to the translation of light sheets 12, 14 along their respective illumination axes (which are parallel with the Y axis). The parameters A(12), A(14), and B(12), B(14) correspond, respectively to the two angular degrees of freedom (α and β) of each light sheet 12, 14. For every color channel and for every reference plane PL, the state vector $S^t$ contains entries for each of the 10 degrees of freedom. For example, for a two-color, three-plane configuration, the state vector S would be of length 60. A color channel corresponds to the set of images acquired for a specific excitation wavelength and detection filter. If multiple wavelengths are used during a primary imaging experiment, images for each wavelength can be acquired sequentially and a dedicated set of microscope state parameters can be used in each of these acquisition phases. This can be useful, for example, if the laser beam for one wavelength does not perfectly coincide with the laser beam for another wavelength or if the specimen 11 has different optical properties at different wavelengths—thus different settings α, β, Y, I, D might be needed for each wavelength to obtain optimal images.

The fundamental difficulty in adding the angular degrees of freedom A(12) and A(14) as well as B(12) and B(14) is their coupling with I(12) and I(14) and indirectly with D(26) and D(28). Indeed, since the rotation axes of the light sheets 12, 14 are not necessarily matched to the geometrical center of a given optical section of the specimen 11, a change of the angular degrees of freedom A and/or B can also lead to a defocus of the light sheets 12, 14 relative to the detection focal planes 26, 28. A simple calibration scheme can be utilized to identify the parameters required to shift the rotation point of a light sheet 12, 14 to a specific point within the specimen 11:

$$I' = I - d_a \tan(A) - d_b \tan(B)$$

Here, $$\begin{pmatrix} d_a \\ d_b \end{pmatrix}$$

is the vector that displaces the light-sheet's rotation point. This transformation ensures orthogonality of the image quality metric with respect to the positions and angles of the light sheets 12, 14. In the following, it is assumed that for each light sheet 12, 14, the control variables I, A, and B have been decoupled by such a transformation. The optimization of the variables Y, A, and B is largely independent of the main variables D and I. It follows that each of these degrees of freedom can be optimized as an independent, one-dimensional optimization problem. For the sake of simplicity, the new, additional variables are ignored in the following exposition.

Referring to FIGS. 16A to 16D, key concepts underlying the global optimization theory for spatiotemporally adaptive imaging are shown. For simplicity and readability, these illustrations consider only four (D(26), D(28), I(12), and I(14)) out of the ten degrees of freedom [D(26), D(28), I(12), I(14), Y(12), Y(14), α(12), α(14), β(12), and β(14)) used in the framework for spatiotemporally adaptive imaging. Moreover, for simplicity, it is noted that in FIGS. 16A to 16D and in the accompanying discussion relating to FIGS. 16A to 16D, $D_1$ represents D(26), $D_2$ represents D(28), $I_1$ represents I(12), and $I_2$ represents I(14); $z_i$ corresponds to the location of a reference plane $PL_i$ in the Z axis, and the colors are given by wavelengths $\lambda_0$ and $\lambda_1$.

FIG. 16A shows a constraint graph representation of the focusing constraints for $D_1$, $D_2$, $I_1$ and $I_2$ in a two-color ($\lambda_0$ and $\lambda_1$), three-plane ($z_0$, $z_1$ and $z_2$) configuration. Variables representing light-sheet offset positions ($I_1$ and $I_2$) are linked via defocus measurements observed relative to the detection objective positions ($D_1$ and $D_2$). Since the piezo positioners attached to the detection objectives 826, 828 are the most precise spatial measurement devices in the microscope 110 and thus serve as spatial references, the detection objectives 826, 828 are maintained at constant positions for all reference planes ($z_0$, $z_1$ and $z_2$) in a given color channel ($\lambda_0$ and $\lambda_1$). The two color channels are linked by the requirement that the center of mass of the positions of the detection objectives 826, 828 (but not their individual, absolute positions) are the same for different color channels.

FIG. 16B shows that the focusing constraints can be compiled into a single matrix M that describes the linear relationships between the state variable S and the defocus and constraint violation observations F. The values $F_{u,v}$ are defocus measurements and the values $V_k$ constraint violation correction terms.

FIG. 16C shows an illustration of the system anchoring constraint (fixed center of mass of the positions of the detection objectives 826, 828), which is required to prevent drift of the center of mass of the microscope 110. For clarity and simplicity, this constraint is omitted in panel FIG. 14A.

FIG. 16D shows that if the signal from the fluorescence 36, 38 is weak or nonexistent in any reference plane PL and at any time during the experiment (for example, in a region of the specimen 11 that does not or not yet express a genetically encoded fluorescence marker, or in a region of the specimen 11 that is not yet occupied by cells but will become populated later in the course of a large-scale cell movement event) the image quality metric responds below a predefined threshold and special substitution constraints are used to approximate the missing information. In the example shown here, light-sheet offset positions are set to the value at one neighboring reference plane. In practice, this value is set to be the average values of the neighboring reference planes unless the reference plane considered is the first or last reference plane.

In a manner reminiscent of factor graphs in Bayesian probability theory, the optimization problem can be represented as a constraint graph in which the nodes are state variables (individual entries of the state vector S) and the edges are constraints on these variables. FIG. 16A provides an example of a constraint graph for a two-color, three-plane configuration with a single bridging plane ($z_1$) and the same center of mass for both color channels. In this example, there are three types of constraints: (i) defocus constraints that are dependent on defocus measurements and can thus vary in time, (ii) equality constraints that enforce sample depth invariance of the positions of the detection objectives 826, 828, and (iii) center of mass equality constraints that ensure that the mid-point between the two detection objectives 826, 828 is the same for all color channels. For simplicity, constraints that are required for anchoring the system or handling missing or unreliable defocus information are omitted. In the following, the three constraints shown in FIG. 16A as well as other useful constraints are discussed in detail. These constraints that are discussed are: defocus constraints, equality constraints, center of mass equality constraints, anchoring constraints, and filling-in missing information with substitution constraints.

The most important constraints are defocus constraints that link detection objectives positions ($D_1$, $D_2$) to light sheet positions ($I_1$, $I_2$):

$$\Delta F_{u,v} = \Delta D_u - \Delta I_v$$

The sign of the difference is chosen so that $\Delta D_u \Delta F_{u,v} > 0$, which allows measuring the defocus $\Delta F_{u,v}$ by changing $D_u$ while keeping $I_v$ constant.

This other very basic constraint arises, for example, when it necessary for the positions of the detection objectives ($D_1$ and $D_2$) to be invariant with imaging depth (z):

$$0 = \Delta D_u^z - \Delta D_u^{z'}$$

This signifies that any change $\Delta D_u^z$ to $D_u^z$ must be accompanied by the same change to $D_u^{z'}$. Assuming that $D_u^z$ and $D_u z'$ are initially equal it follows that $D_u^z$ and $D_u^{t,z'}$ will remain equal after corrections are applied. The differential aspect of these constraints can be removed by replacing 0 with a correction term obtained by observing the current values of $D_u^{t,z}$ and $D_u^{t,z'}$:

$$-(D_u^{t,z} - D_u^{t,z'}) = \Delta D_u^z - \Delta D_u^{z'}$$

This ensures that the corrections $\Delta D_u^z$ and $\Delta D_u^{z'}$ are such that $D_u^{t+1,z} = D_u^{t+1,z'}$ even if this is not the case initially.

Detection objectives suffer from chromatic aberrations that cause the working distance to slightly vary from one wavelength to another. The focal plane 26 or 28 of the detection objective 826, 828 shifts depending on the wavelength of the fluorescence 36, 38 to be imaged. For example, for the Nikon 16×/0.8 objectives used in some experiments, the focal plane 26 or 28 shifts by about 0.8 μm when imaging fluorescence 36, 38 produced by green fluorescent proteins (GFP) versus imaging fluorescence 36, 38 produced by red fluorescent proteins (RFP). Since the multi-view light-sheet microscope 110 employs two detection objectives 826, 828 that face each other, different wavelengths require different relative distances between the two objectives 826, 828. Ideally, the center of mass of the two objectives 826, 828 should be stationary as it coincides with the focal planes 26, 28. This constraint can be expressed as follows:

$$0 = \Delta D_1^{\lambda_1} + \Delta D_2^{\lambda_1} - \Delta D_1^{\lambda_2} - \Delta D_2^{\lambda_2}$$

Similarly, this differential constraint can be made integral:

$$-(D_1^{\lambda_1} + D_2^{\lambda_1} - D_1^{\lambda_2} - D_2^{\lambda_2}) = \Delta D_1^{\lambda_1} + \Delta D_2^{\lambda_1} - \Delta D_1^{\lambda_2} - \Delta D_2^{\lambda_2}$$

For simplicity in the notation, the variable t is omitted in $D_1^{\lambda_1}$, $D_2^{\lambda_1}$, $D_1^{\lambda_2}$, $D_2^{\lambda_2}$.

The matrix M in FIG. 16A does not have full rank. There remains one unconstrained degree of freedom: the center of mass of the entire system can be translated while still maintaining proper instrument alignment. To anchor the system and prevent drift over multiple correction rounds, one can constrain the center of mass of the detection objectives 826, 828 to remain constant:

$$0 = \Delta D_1 + \Delta D_2$$

Again, in integral form this can be expressed as follows:

$$-(D_1 + D_2) = \Delta D_1 + \Delta D_2$$

The corresponding constraint is shown in FIG. 16C.

As discussed above, the signal from the fluorescence 36, 38 may be (sometimes or even permanently) low or nonexistent for certain color channels or reference planes PL in which the respective fluorescent markers of the specimen 11 are not present. In this situation, image quality measurements are not necessarily reliable. In the interest of system robustness, it is thus preferable to use neighboring planes or complementary color channels as proxies. In this way one can, for example, substitute missing defocus observations by interpolating neighboring light-sheet positions. This can be done in practice by simple averaging, for example:

$$0 = -2\Delta I_v^{zk} + \Delta I_v^{zk-1} + \Delta I_v^{zk+1}$$

If this is the only constraint involving $\Delta I_v^{zk}$ the value of $I_v^{zk}$ will follow the average variation of its neighbors, but it will not necessarily be equal to the average value of its neighbors. Alternatively, the integral form can be used:

$$-(-2\Delta I_v^{zk}+I_v^{zk-1}+I_v^{zk+1})=2\Delta I_v^{zk}+\Delta I_v^{zk-1}+\Delta I_v^{zk+1}$$

In this case, the value of $I_v^{zk}$ is the average of $I_v^{zk-1}$ and $I_v^{zk+1}$ after corrections are applied even if this is not the case initially. The corresponding constraint is shown in FIG. 16C.

Each constraint in the graph is a linear equation involving a subset of entries in S and the corresponding entry in F. It follows that each constraint can be encoded as a row in matrix M. FIG. 16B shows the matrix M corresponding to the constraint graph in FIG. 16A. The different types of constraints are implicitly grouped together in matrix M by means of ordering the entries in F.

The generalized focus matrix explicitly relates the vector of defocus observations ΔF to the state vector correction ΔS:

$$\Delta F = M \Delta S$$

In contrast to the basic progressive approach, the state vector S now contains the state information for all colors and planes, and ΔF contains defocus measurements and correction terms for integral constraints.

Corrections ΔS of the state vector S are computed by pseudo-inverting the focus matrix M and computing ΔS given ΔF:

$$\Delta S = M^+ \Delta F$$

As discussed, this solution corresponds to the least-squares solution ($L_2$ norm). This means that the vector ΔS of minimal energy ($L_2$ norm) is returned. This is the simplest approach to obtaining ΔS. Other approaches that are more sophisticated and/or powerful are possible, and those are discussed next.

The approach described previously is best if the matrix M is of full rank or is over-constrained. If the matrix M is not of full rank—for example if the system is not anchored—the problem is ill-posed, as there are potentially many different solutions ΔS. In this case it is advantageous to search for the solution ΔS of minimal $L_1$ length that favors sparse correction vectors ΔS. Intuitively, this approach modifies the least number of degrees of freedom to achieve optimal focus.

Despite all efforts to limit the propagation of noise from the measurements to the actual corrections, it remains helpful in practice to limit the correction amplitude of certain degrees of freedom more than others (for example for detection planes $D_u^{t,z}$ versus light sheet offsets $I_v^{t,z}$). Limiting corrections after optimization is not an option because it might lead to an improperly aligned system. Our solution to this problem consists of integrating the bounds into a more general optimization problem. The following constrained quadratic optimization problem can be solved:

$$\underset{\Delta X}{\text{argmax}} \|M\Delta S - \Delta F\|^2$$
$$-L_i < \Delta S_i < L_i \quad \text{for all } i$$
$$-\Delta F_i < (M\Delta S)_i < \Delta F_i$$

The $L_i$ are the components of the limits vector L that limit corrections for each degree of freedom. The values $\Delta S_i$ are the components of the state correction vector ΔS, and $(M\Delta S)_i$ are the components for the vector MΔS. The first set of inequalities limits the corrections for each degree of freedom. The second set ensures that when a constraint from the constraint graph is already satisfied, $(\Delta F)_i=0$, it will remain satisfied, $(M\Delta S)_i=0$. Another way to understand the role of these inequalities is as sparsity-inducing inequalities that avoid propagation of corrections throughout the constraint graph by favoring local corrections for local problems (but not local solutions to global problems).

A correction cycle consists of (i) acquiring all defocus measurements ΔF and (ii) computing the correction vector ΔS and applying these corrections.

In extreme cases, a correction cycle for several color channels and many reference planes PL can take up to a few minutes to complete. In particular, there is a delay between the defocus measurements and the application of corrections (the expected delay is half a correction cycle). This means that on average 1.5 correction cycles elapse until a perturbation of the microscope 110 is corrected. However, defocus corrections for the light sheets 12, 14 can be applied immediately after observing them, while keeping the last corrected system state unchanged as a reference for subsequent observations and corrections. Thereby, the adaptive system does not affect the normal global correction cycle but at the same time defocus can be corrected locally as quickly as possible. These fast local corrections modify $I_1$ and $I_2$ but generally cannot be allowed to modify the values $D_1$ and $D_2$. This can be understood from the constraint graph (see for example FIG. 16A), in which the variables for $I_1$ and $I_2$ are 'leaf nodes' and can thus be optimized locally in a first approximation.

In addition to handling specimen-induced image perturbations, an automated microscope 110 for adaptive imaging should also be able to quickly recover from system-induced image perturbations. In order to systematically test the capabilities of the adaptive system 160 to this end, external perturbations were induced while recording a 4-hour time-lapse of germ band retraction and dorsal closure in a nuclear labeled (His2Av-RFP) *Drosophila melanogaster* embryo. During this experiment, the zero offsets of piezo actuators defining detection objective 826, 828 positions and tip/tilt mirrors defining light sheet 12, 14 offsets were manually shifted (at the hardware level). Importantly, the computational framework is unaware of the execution, timing and magnitude of these perturbations since the perturbations were manually induced downstream of the software and electronics layers (by adjusting baseline voltages through the respective knobs on the analog controllers).

A complete four-view 3D image data set of the *Drosophila* embryo (comprising 515×1186×111 voxels per image stack) was acquired once every 30 seconds. Every 4 minutes a full correction cycle for 4 uniformly spaced reference planes was completed. Depending on when perturbations occurred relative to the phase of the correction cycle, single planes and views could be corrected within as little as 30 seconds. To ensure that the whole system does not drift with respect to the sample over time, the position of the first detection objective ($D_1$) is locked and allowed corrections only to the other degrees of freedom. Nine different types of perturbations are triggered, each involving a subset of the four main degrees of freedom of the microscope 110: the positions of the two detection objectives ($D_1$ and $D_2$) and the offsets of the two light sheets ($I_1$ and $I_2$).

FIG. 17A provides an overview of the nine perturbations, including the corresponding degrees of freedom affected by each perturbation and the amplitude of the perturbation. In FIG. 17A, a volumetric DCTS focus value is shown as a function of time during an adaptive live imaging experiment of *Drosophila* embryogenesis (in which the specimen 11 is a *Drosophila*), in which nine perturbations of the positions of the detection objective 826, 828 and offsets to the light sheets 12, 14 were introduced manually. Each of the nine perturbations introduces a temporary dip in focus quality (blue bars), which is subsequently restored through appropriate countermeasures initiated by the automated framework 185 for spatiotemporally adaptive imaging provided by the adaptive system 160.

Perturbations #1 to #6 are instantaneous changes of individual degrees of freedom ($D_1$, $D_2$, $I_1$, $I_2$) and pairs of degrees of freedom ($D_1$ and $D_2$, $I_1$ and $I_2$). Perturbations #7 and #8 are two slow ramps (misaligning the system at a rate of 1 µm/min), involving first $I_2$ and then $D_1$. The final perturbation #9 is a strong (8 µm) instantaneous change of $I_2$ and $D_1$ simultaneously that brings the system back to the initial baseline configuration prior to perturbation #1. This last perturbation is so strong that it is very unlikely to occur in a 'normal experiment' performed with the biological specimen 11 alone. However, this test was included as well in order to seriously challenge the system and evaluate its robustness under extreme conditions.

In order to monitor the quality of the image data recorded by the microscope 110, for each acquired volume, a volumetric quality metric is computed based on the best performing focus metric (DCTS). FIG. 17A shows that embryonic development leads to a positive longitudinal trend in the volumetric focus quality metric, which is due to the increase in nuclei density and the corresponding increase in fine details and high frequency textures in the imaging volume over time. More importantly, this visualization also shows how each perturbation leads to a temporary dip in the volumetric focus quality metric.

FIG. 17B shows four degrees of freedom ($D_1$, $D_2$, $I_1$, $I_2$) of the microscope 110 as a function of time for reference plane $z_2$. FIG. 17B shows the changes automatically applied by the system to the four degrees of freedom at reference plane $z_3$. Reference plane $z_3$ was selected for this demonstration because images at this plane are linked to the unconstrained degree of freedom $D_2$ (which makes the data readout at this location particularly useful for evaluating system robustness).

FIG. 17C shows a maximum-intensity projection (left) and a time series of an enlarged view of a small region of the embryo directly before and shortly after the fourth perturbation (right). The image sequence highlights the quadrant of the specimen 11 illuminated by objective $O_4$ and imaged with objective $O_2$. Optimal focus quality is restored within 0.5 minutes (min) for the shown quadrant and within 2 min for the entire volume of the specimen 11.

FIG. 17D shows the maximum-intensity projection (left) and the time series of an enlarged view of the small region of the embryo directly before and shortly after the fifth perturbation. The image sequence highlights the quadrant of the specimen 11 illuminated by objective $O_4$ and imaged with objective $O_2$. Optimal focus quality is restored within 1 min for the shown quadrant and within 4 min for the entire volume of the specimen 11.

FIG. 17E shows the maximum-intensity projection (left) and the time series of an enlarged view of the small region of the embryo directly before and shortly after the ninth perturbation. The ninth perturbation is the most severe system perturbation included in this benchmark. The two image sequences highlight regions in the quadrant of the specimen 11 illuminated by objective $O_4$ (right) and $O_3$ (left) and imaged with objective $O_1$.

FIGS. 17C-17E show image sequences for quadrants illuminated by objective $O_4$ (right) and $O_3$ (left) and imaged from objective $O_1$. The simultaneous shifts of $D_1$ and $I_2$ by 8 µm each in the same direction cancel each other out for the quadrant illuminated by $O_3$ and imaged by $O_1$. Recovery from the fairly dramatic loss of focus quality seen in the image data for the quadrant illuminated by $O_4$ and imaged by $O_1$ takes 16 time points locally and 22 time points for the entire volume.

FIGS. 17C, 17D, and 17E show how image quality at plane $z_3$ is affected by three example perturbations #4, #5 and #9. As shown in FIG. 17A, perturbation #4 leads to a very small dip in the volumetric image quality metric, which is further confirmed by the almost imperceptible degradation of image quality following the perturbation shown in FIG. 17C. Perturbation #5 involves both detection objectives 826, 828 and is fully compensated at plane $z_3$ within 2 time points (1 minute) and throughout the entire volume within 10 time points (a period close to the length of the full-system correction cycle (see FIG. 17A). In contrast, the exceptionally strong perturbation #9 (amplitude: 8 µm) requires two full correction cycles to be fully corrected throughout the specimen volume.

As shown in FIGS. 17A and 17E, the adaptive system 160 is capable of successfully recovering even under extreme conditions, such as when confronted with strong external perturbations of its properly focused state. Notably, during this same test experiment the adaptive system 160 also successfully handled sample-induced perturbations by following and adjusting to the development of the live embryo.

As discussed above, adjustments to the degrees of freedoms (DOFs) was by means of sequential line searches. However, for the two angular light-sheet degrees of freedom, α and β, this approach is inappropriate because changing the light-sheet angles also changes the section of the specimen 11 that is illuminated, as shown in FIGS. 5E and 5F. In this scenario, it would then be necessary to compare the quality of images that originate from different underlying fluorophore distributions, which results in an ill-posed problem. In the following, details on the image analysis algorithm developed for extracting light-sheet geometry parameters directly from a single focus stack—the same stacks used for optimizing D and I—are provided. This approach thus avoids changing the light-sheet angles for determining the 3D light-sheet geometry, thus overcoming the problem outlined above, and has the additional advantage of minimizing the number of images that need to be acquired to optimize the system state, thus minimizing the impact on the specimen's photon budget.

Software Modules 588 Performing Procedures 1510 and 1530

In addition to adapting the positions of light-sheet planes, light-sheet waists, and detection focal planes 26, 28, the adaptive system 160 controls the three dimensional angles between the light-sheet and detection focal planes (α(12), α(14), β(12), and β(14)). These degrees of freedom are used to compensate for spatially variant light-sheet refraction at the interface between the specimen 11 and its environment. Without spatial adaptation of light-sheet angles, the corresponding loss of co-planarity between light-sheet and detection focal planes degrades spatial resolution and image quality, as it becomes impossible or difficult to focus across the entire field of view, as shown in FIGS. 18A and 18B. FIG. 18A shows how the light sheet angle θ inside a live specimen 11 is expected to change between image planes as a result of refraction at the interface between the mounting matrix (which has a refractive index $n_m$) and the specimen 11 (which has a refractive index $n_e$) because the refractive index $n_m$ does not equal the refractive index $n_e$. By contrast, the light sheet angle α is not expected to vary across ovoid shaped specimens 11 if their short axis is aligned with the illumination axis. FIG. 18B shows the effect of refraction on the quality of the images. If the light sheet planes and the detection focal planes 26, 28 are co-planar outside the specimen 11, but tilted with respect to each other inside the specimen 11, not all regions illuminated by the light sheet 12, 14 are in focus simultaneously. For example, at a depth of 50 μm in a *Drosophila* embryo, optimal focus settings change continuously across the image plane, as shown by comparing labeled regions a, b, c, and d), and this leads to a 2 μm focus spread that corresponds to β=0.6°.

FIG. 18C shows how the measuring and correcting of angular mismatches α and β between the light sheet planes and the detection focal planes improves spatial resolution beyond the level achieved by spatiotemporally adaptive imaging restricted to only the degrees of freedom D, I, and Y. Representative examples of superficial and deep image regions in a *Drosophila* embryo are shown as enlarged views (purple, green) acquired with (top) and without (bottom) adaptive optimization of α and β. The line profiles (bottom) reveal sub-cellular features that are not resolved by correcting only D, I, and Y.

Figure 18D:
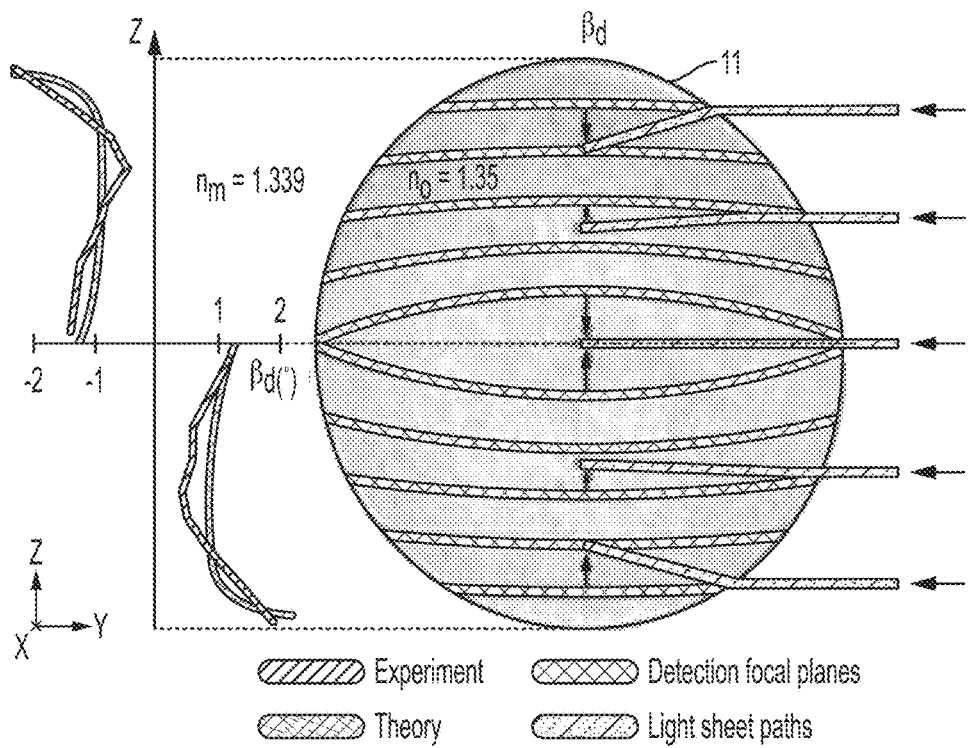
FIG. 18D shows an illustration of the specimen of FIG. 18A in which experimentally measured and theoretically predicted correction angles are adjusted across the volume of the specimen.

FIG. 18D shows experimentally measured and theoretically predicted (black and gray lines in β plot) correction angles β across the volume of *D. melanogaster* embryo. Predictions were obtained with a ray optics model that assumes average refractive indices of 1.339 and 1.35 of the matrix in which the specimen 11 is held and the surface regions in the embryo. The good agreement between experiment and model suggests that two main optical effects are responsible for angular mismatches of light sheets and detection focal planes 26, 28 inside the specimen 11:
1. light sheet refraction at the interface between the embryo and surrounding matrix/medium; and
2. curvature of detection focal planes 26, 28 inside the specimen 11 as a result of specimen-induced lensing along the optical detection path (the Z axis).

The computation framework 185 computationally maps and corrects the three dimensional light-sheet path across the volume of the specimen 11 using a robust image-based algorithm for continuous optimization of light-sheet angles α and β. This algorithm operates on the same defocus image sequences used to correct the offsets of light-sheet and detection focal planes (I1, I2, D1 and D2), which eliminates the need for additional measurements and optimizes the use of time and photon budget. Compensating for light-sheet refraction in a spatially adaptive manner is essential to improve resolution systematically across a large field of view and cannot be replaced by adaptive imaging limited to translational degrees of freedom.

In addition to quantifying resolution improvements in multiple model systems for the full set of parameters, the causes and impacts of divergence between light-sheet and detection focal planes in the absence of angular degrees of freedom are investigated. The values of α and β deflection angles are measured in a *Drosophila* embryo as function of depth and a theoretical model of light-sheet propagation is developed considering the optical and geometrical properties of the embryo. In order to optimize the spatial resolution of the output from the cameras 846, 848 β needs to be continuously adjusted using nonlinear parameter trajectories spanning the intervals [0.5° 2.0°] and [−0.5° −2.0°] in each camera field (as shown in FIG. 18D). The need for these corrections arises from two primary optical effects. The refractive index mismatch between specimen 11 and its environment (i) leads to location-dependent light-sheet refraction at the surface of the specimen 11 and (ii) introduces spatially variant curvature of the detection focal planes 26, 28 inside the specimen 11. These mechanisms lead to a theoretical position-dependent angular mismatch between the light sheet planes and the detection focal planes 26, 28 that is in good agreement with the optimal corrections determined and executed by the computation framework 185 in a completely data-driven manner (as shown in FIG. 18D).

The light-sheet angle α is adjusted during system alignment of a light sheet microscope (if this degree of freedom has been considered in the design of the microscope). While adjusting this degree of freedom needs to be done properly, the angle α is not typically expected to drift substantially over time nor to be primarily responsible for serious imaging artifacts during an experiment. However, for large specimens and/or complex specimen geometries (with refractive index distributions that differ from the mounting medium) aberrations and light refraction that—among other effects—lead to an angular mismatch of light sheet plane and the detection focal plane 26, 28 can occur, as discussed above. In contrast to the angle α, there is a stronger case for adjusting the angle β in a depth-dependent manner. For example, for typical spherical or ellipsoidal specimens 11 (such as zebrafish or *Drosophila* embryos), the light-sheet incidence angle relative to the medium-to-sample-interface varies from −90 degrees to +90 degrees as the imaging plane is moved from one end of the specimen 11 to its other end along the Z axis.

When entering the specimen 11, the light sheet 12, 14 is thus refracted by an amount that depends on the position of the image plane (as shown in FIG. 18D). Because of this differential path deflection of the light sheet plane, different image planes in the specimen 11 require different angular focus adjustments to restore optimal image quality. This consideration shows that, in practice, there is no substitute for an angular adjustment since no focus translation adjustment can fully correct for the inevitable refraction of the light sheet 12, 14.

Figure 18E:
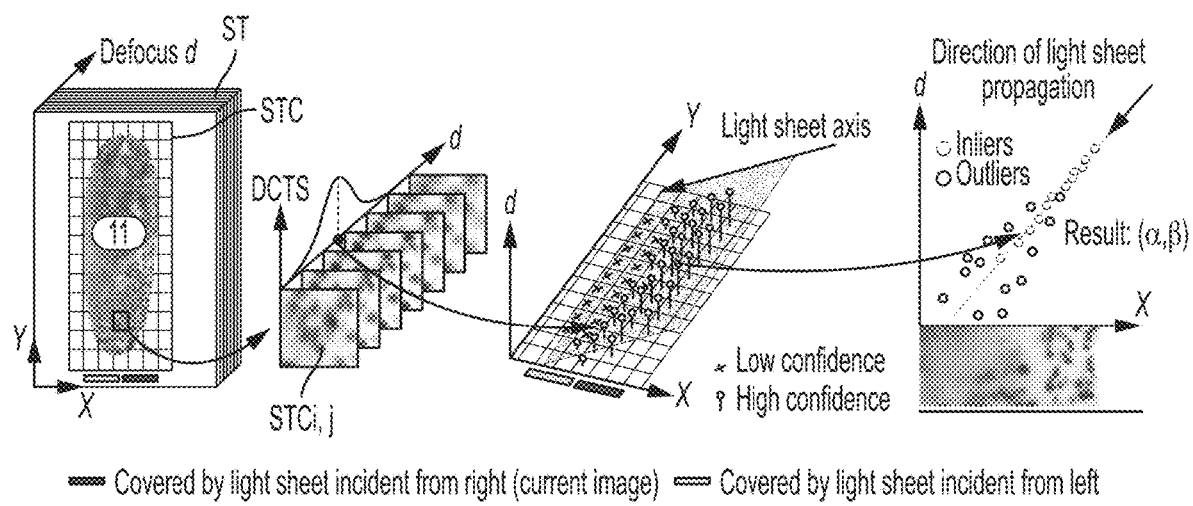
FIG. 18E shows an illustration of the procedure for automatically determining the three dimensional orientation of the light sheet in the specimen of FIGS. 18A-18D.

Referring to FIG. 18E, the three dimensional orientation of the light sheet 12, 14 in the specimen 11 is automatically determined using the procedures 1510 and 1530 that are performed by the adaptive system 160, as follows. The procedure 1510 and 1530 are used to determine the light sheet parameters z, α, and β, which include the two light sheet angles as well as the offset position z of best focus quality (thus fully defining the three-dimensional geometry of the light sheet plane).

A standard focus stack ST of images is acquired. The standard focus stack ST of images is acquired by the cameras 846, 848 for refocusing purposes. This stack consists of several images $ST_k$ (9 or 11 images in practice), where k is the number of images in the stack. Next, each image of the stack ST is cropped to form a cropped stack STC and then each image of the cropped stack STC is divided into sub-regions $ST_{i,j}$, where i and j correspond to the number of sub-regions along the two axes that define the plane of the image (such as the X and Y axes). Each sub-region $ST_{i,j}$ corresponds to a selected reference region of the sample (1511). Moreover, the operating parameter that is changed (1512) is either the location of the focal plane 26, 28 or the plane I of the light sheet 12, 14 along the Z axis. The image of fluorescence is recorded at each of the sub-regions $ST_{i,j}$ (1513).

The quality of each sub-region is determined (1514) by applying the image metric MET to each sub-region to determine the points (x, y, d) characterizing the three-dimensional light sheet path. The image metric that can be used is the DCTS image metric. For each sub-stack $ST_{i,j}$ the metric MET of each image $MET(ST_{k,i,j})$ is computed.

The operating parameter that produces the highest quality image is observed by determining the optimal focus depth $z_{i,j}$ for each sub-stack $ST_{i,j}$ individually (1531) and these are stored (1532). For some sub-stacks it may not be possible to determine reliable focus information because of statistically non-significant fitting (for example, as a result of lack of signal or poor image quality in a remote location of the stack with exceptionally long illumination and detection path lengths). In this case, the corresponding data points are discarded.

Outliers are detected. The operating parameters of the angles α and β between the light sheet plane and the detection focal plane are robustly reconstructed. Additional filtering of data points can be performed to remove outliers both in terms of their geometric isolation and in terms of their maximal metric (for example, DCTS) value per sub-stack. Next, the data points collected $(x_{i,j}, y_{i,j}, z_{i,j})$ are used to find the most likely plane passing through these points. This plane corresponds to the light sheet plane itself and can in principle be found by applying a simple least square regression. However, since outliers can still remain among the data points even after careful filtering, a robust linear fit estimator capable of distinguishing inliers from outliers can be used.

The final result is a two-dimensional plane fit of the form:

$$z = ax + by + c$$

The two angles can be extracted as follows:

$$\alpha = \operatorname{atan}(b)$$

$$\beta = \operatorname{atan}(a)$$

These angles can be adjusted (1450), for example, during the update 620 (FIG. 6).

Testing/Experiments

To evaluate the performance of the adaptive system 160, a system benchmark using well-defined optical perturbations of known magnitude was performed. This benchmark served as a validation and characterization of our method before subjecting the adaptive system 160 to the a priori unknown optical perturbations encountered in the biological experiments described in the next sections.

A short-term volumetric imaging experiment using a live Drosophila embryo is performed while electronically inducing well-defined, instantaneous jumps and continuous drifts of light-sheet and detection focal plane positions of varying magnitudes (jumps of 2-8 μm, drifts of 1 μm min−1). These perturbations were generated using the piezo controllers responsible for positioning light sheets and detection objectives, ensuring that the microscope control framework itself was unaware of the timing, type and source of these external events. The adaptive system 160 could thus assess and compensate for these perturbations only through real-time analysis of the acquired images, mimicking the challenges encountered in an actual biological imaging experiment. By comparing the magnitude and type of induced system perturbations to decisions and response timing of the adaptive system 160, the performance of the adaptive system 160 can be tested, as shown in FIGS. 17A-17E. This benchmark demonstrates the rapid and accurate recovery of optimal image quality in response to a variety of perturbations affecting the 3D spatial relationship between light sheets and focal planes; for all perturbations, the adaptive system 160 correctly identified the affected degree(s) of freedom affected and recovered, on average, 92% of the perturbation-induced loss in image quality within 1-2 time points after a perturbation.

Figure 19:
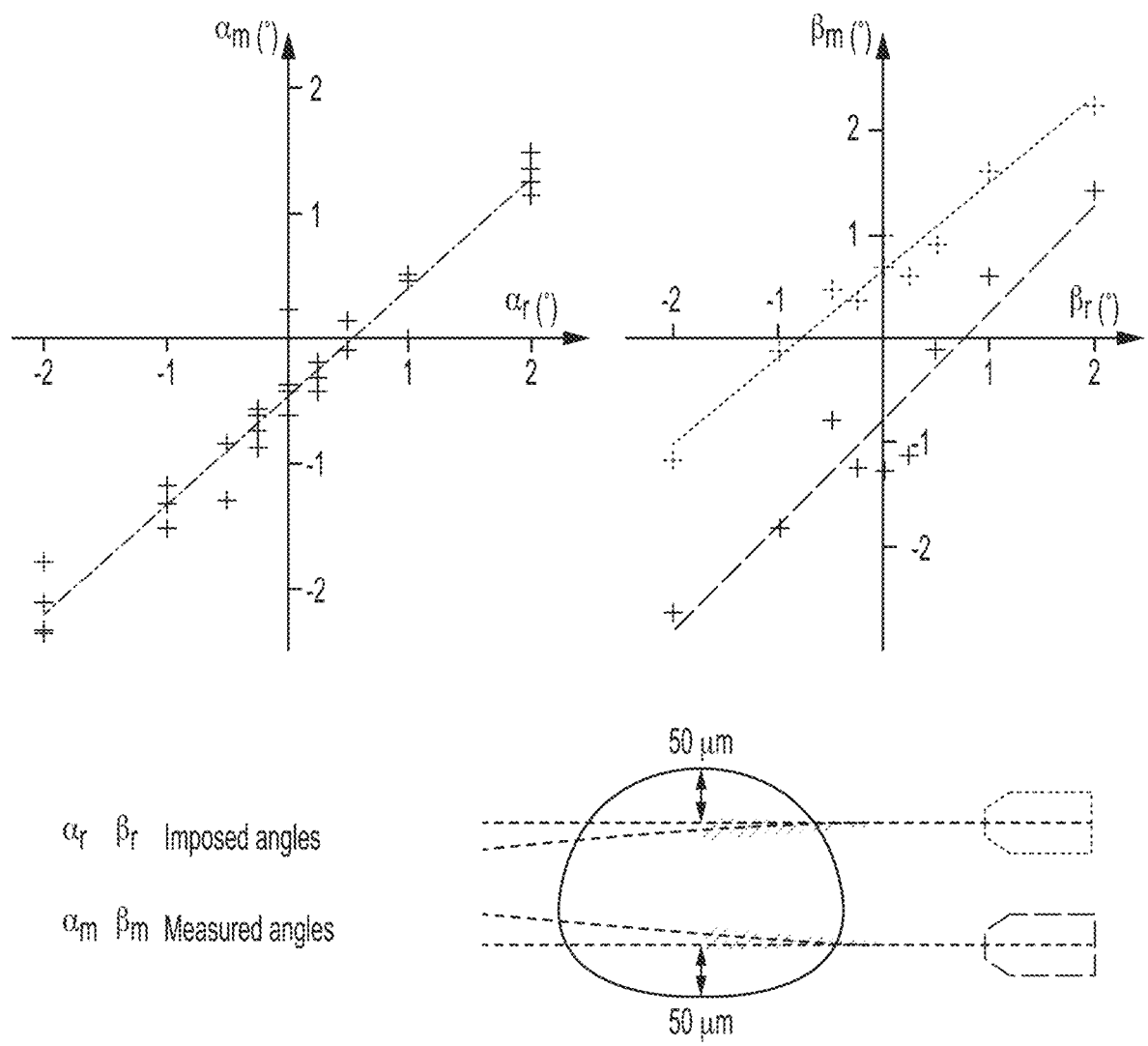
FIG. 19 shows graphs of a relationship between imposed and measured light sheet angles α and β as a function of imaging depth in the specimen imaged by the optical microscope of FIG. 1.
Figure 22A:
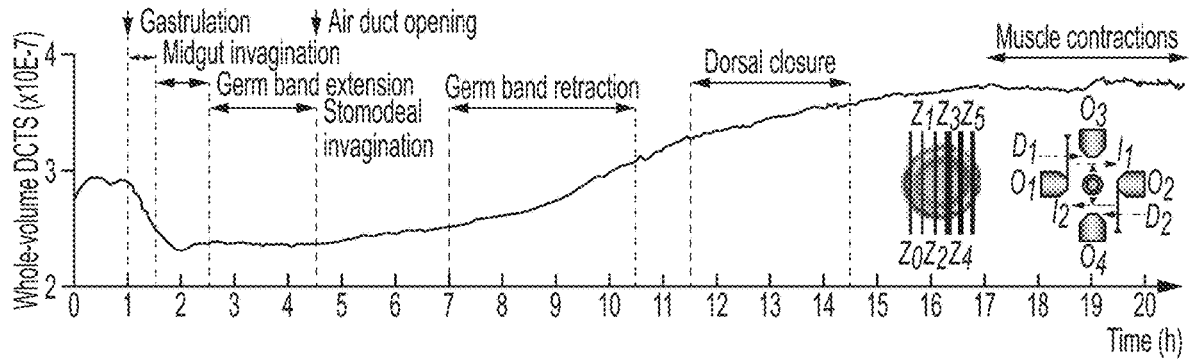
FIG. 22A shows a graph of an image quality as a function of time during spatiotemporal adaptive imaging of a Drosophila embryo.
Figure 22B:
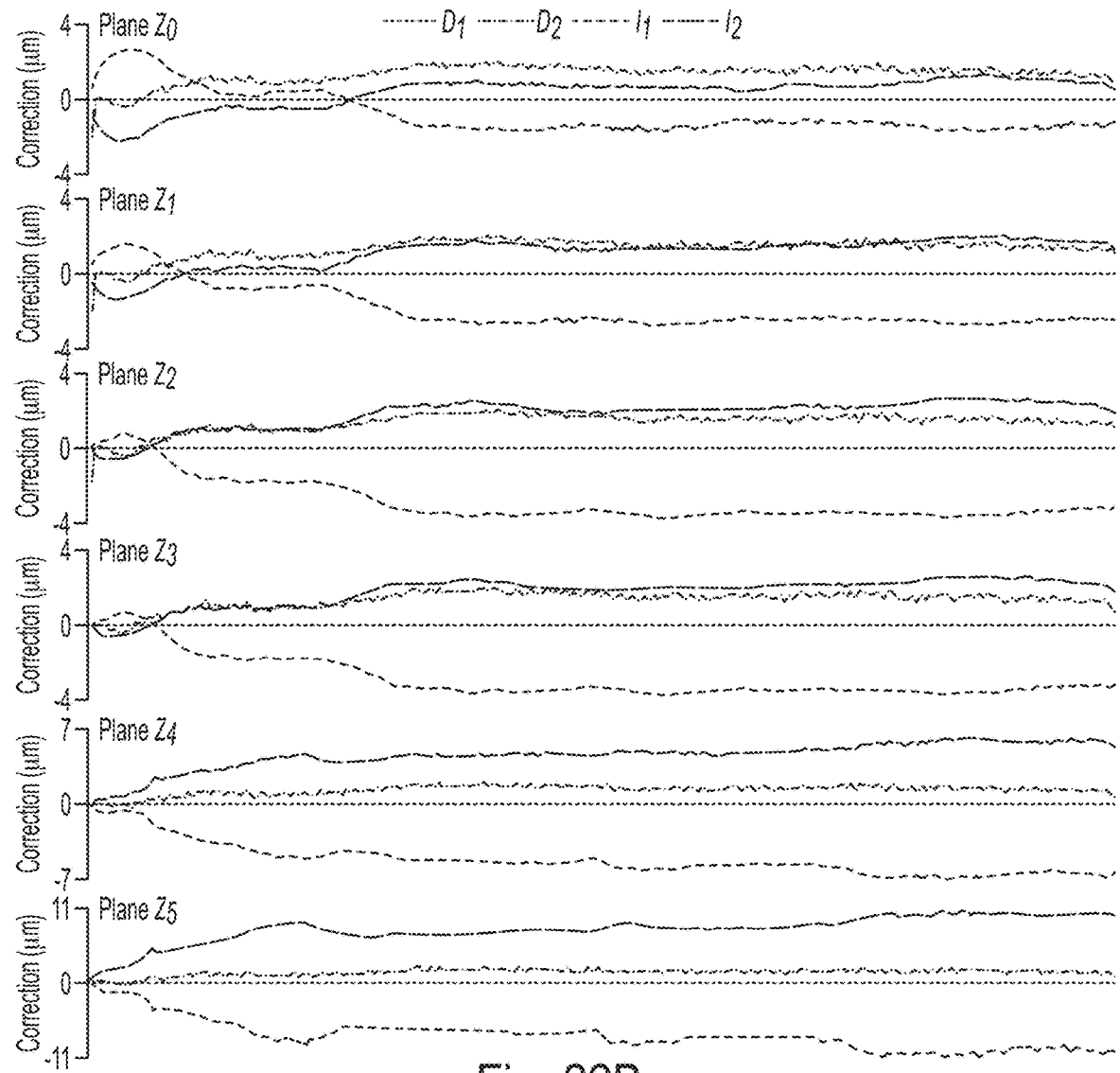
FIG. 22B shows temporal corrections of four operating parameters of the microscope at several reference planes as a function of time for the Drosophila embryo of FIG. 22A.

Additional benchmarks for the angular degrees of freedom are performed by introducing and compensating for light-sheet deflections of known magnitude (jumps of 0.25-2°). These latter experiments show that the adaptive system 160 correctly identifies and corrects angular mismatches between light-sheet and detection focal planes inside living specimens with a precision of 0.15° and 0.21° for αi and βi, respectively, as shown in FIG. 19.

Finally, the adaptive system 160 is tested to assess how quickly it optimizes an uncorrected optical microscope 110 de novo (starting in an unknown state) and recovers high spatial resolution across a large specimen. We measured the system correction time for an entire zebrafish larval brain expressing a genetically encoded calcium indicator, as shown in FIG. 20. The 800×600×200 μm$^3$ volume of the specimen 11 was divided into five reference regions and executed three rounds of iteratively converging parameter adaptation to the optical properties of the specimen 11, as shown in FIG. 20A, confirming that optimal system performance was reached in the last round, as shown in FIG. 20B. After starting with a complete lack of cellular resolution throughout the brain, system optimization took 40 seconds and systematically recovered high resolution throughout the brain, as shown in FIG. 20C. This whole-system optimization procedure can be performed once, at the beginning of a time-lapse experiment, to ensure that the optical microscope 110 is in a well-defined, optimal state. Subsequent system state updates do not require iterative schemes and can be partitioned into subsets of measurements to minimize time spent on tasks by the adaptive system 160.

Adaptive System 160 Examples

The capabilities and robustness of the adaptive system 160 is demonstrated using a wide spectrum of (i) marker strategies, including different types of morphological markers and calcium indicators, (ii) model systems, including Drosophila and zebrafish embryos and zebrafish larval brains and (iii) imaging assays, including developmental, functional, multi-color and multi-view imaging experiments.

Spatiotemporally Adaptive Imaging of Drosophila Development

Referring to FIGS. 21A-21D, 22A, 22B, and 23 a challenge for high-resolution live imaging of multicellular organisms is the occurrence of dynamic changes of local optical properties, in particular, during changes in specimen morphology. The potential of spatiotemporally adaptive imaging in this scenario is tested using Drosophila embryonic development, which presents a challenging test case.

In early stages of embryogenesis, morphological changes occur across the entire embryo and manifest themselves in fast rearrangements and remodeling of tissues. Moreover, the early Drosophila embryo contains a large amount of lipid-rich yolk that is consumed over time. These processes affect local optical properties throughout the specimen and degrade spatial resolution and image quality if left unaccounted for.

Figure 23:
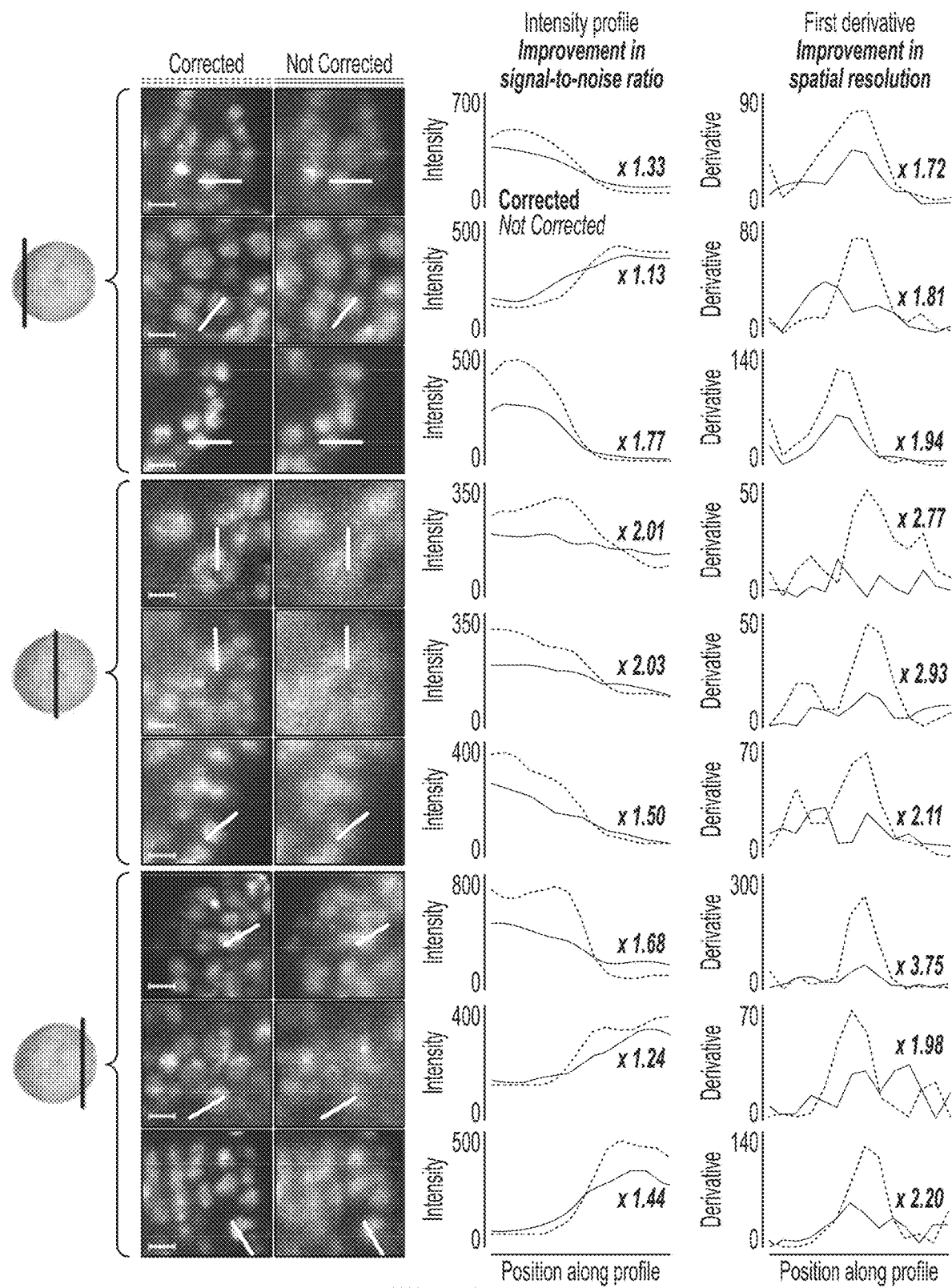
FIG. 23 shows a comparative analysis of images recorded in adaptively corrected (first column) and uncorrected (second column) microscope states in a Drosophila embryo at 21 hours after egg laying.

A 21-hour time-lapse imaging experiment is conducted with a Drosophila embryo expressing histone-red fluorescent protein (histone-RFP) in all cells. The adaptive system 160 had full control of this experiment and was allowed to adjust the main degrees of freedom (I1, I2, D1 and D2) to continuously and automatically optimize the state of the optical microscope 110, as shown in FIGS. 21A-21D, 22A, and 22B. These four degrees of freedom required for translating light-sheet and detection focal planes form the minimal parameter set needed for effective system corrections. Advanced adaptive imaging with all ten degrees of freedom will be discussed in the next results sections. As expected, the corrections required for optimal spatial resolution (FIG. 21B) vary as a function of time and depend on the imaging depth inside the embryo. Across space and time, light-sheet positions needed to be adjusted by 5.3 µm on average (up to 9.4 µm, at maximum) across all reference locations (FIG. 21B). The real-time corrections performed by the adaptive system 160 furthermore demonstrate that the most pressing need for system-state adjustments arises between 3 and 8 h after egg laying (corresponding to 0-5 h in FIGS. 21A and 21B), when the fastest and most-pronounced internal morphological changes in the embryo take place. Spatial resolution is substantially improved throughout the imaging experiment, and cellular and sub-cellular features are recovered in many regions that would suffer from low image quality in non-adaptive microscopy (FIG. 21C) including in deep-tissue regions of the developing nervous system. Improvements in spatial resolution are quantified throughout the embryo by systematically analyzing intensity profiles crossing cell nuclei boundaries (as shown in FIGS. 21D and 23). This analysis shows that adaptive imaging improved spatial resolution by an average of 2.4-fold (up to 3.8-fold locally) and signal strength by an average of 1.6-fold (up to 2.0-fold locally). Fourier analysis of the data acquired by adaptive imaging indicates an increase of 30-40% in the radius, marking maximum frequency support (FIG. 21C). This analysis underestimates the improvement in resolution compared to the line profile analysis because the band-limited and noisy image is considered as a whole, including regions that only contain low-frequency structures irrelevant for estimating resolution limits.

Furthermore, in the interest of fair comparison, the quantifications generally underestimate the performance of the adaptive system 160: images representing the uncorrected microscope state were acquired using the fully optimized microscope configuration determined by the adaptive system 160 at the beginning of the time-lapse imaging experiment. Thus, this analysis solely quantifies improvements attributable to continuous microscope state updates during live imaging.

Adaptive Imaging of Large-Scale Cell Movements in Zebrafish

Referring to FIGS. 24A-24E and 25, in the imaging experiment discussed above, the *Drosophila* embryo undergoes large-scale morphological changes during early development, but a fluorescent signal is available at all times throughout the ubiquitously labeled embryo. In experiments with other model systems, developmental processes or marker strategies, the distribution of fluorescent signal can change substantially as a function of time. Thus, the adaptive system 160 is next tested to perform on-demand microscope adaptation to large-scale changes in signal distribution as a result of morphological changes. To this end, spatiotemporally adaptive imaging of developing zebrafish embryos throughout gastrulation is performed. The 6-to-12-h-long experiments capture the entire process of epiboly, which is characterized by large-scale directed cell movements across the embryo (FIG. 24A). Thus, the microscope must continuously monitor the specimen volume for the emergence of local signal and rapidly adapt, on demand, to new regions that previously lacked fluorescent signal (FIG. 24B).

During the first 4.5 h of the 12-h time-lapse experiment, cells expressing nuclear-localized GFP move from the animal to the vegetal hemisphere and progressively populate the initially empty reference planes z4-z6 (FIG. 24A). The adaptive system 160 automatically detects the associated spatiotemporal changes in fluorescence and adapts the optical microscope 110 to those newly populated regions (FIGS. 24B and 24C). The density of the reference planes PL is set sufficiently high to ensure adequate correction of spatially varying optical properties. A practical choice is a setting at which differences in light-sheet offset corrections for neighboring planes do not exceed the depth of focus (~2 resulting in 7 reference planes across the zebrafish embryo; FIG. 24C). These settings are typically robust across all experiments performed with the same biological model system. If no previous measurements from the adaptive system 160 are available, a high density of reference planes (for example, 20-µm spacing) can be used to assess optical effects while ensuring optimal image quality already in the first experiment. Empty reference planes are subjected to the same parameter changes as their closest spatial neighbors for which fluorescence signal is available.

Figure 25:
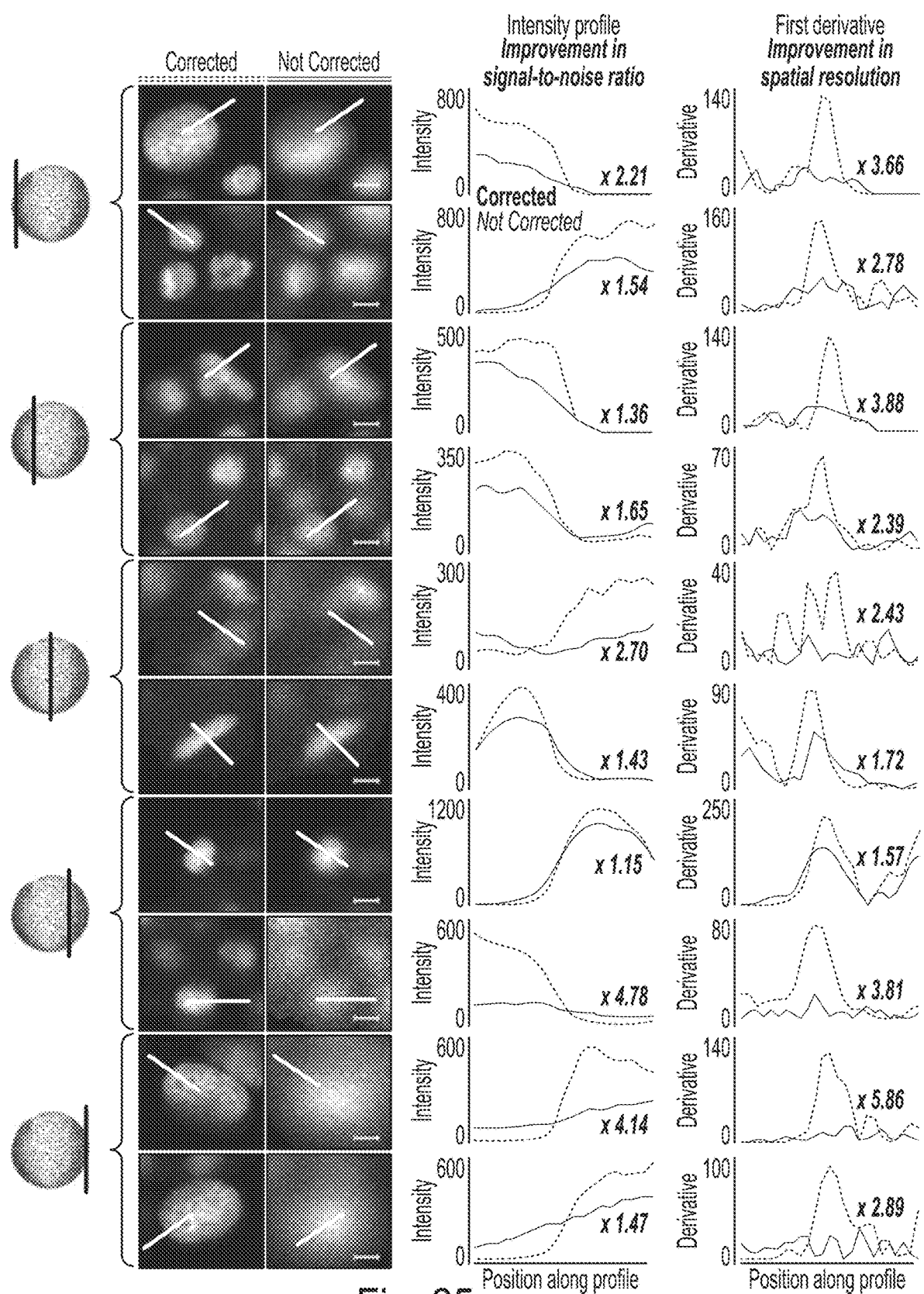
FIG. 25 shows a comparative analysis of images recorded in adaptively corrected (first column) and uncorrected (second column) microscope states in a zebrafish embryo at the end of epiboly.

During large-scale cell movements, the optical microscope 110 progressively adapts to changes in the imaging volume and locally optimizes image quality as soon as measurements based on local signal become available. As shown above for *Drosophila* development, spatiotemporally adaptive imaging also offers substantial improvements in spatial resolution and image quality for developing zebrafish embryos, recovering cellular and even sub-cellular features in many regions that are not resolved by non-adaptive imaging (FIG. 24D). Quantitative analysis of resolution shows that adaptive imaging improved spatial resolution an average of 3.1-fold (up to 5.9-fold locally) and signal strength an average of 2.1-fold (up to 4.8-fold locally) (FIGS. 24E and 25). Fourier analysis of the data acquired by adaptive imaging furthermore indicates an increase of 20-30% in the radius marking maximum frequency support (FIG. 24E).

Adaptive multi-color imaging of dynamic gene expression Referring to FIGS. 26A-26E, multi-color imaging is a powerful tool for interrogating dynamic processes in living organisms. Key applications include, for example, the study of protein-protein interactions and the registration of cell-type-specific information to the local tissue context. The spatial distributions of the respective markers frequently undergo dynamic changes, and genetic labels tracking specific gene products may not even be expressed at the beginning of a time-lapse experiment. To demonstrate on demand microscope adaptation to a priori unknown marker distributions in a multi-color setting, cellular dynamics were followed for 20 h in entire developing *Drosophila* embryos expressing nuclear-localized RFP in all cells and cytoplasmic GFP in precursor cells forming the embryonic nervous system (FIG. 26A). Thus, in addition to adapting to optical changes in the developing embryo, the adaptive system 160 must autonomously detect the onset of GFP expression in different parts of the specimen 11 and adapt to the continuously changing distribution of GFP throughout the embryo. The two-color channels furthermore need to be correctly registered in space, which requires automated detection and compensation of chromatic aberrations.

Figure 27A:
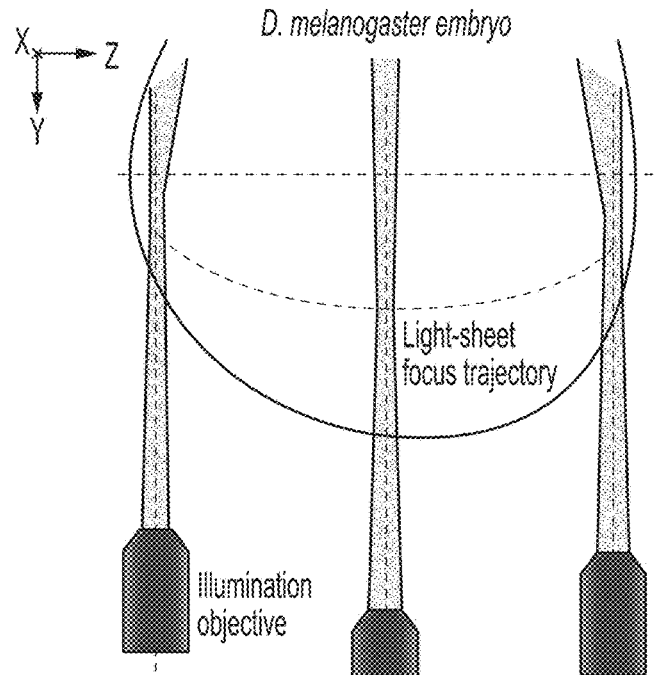
FIG. 27A shows a schematic illustration of how the optimal axial position of a light sheet waist varies with the location of the image plane in the specimen.
Figure 27B:
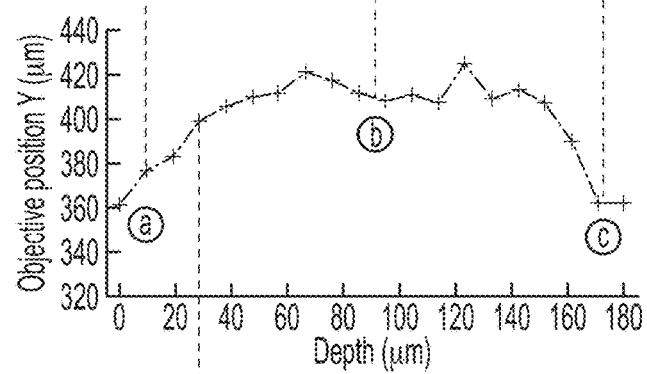
FIG. 27B shows how the optimal axial position is estimated by determining the position at which the image quality is highest.
Figure 27F:
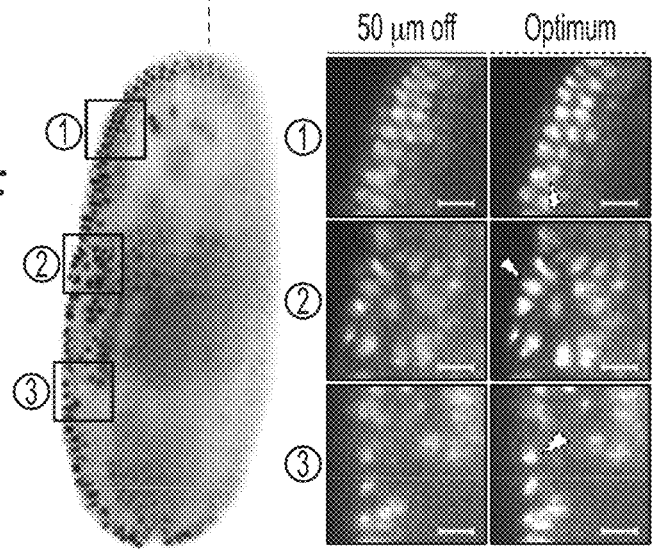
FIG. 27F shows an image output from the optical microscope in which image contrast and spatial resolution are substantially improved by optimizing the axial position of the light-sheet waist.
Figure 27C:
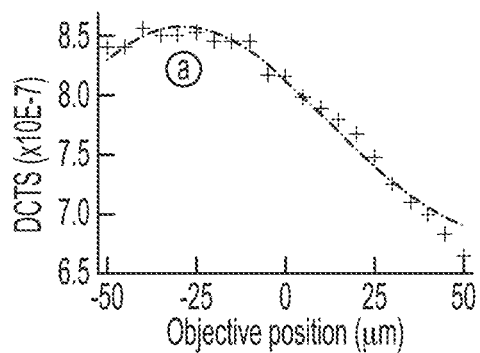
FIGS. 27C, 27D, and 27E show exemplary graphs of the image quality versus depths in the specimen.
Figure 27D:
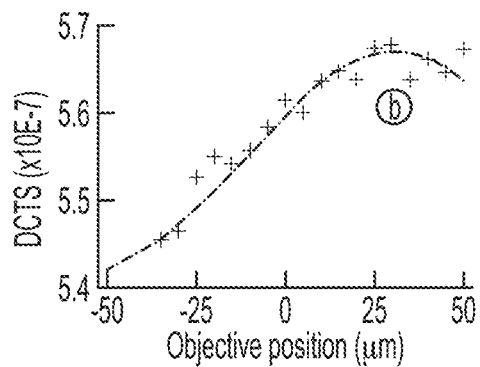
Figure 27E:
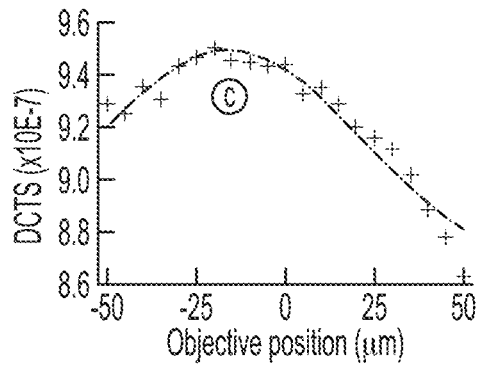
Figure 27G:
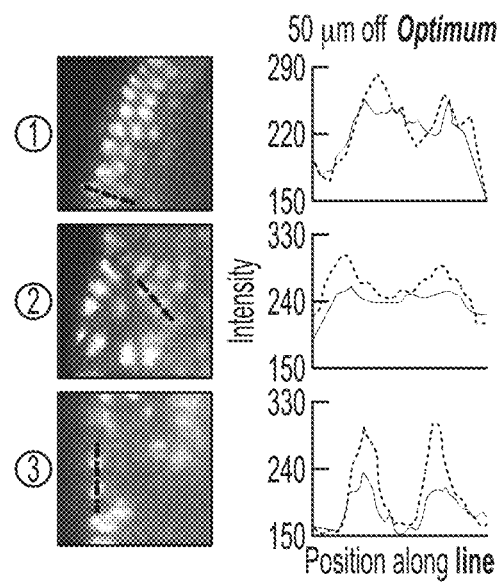
FIG. 27G shows an image in which cellular resolution in many regions of the specimen is restored by optimizing the axial position of the light-sheet waist.

By tracking the spatiotemporal expression of the pan-neural marker (FIG. 26B), the adaptive system 160 evaluates which measurements provide information for improving local image quality and substitutes data points corresponding to regions with low signal. This selective optimization procedure robustly improves spatial resolution throughout the embryo and resolves individual cells in many parts of the emerging nervous system that lack cellular resolution without adaptive imaging (FIG. 26C). Specimen- and optics-induced chromatic aberrations are automatically detected and eliminated (FIG. 26D). Moreover, by controlling the positions of the illumination objectives (Y1 and Y2), the adaptive system 160 ensures that the thinnest regions of the light sheets systematically track the 3D marker distribution across the specimen (as shown in FIGS. 27A-27G). Because the ubiquitous (RFP) and pan-neural (GFP) markers are distributed differently in space, the adaptive system 160 further improves spatial resolution by determining optimal illumination focus trajectories for each color channel individually (FIGS. 26E, 27F, and 27G).

Adaptive Whole-Brain Functional Imaging in Larval Zebrafish

Complementing the developmental imaging applications discussed above, the adaptive system 160 is applied to spatiotemporally adaptive whole-brain functional imaging. Such experiments are frequently performed with calcium indicators that change intensity levels in response to neuronal activity and demand substantially higher image-acquisition rates than developmental imaging experiments. Light-sheet refraction across the brains of 4- and 5-d-old larval zebrafish is less pronounced than that in Drosophila embryos (βi is, on average, three-fold smaller, as shown in, for example, FIG. 18D). However, light-sheet offsets Ii vary substantially across the brain and are furthermore dynamic in time at a spatial scale comparable to the depth of detection focus. This suggests that whole-brain functional imaging should benefit substantially from microscope adaptation under the control of the adaptive system 160. Taking advantage of an optical microscope 110 design that enables rapid piezo-based volumetric imaging from multiple views simultaneously, an imaging assay for high-speed functional imaging is developed concurrently with an adaptive system 160-mediated system optimization.

The adaptive system 160 measurements and computations for both light sheets and seven reference planes spanning the 200-μm-deep brain volume take 10 s. Because of the slow drift of optical conditions in advanced developmental stages, a 10-min update frequency for the core parameter set (Ii, Di) is sufficient for maintaining optimal image quality. The remaining 98% of microscope bandwidth can thus be reserved exclusively for high-resolution whole-brain imaging at a sustained volume rate of 3 Hz. Referring to FIGS. 28A-28D, a comparison of corrected and uncorrected image data shows that adaptive functional imaging recovers single-cell resolution in multiple brain regions that cannot be resolved without microscope adaptation, and furthermore offers substantial improvements in the fidelity of single-neuron activity traces. For example, after 1 h of imaging, image quality is still comparable in midbrain regions, but uncorrected images of forebrain regions suffer from substantial degradation (FIG. 28D). At the mid-point of the 20-h time-lapse experiment, image quality in large sections of both the fore- and mid-brain is substantially degraded without adaptive microscope state corrections.

Structured Light Sheet Implementation

The measurement 152 of the images taken at the reference planes [$PL_0$, $PL_1$, . . . $PL_{K-1}$] can include an engineered high-frequency component that is introduced into the images to ensure robustness of auto-focusing independently of the native frequency content of the data in the image.

Using a structured light sheet improves robustness across a wide range of marker strategies, including uniform textureless marker distributions. Specifically, light-sheet geometry and focus are mapped with a structured light sheet created by high-frequency laser intensity modulation. In this mode, an engineered high-frequency component is introduced to the images to ensure robustness of auto-focusing independently of the (a priori unknown) native frequency content of the image data. On the other hand, primary image data acquisition is performed with a conventional, uniform light sheet. In addition to enhancing robustness, the use of structured light sheets for focus localization further reduces the energy load of the specimen 11.

In these implementations, the procedure 1400 also includes creating a structured light sheet. In this way, the one or more properties relating to the light-sheet imaging that are measured (1410) include one or more properties relating to imaging of the sample with the structured light sheet. The structured light sheet can be created by modulating a property of the formed light sheet 12, 14 at a frequency. The frequency of modulation is determined based on an optical transfer function associated with performing light-sheet imaging.

The modulation can be performed by modulating an intensity of the light sheet at the frequency as a function of spatial location within the image plane.

CONCLUSION

The adaptive system 160 provides a light-sheet microscopy framework for spatiotemporally adaptive live imaging. This framework effectively yields a 'smart' light-sheet microscope capable of substantially improving spatial resolution by continuously and automatically adapting to the dynamic optical conditions encountered in living specimens. This framework offers robust performance for a wide variety of model systems, fluorescent markers strategies and imaging assays. Complementing the data presented in this paper, the adaptive system 160 is deployed on three different types of light-sheet microscopes 110. The high level of automation realized by the approach of using the adaptive system 160 thus also simplifies the use of light-sheet microscopes by non-experts: users with limited imaging experience are able to consistently obtain optimal data quality, even when working with challenging biological specimens or executing complex imaging workflows.

The ideas underlying the adaptive system 160 follow design principles that can be applied to other types of light-sheet microscopes. The adaptive system 160 is not constrained to a particular mode of fluorescence excitation and is thus applicable to two-photon imaging, Bessel beams, and lattice light sheets. Conceptually, the adaptive system 160 generalizes to microscope designs with an arbitrary number of illumination and detection arms and can easily operate additional degrees of freedom if needed.

The adaptive system 160 for spatiotemporally adaptive imaging also lays a foundation for light-sheet based adaptive optics in large living specimens. The optimization of spatial overlap between light-sheet and detection focal planes obtained using the adaptive system 160 is a key prerequisite to this end. The adaptive system 160 could thus be further extended to operate wavefront sensors, spatial light modulators and deformable mirrors in the microscope's illumination and detection arms, which would enable complementary optical corrections.

The high resolution and system automation achieved with the adaptive system 160 furthermore open the door to high-throughput assays for high-resolution live imaging of large biological specimens. In addition to benefitting essentially any investigation requiring high-resolution in vivo data of multicellular organisms, the adaptive system 160 can enable the use of light-sheet microscopy for automated drug screens, mutant screens and the construction of anatomical and developmental atlases in various biological model systems.

The automated spatiotemporal adaptive system 160 reduces the time for adaptation when compared with a manual adaptive system. Moreover, the automated spatiotemporal adaptive system 160 is better suited than a manual adaptive system to work in the microscope system 100 because a large number of parameters are controlled. Additionally, an automated spatiotemporal adaptive system 160 is better suited to be performed on live imaging than a manual system, because the optical properties of the specimen 11 change during live imaging and the speeds at which the changes are occurring can be too rapid for manual adjustment. Even at the beginning of an experiment, manual approaches are often not a realistic option considering that there is often only limited time available before the onset of the biological process of interest (for example, when imaging early developmental events) or the onset of degradation of the specimen 11 (for example, when imaging sensitive organ explants). Continuous manual monitoring and adaptation of the optical microscope 110 to spatiotemporal changes in the living specimen 11 during time-lapse imaging is practically not feasible. Systematically optimizing spatial resolution in large or complex living specimens 11 thus requires a microscope system 100 capable of automated spatiotemporally adaptive imaging.

The automated spatiotemporal adaptive system 160 automatically adapts to spatiotemporal dynamics of genetically-encoded fluorescent markers and robustly optimizes imaging performance during large-scale morphogenetic changes in living organisms. The high level of microscope automation realized by the automated spatiotemporal adaptive system 160 furthermore allows non-expert users to take full advantage of light-sheet microscopy and produce image data of optimal quality. While the automated spatiotemporal adaptive system 160 is shown with reference to a specific design of a optical microscope 110 herein, it is a general system that can be readily adapted to other light-sheet microscope designs. Moreover, the automated spatiotemporal adaptive system 160 recovers cellular and sub-cellular features in many anatomical regions that cannot be resolved by non-adaptive light-sheet microscopy. Long-term adaptive imaging of entire developing zebrafish (*Danio rerio*) and *Drosophila melanogaster* embryos is demonstrated, and adaptive whole-brain functional imaging in larval zebrafish is performed using the automated spatiotemporal adaptive system 160.

What is claimed is:

1. A microscope comprising:
   a source of light configured to produce light having a specified wavelength;
   illumination optics configured to form the light from the light source into a light-sheet at a position within a sample along an illumination direction that is parallel with an illumination axis;
   detection optics configured to collect images of fluorescence emitted from the sample along a detection direction; and
   an automated adaptive system comprising:
      an actuation apparatus connected to the illumination optics and configured to control or adjust one or more operating parameters of the illumination optics, the actuation apparatus comprising:
         a first actuator configured to translate the light sheet about a transverse offset with respect to the illumination axis;
         a second actuator configured to translate the light sheet about a longitudinal offset with respect to the position within the sample;
         a third actuator configured to rotate the light sheet through a roll angle about the illumination axis; and
         a fourth actuator configured to rotate the light sheet through a yaw angle about a direction normal to the illumination axis; and
      a control system in communication with the actuation apparatus, the control system configured to:
         probe the microscope during an adaptive imaging by providing an adaptive control signal to the actuation apparatus, and adjust primary imaging of the sample by adjusting a primary control signal to the actuation apparatus based on probing during adaptive imaging.

2. The microscope of claim 1, wherein the source of light is a laser;
   wherein the light produced by the laser includes a beam having a Gaussian profile through a cross-section of the beam, the beam having a waist at a location along the illumination axis where the Gaussian profile of the beam has a minimum width; and
   wherein the second actuator that is configured to translate the light sheet about the longitudinal offset with respect to the position within the sample is further configured to move the waist of the beam along the illumination axis.

3. The microscope of claim 1, wherein the third actuator that is configured to rotate the light sheet through the roll angle about the illumination axis includes a dual-axis galvanometer scanner.

4. The microscope of claim 1, wherein the fourth actuator that is configured to rotate the light sheet through a yaw angle about the direction normal to the illumination axis includes a dual-axis pivot galvanometer scanner having a vertical tilting mirror and a lateral tilting mirror, the vertical tilting mirror being configured to angularly displace the light in a first direction $\theta x$ relative to the illumination axis, the lateral tilting mirror being configured to angularly displace the light in a second direction $Oz$ relative to the illumination axis, the second direction being normal to the first direction, the yaw angle being an aggregation of $\theta x$ and $\theta z$.

5. The microscope of claim 4, wherein the fourth actuator that is configured to rotate the light sheet through a yaw angle about the direction normal to the illumination axis further includes two relay lenses, the dual-axis pivot galvanometer scanner being positioned at a focal-distance between two relay lenses such that the collimated beam from the laser is focused onto the vertical scanning mirror by the first relay lens, and the second relay lens restores collimation and directs the beam onto the dual-axis light-sheet galvanometer scanner.

6. The microscope of claim 1, wherein the detection optics comprise:
   an objective lens configured to produce an image of the sample illuminated by the light sheet in an image plane that is perpendicular to a detection direction that is parallel with a detection axis; and
   a detector configured to detect, in the image plane, the image of the sample illuminated by the light sheet;
   wherein the actuation apparatus further comprises a fifth actuator configured to translate the objective lens along the detection axis.

7. The microscope of claim 6, wherein the sample includes a set of fluorescent markers; wherein the image of the sample illuminated by the light sheet is produced by the set of fluorescent markers radiating light of a fluoresced wavelength into the objective lens.

8. The microscope of claim 7, wherein fluoresced wavelength is different than the specified wavelength.

9. The microscope of claim 6, wherein the fifth actuator includes a piezo actuator, the piezo actuator being configured to move the objective lens along the detection axis.

10. The microscope of claim 6, wherein:
the source of light and the illumination optics are further configured to form the light into a second light-sheet at a second position within a sample along a second illumination direction in the microscope, the second illumination direction being parallel with the illumination axis, and
the detection optics further comprises:
a second objective lens configured to produce a second image of the sample illuminated by the second light sheet in a second image plane perpendicular to a second detection direction that is parallel with the detection axis; and
a second detector configured to detect, in the second image plane, the second image of the sample illuminated by the second light sheet.

11. The microscope of claim 10, wherein the actuation apparatus further comprises:
a sixth actuator configured to translate the second light sheet about a second transverse offset with respect to the illumination axis;
a seventh actuator configured to translate the second light sheet about a second longitudinal offset with respect to the second position within the sample;
an eighth actuator configured to rotate the second light sheet through a second roll angle about the illumination axis;
a ninth actuator configured to rotate the second light sheet through a second yaw angle about a second direction normal to the illumination axis; and
a tenth actuator configured to translate the second objective lens along the detection axis.

12. The microscope of claim 1, wherein the control system is configured to determine an image quality metric of the detected image produced while probing the microscope during adaptive imaging.

13. The microscope of claim 12, wherein the adaptive control signal provided to the actuation apparatus is based on an optimization of the image quality metric.

14. The microscope of claim 13, wherein the adaptive control signal thereby controls each of the first actuator, the second actuator, the third actuator, the fourth actuator, and the fifth actuator according to the optimization of the image quality metric.

15. The microscope of claim 14, wherein the adaptive controlling mechanism is further configured to perform a convolution operation on the image with a Gaussian kernel function prior to a performance of the optimization of the image quality metric.

16. The microscope of claim 14, wherein the image quality metric is invariant to affine transformations of intensities of pixels of the image.

17. The microscope of claim 14, wherein the image quality metric depends only on spatial frequencies that can pass through an optical band pass.

18. The microscope of claim 14, wherein the image quality metric includes a spectral image quality metric.

19. The microscope of claim 18, wherein the spectral image quality metric includes a Normalized Discrete Cosine Transform (DCT) Shannon Entropy metric.

20. The microscope of claim 18, wherein the adaptive controlling mechanism, in performing the optimization of the image quality metric, performs a low-pass filter configured to suppress spatial frequencies outside of a square of side $2r_p$ centered at a frequency origin, the quantity $r_p = w(I)/r_o$ being a radius of a point spread function of the objective lens, where w is the width of a square image I in the image plane and $r_o$ being a support radius of an optical transfer function (OTF) of the microscope.

21. A method of adaptive imaging comprising:
generating, in a microscope, light having a specified wavelength;
forming a light sheet from the light at a plurality of probing positions within a sample along an illumination direction that is parallel with an illumination axis of the microscope;
forming an image of a portion of the sample that was illuminated by the light-sheet at each of the probing positions;
generating an image metric based on the formed images; and
based on the image metric, adjusting operating parameters associated with primary light sheet imaging including adjusting the light sheet by (i) translating the light sheet in a direction transverse to the illumination axis, (ii) translating the light sheet in a direction along to the illumination axis, (iii) rotating the light sheet through a roll angle about the illumination axis, and (iv) rotating the light sheet through a yaw angle about a direction normal to the illumination axis.

22. The microscope of claim 13, wherein the control system is configured to determine the image quality metric based on a measurement of one or more properties relating to light-sheet imaging of the sample.

* * * * *